US008413012B2

(12) United States Patent
Limberg

(10) Patent No.: US 8,413,012 B2
(45) Date of Patent: Apr. 2, 2013

(54) BURST-ERROR CORRECTION METHODS AND APPARATUSES FOR WIRELESS DIGITAL COMMUNICATIONS SYSTEMS

(76) Inventor: Allen LeRoy Limberg, Port Charlotte, FL (US)

( * ) Notice: Subject to any disclaimer, the term of this patent is extended or adjusted under 35 U.S.C. 154(b) by 419 days.

(21) Appl. No.: 12/800,559

(22) Filed: May 18, 2010

(65) Prior Publication Data

US 2010/0293433 A1    Nov. 18, 2010

Related U.S. Application Data

(60) Provisional application No. 61/216,535, filed on May 18, 2009, provisional application No. 61/217,887, filed on Jun. 6, 2009, provisional application No. 61/280,626, filed on Nov. 6, 2009, provisional application No. 61/283,673, filed on Dec. 7, 2009, provisional application No. 61/335,246, filed on Jan. 4, 2010, provisional application No. 61/337,680, filed on Feb. 11, 2010.

(51) Int. Cl.
*H03M 13/00* (2006.01)

(52) U.S. Cl. .......................... 714/758; 714/776; 714/784

(58) Field of Classification Search ........................ None
See application file for complete search history.

(56) References Cited

U.S. PATENT DOCUMENTS

| 5,574,496 | A  | * | 11/1996 | Nielsen et al. .................. 348/21 |
| 6,426,780 | B1 | * | 7/2002  | Limberg et al. ............... 348/725 |
| 6,430,159 | B1 | * | 8/2002  | Wan et al. ..................... 370/246 |
| 2009/0055708 | A1 | * | 2/2009 | Chang et al. ................... 714/758 |
| 2009/0055711 | A1 | * | 2/2009 | Chang et al. ................... 714/758 |

OTHER PUBLICATIONS

Berrou, C.; Glavieux, A.; Thitimajshima, P.; , "Near Shannon limit error-correcting coding and decoding: Turbo-codes. 1," Communications, 1993. ICC 93. Geneva. Technical Program, Conference Record, IEEE International Conference on , vol. 2, No., pp. 1064-1070 vol. 2, May 23-26, 1993.*

Levine, B.; Reed Taylor, R.; Schmit, H.; , "Implementation of near Shannon limit error-correcting codes using reconfigurable hardware," Field-Programmable Custom Computing Machines, 2000 IEEE Symposium on , vol., No., pp. 217-226, 2000.*

* cited by examiner

*Primary Examiner* — Ajay Bhatia
*Assistant Examiner* — Daniel McMahon

(57) ABSTRACT

Frames of data that have transverse Reed-Solomon (TRS) coding and subsequent cyclical-redundancy-check (CRC) coding are subjected to de-interleaving before concatenated convolutional coding (CCC). The de-interleaving is related to the symbol interleaving of the outer convolutional coding prior to the inner convolutional coding so as to result in implied interleaving of data bits in the CCC on which wireless digital transmissions are based. The CCC is turbo decoded in a receiver for the wireless digital transmissions and re-interleaved to reproduce soft data, hard data bits of which data are TRS coded. CRC coding is decoded during the turbo decoding procedures and used to influence the confidence levels of the soft data. The confidence levels of the soft data are used for locating byte errors when the TRS coded hard data bits of the soft data are decoded.

19 Claims, 41 Drawing Sheets

| 1ST TRANSMISSION OF PROGRAM A | SET #0 of M/H GROUPS 0, 4, 8 & 12 |
| --- | --- |
| 2ND TRANSMISSION OF PROGRAM A | SET #1 of M/H GROUPS 1, 5, 9 & 13 |
| 1ST TRANSMISSION OF PROGRAM B | SET #2 of M/H GROUPS 2, 6, 10 & 14 |
| 2ND TRANSMISSION OF PROGRAM B | SET #3 of M/H GROUPS 3, 7, 11 & 15 |

Fig. 5 Slot Allocations for a 1st Transmitter in a 1st Network

| 1ST TRANSMISSION OF PROGRAM B | SET #0 of M/H GROUPS 0, 4, 8 & 12 |
| --- | --- |
| 2ND TRANSMISSION OF PROGRAM B | SET #1 of M/H GROUPS 1, 5, 9 & 13 |
| 1ST TRANSMISSION OF PROGRAM A | SET #2 of M/H GROUPS 2, 6, 10 & 14 |
| 2ND TRANSMISSION OF PROGRAM A | SET #3 of M/H GROUPS 3, 7, 11 & 15 |

Fig. 6 Slot Allocations for a 2nd Transmitter in a 1st Network

IN FIGS. 5 & 6 THE 2ND TRANSMISSION OF PROGRAM A CAN BE REPLACED BY A 1ST TRANSMISSION OF PROGRAM C, & THE 2ND TRANSMISSION OF PROGRAM B CAN BE REPLACED BY A 1ST TRANSMISSION OF PROGRAM D. EACH OF THE PROGRAMS A, B, C & D CAN BE DIVIDED INTO SEVERAL SMALLER PROGRAMS OR COMBINED WITH AT LEAST 1 OTHER PROGRAM.

| 2ND TRANSMISSION OF PROGRAM A | SET #0 of M/H GROUPS 0, 4, 8 & 12 |
| --- | --- |
| 1ST TRANSMISSION OF PROGRAM B | SET #1 of M/H GROUPS 1, 5, 9 & 13 |
| 2ND TRANSMISSION OF PROGRAM B | SET #2 of M/H GROUPS 2, 6, 10 & 14 |
| 1ST TRANSMISSION OF PROGRAM A | SET #3 of M/H GROUPS 3, 7, 11 & 15 |

Fig. 7 Slot Allocations for a 3rd Transmitter in a 1st Network

| 2ND TRANSMISSION OF PROGRAM B | SET #0 of M/H GROUPS 0, 4, 8 & 12 |
| --- | --- |
| 1ST TRANSMISSION OF PROGRAM A | SET #1 of M/H GROUPS 1, 5, 9 & 13 |
| 2ND TRANSMISSION OF PROGRAM A | SET #2 of M/H GROUPS 2, 6, 10 & 14 |
| 1ST TRANSMISSION OF PROGRAM B | SET #3 of M/H GROUPS 3, 7, 11 & 15 |

Fig. 8 Slot Allocations for a 4th Transmitter in a 1st Network

IN FIGS. 7 & 8 THE 2ND TRANSMISSION OF PROGRAM A CAN BE REPLACED BY A 1ST TRANSMISSION OF PROGRAM C, & THE 2ND TRANSMISSION OF PROGRAM B CAN BE REPLACED BY A 1ST TRANSMISSION OF PROGRAM D. EACH OF THE PROGRAMS A, B, C & D CAN BE DIVIDED INTO SEVERAL SMALLER PROGRAMS OR COMBINED WITH AT LEAST 1 OTHER PROGRAM.

| 1ST TRANSMISSION OF PROGRAM A | SET #0 of M/H GROUPS 0, 4, 8 & 12 |
| --- | --- |
| 1ST TRANSMISSION OF PROGRAM B | SET #1 of M/H GROUPS 1, 5, 9 & 13 |
| 2ND TRANSMISSION OF PROGRAM A | SET #2 of M/H GROUPS 2, 6, 10 & 14 |
| 2ND TRANSMISSION OF PROGRAM B | SET #3 of M/H GROUPS 3, 7, 11 & 15 |

Fig. 9 Slot Allocations for a 1st Transmitter in a 2nd Network

| 1ST TRANSMISSION OF PROGRAM B | SET #0 of M/H GROUPS 0, 4, 8 & 12 |
| --- | --- |
| 2ND TRANSMISSION OF PROGRAM A | SET #1 of M/H GROUPS 1, 5, 9 & 13 |
| 2ND TRANSMISSION OF PROGRAM B | SET #2 of M/H GROUPS 2, 6, 10 & 14 |
| 1ST TRANSMISSION OF PROGRAM A | SET #3 of M/H GROUPS 3, 7, 11 & 15 |

Fig. 10 Slot Allocations for a 2nd Transmitter in a 2nd Network

IN FIGS. 9 & 10 THE 2ND TRANSMISSION OF PROGRAM A CAN BE REPLACED BY A 1ST TRANSMISSION OF PROGRAM C, & THE 2ND TRANSMISSION OF PROGRAM B CAN BE REPLACED BY A 1ST TRANSMISSION OF PROGRAM D. EACH OF THE PROGRAMS A, B, C & D CAN BE DIVIDED INTO SEVERAL SMALLER PROGRAMS OR COMBINED WITH AT LEAST 1 OTHER PROGRAM.

| 2ND TRANSMISSION OF PROGRAM A | SET #0 of M/H GROUPS 0, 4, 8 & 12 |
| --- | --- |
| 2ND TRANSMISSION OF PROGRAM B | SET #1 of M/H GROUPS 1, 5, 9 & 13 |
| 1ST TRANSMISSION OF PROGRAM A | SET #2 of M/H GROUPS 2, 6, 10 & 14 |
| 1ST TRANSMISSION OF PROGRAM B | SET #3 of M/H GROUPS 3, 7, 11 & 15 |

Fig. 11 Slot Allocations for a 3rd Transmitter in a 2nd Network

| 2ND TRANSMISSION OF PROGRAM B | SET #0 of M/H GROUPS 0, 4, 8 & 12 |
| --- | --- |
| 1ST TRANSMISSION OF PROGRAM A | SET #1 of M/H GROUPS 1, 5, 9 & 13 |
| 1ST TRANSMISSION OF PROGRAM B | SET #2 of M/H GROUPS 2, 6, 10 & 14 |
| 2ND TRANSMISSION OF PROGRAM A | SET #3 of M/H GROUPS 3, 7, 11 & 15 |

Fig. 12 Slot Allocations for a 4th Transmitter in a 2nd Network

IN FIGS. 11 & 12 THE 2ND TRANSMISSION OF PROGRAM A CAN BE REPLACED BY A 1ST TRANSMISSION OF PROGRAM C, & THE 2ND TRANSMISSION OF PROGRAM B CAN BE REPLACED BY A 1ST TRANSMISSION OF PROGRAM D. EACH OF THE PROGRAMS A, B, C & D CAN BE DIVIDED INTO SEVERAL SMALLER PROGRAMS OR COMBINED WITH AT LEAST 1 OTHER PROGRAM.

CR = CODE RATE OF OUTER CONVOLUTIONAL CODE
NoG = NO. OF GROUPS PER M/H SUB-FRAME IN M/H PARADE

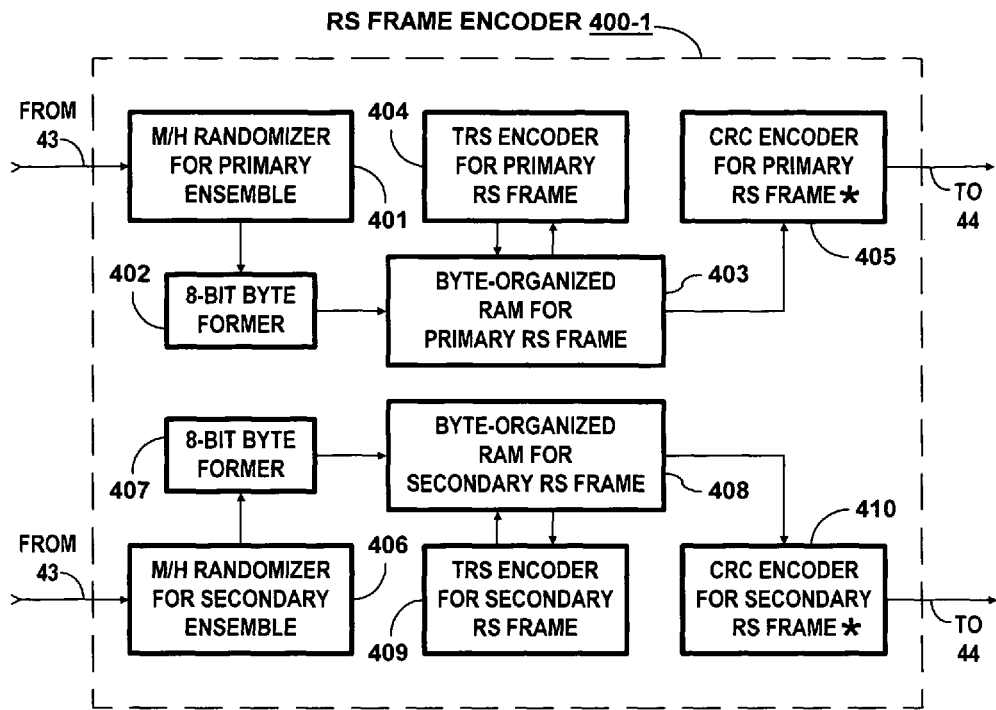

* IN SOME TRANSMITTERS CRC CODING INSERTS ONE CHECKSUM PER ROW OF BYTES IN THE RS FRAME, PER A/153. ALTERNATIVELY, THERE ARE AS MANY CHECKSUMS PER ROW AS GROUPS PER M/H SUB-FRAME. ANOTHER POSSIBILITY IS CRC CODEWORDS THAT HAVE A PRESCRIBED STANDARD NUMBER OF BYTES.

Fig. 16

Fig. 17  Bit Order in SCCC M/H Transmissions

D'S ARE DATA BITS.      P'S ARE PARITY BITS.

Fig. 18  Bit Order in PCCC M/H Transmissions

MULTIPLEXERS SELECT 0 INPUT FOR 2N SYMBOL EPOCHS AFTER THE M/H DATA BIT STREAM CONCLUDES, THUS TO IMPLEMENT ZERO FLUSHING.

Fig. 24 Bit Syntax of TPC in M/H Sub-Frames # 0 & # 1

| SYNTAX | BITS | FORMAT |
| --- | --- | --- |
| TPC_data in initial 2 M/H sub-Frames { | | |
| sub-Frame_number | 1 - 3 | uimsbf |
| Slot_number | 4 - 7 | uimsbf |
| Parade_id | 8 - 14 | uimsbf |
| current_starting_Group_number | 15 - 18 | uimsbf |
| current_number_of_Groups_minus_1 | 19 - 21 | uimsbf |
| Parade_Repetition_Cycle_minus_1 | 22 - 24 | uimsbf |
| current_RS_frame_mode | 25 - 26 | bslbf |
| current_RS_code_mode_primary | 27 - 28 | bslbf |
| current_RS_code_mode_secondary | 29 - 30 | bslbf |
| current_CCC_block_mode | 31 - 32 | bslbf |
| current_CCC_outer_code_mode_a | 33 - 34 | bslbf |
| current_CCC_outer_code_mode_b | 35 - 36 | bslbf |
| current_CCC_outer_code_mode_c | 37 - 38 | bslbf |
| current_CCC_outer_code_mode_d | 39 - 40 | bslbf |
| FIC_version | 41 - 45 | uimsbf |
| Parade_continuity_counter | 46 - 49 | uimsbf |
| current_total_number_of_Groups | 50 - 54 | uimsbf |
| Frames_of_iterative_diversity_delay | 55 - 57 | bslbf |
| extra_Slot_intervals_of_delay | 58 - 59 | uimsbf |
| M/H_data_not_ones'_complemented? | 60 | bslbf |
| iterative_diversity_mode | 61 - 62 | bslbf |
| subchannel_interleaving | 63 - 65 | bslbf |
| Z-sub-2_bits_in_M/H_data_precoded? | 66 | bslbf |
| reserved | 67 - 75 | all 1's |
| TPC_protocol_version_major_update | 76 - 77 | bslbf |
| TPC_protocol_version_minor_update | 78 - 80 | bslbf |
| } | | |

Fig. 25  Bit Syntax of TPC in M/H Sub-Frames # 2, # 3 & # 4

| SYNTAX | BITS | FORMAT |
|---|---|---|
| TPC_data in final 3 M/H sub-Frames { | | |
|   sub-Frame_number | 1 - 3 | uimsbf |
|   Slot_number | 4 - 7 | uimsbf |
|   Parade_id | 8 - 14 | uimsbf |
|   next_starting_Group_number | 15 - 18 | uimsbf |
|   next_number_of_Groups_minus_1 | 19 - 21 | uimsbf |
|   Parade_Repetition_Cycle_minus_1 | 22 - 24 | uimsbf |
|   next_RS_frame_mode | 25 - 26 | bslbf |
|   next_RS_code_mode_primary | 27 - 28 | bslbf |
|   next_RS_code_mode_secondary | 29 - 30 | bslbf |
|   next_CCC_block_mode | 31 - 32 | bslbf |
|   next_CCC_outer_code_mode_a | 33 - 34 | bslbf |
|   next_CCC_outer_code_mode_b | 35 - 36 | bslbf |
|   next_CCC_outer_code_mode_c | 37 - 38 | bslbf |
|   next_CCC_outer_code_mode_d | 39 - 40 | bslbf |
|   FIC_version | 41 - 45 | uimsbf |
|   Parade_continuity_counter | 46 - 49 | uimsbf |
|   next_total_number_of_Groups | 50 - 54 | uimsbf |
|   current_total_number_of_Groups | 55 - 59 | uimsbf |
|   M/H_data_not_ones'_complemented? | 60 | bslbf |
|   iterative_diversity_mode | 61 - 62 | bslbf |
|   subchannel_interleaving | 63 - 65 | bslbf |
|   Z-sub-2_bits_in_M/H_data_precoded? | 66 | bslbf |
|   reserved | 67 - 75 | all 1's |
|   TPC_protocol_version_major_update | 76 - 77 | bslbf |
|   TPC_protocol_version_minor_update | 78 - 80 | bslbf |
| } | | |

Fig. 26 Bit Syntax of RS_Frame_mode

| RS frame mode | Description |
|---|---|
| 00 | THERE IS ONLY A PRIMARY RS FRAME BEGINNING IN BLOCK 4 & CONCLUDING IN BLOCK 3 AFTER WRAP AROUND. |
| 01 | THERE IS A PRIMARY RS FRAME BEGINNING IN BLOCK 4 & CONCLUDING IN BLOCK 8 OR 9.<br>THERE IS A SECONDARY RS FRAME BEGINNING IN BLOCK 8 OR 9, & CONCLUDING IN BLOCK 3 AFTER WRAP AROUND |
| 10 | THERE IS ONLY A PRIMARY RS FRAME BEGINNING IN BLOCK 4 & CONCLUDING IN BLOCK 3 WITH NO WRAP AROUND. |
| 11 | THERE IS A PRIMARY RS FRAME BEGINNING IN BLOCK 4 & CONCLUDING IN BLOCK 8 OR 9.<br>THERE IS A SECONDARY RS FRAME BEGINNING IN BLOCK 8 OR 9, & CONCLUDING IN BLOCK 3 WITH NO WRAP AROUND. |

Fig. 27 Bit Syntax of RS_code_mode

| RS code mode | RS Code | Number of Parity Bytes (P) |
|---|---|---|
| 00 | (230, 182) | 48 |
| 01 | (230, 194) | 36 |
| 10 | (230, 206) | 24 |
| 11 | RESERVED | |

Fig. 28 Bit Syntax of CCC_outer_code_mode

| CCC outer code mode | Description |
|---|---|
| 00 | THE OUTER CODE RATE OF AN SCCC BLOCK IS 1/2. |
| 01 | THE OUTER CODE RATE OF AN SCCC BLOCK IS 1/4. |
| 10 | THE OUTER CODE RATE OF A CCC BLOCK IS 1/3. |
| 11 | THE OUTER CODE RATE OF A PCCC BLOCK IS 1/2 |

Fig. 29 Bit Syntax of iterative_diversity_delay

| iterative_diversity_delay | MEANING |
|---|---|
| 000 | NOT TO BE DELAYED ANY EXTRA M/H FRAMES |
| 001 | TO BE DELAYED 4 EXTRA M/H FRAMES |
| 010 | TO BE DELAYED 8 EXTRA M/H FRAMES |
| 011 | TO BE DELAYED 12 EXTRA M/H FRAMES |
| 100 | TO BE DELAYED 16 EXTRA M/H FRAMES |
| 101 | TO BE DELAYED 20 EXTRA M/H FRAMES |
| 110 | TO BE DELAYED 24 EXTRA M/H FRAMES |
| 111 | TO BE DELAYED 32 EXTRA M/H FRAMES |

Fig. 30 Bit Syntax of iterative_diversity_mode

| iterative_diversity_mode | MEANING |
|---|---|
| 00 | MIDDLE COMPONENT OF ITERATIVE-DIVERSITY TRANSMISSION |
| 01 | INITIAL COMPONENT OF ITERATIVE-DIVERSITY TRANSMISSION |
| 10 | FINAL COMPONENT OF ITERATIVE-DIVERSITY TRANSMISSION |
| 11 | SINGLE-TIME TRANSMISSION |

Fig. 31 Bit Syntax of subchannel_interleaving

| subchannel_interleaving | MEANING |
|---|---|
| 101 | 1ST TRANSMITTER, 1ST NETWORK, PER FIG. 5 |
| 110 | 2ND TRANSMITTER, 1ST NETWORK, PER FIG. 6 |
| 111 | 3RD TRANSMITTER, 1ST NETWORK, PER FIG. 7 |
| 100 | 4TH TRANSMITTER, 1ST NETWORK, PER FIG. 8 |
| 001 | 1ST TRANSMITTER, 2ND NETWORK, PER FIG. 9 |
| 010 | 2ND TRANSMITTER, 2ND NETWORK, PER FIG. 10 |
| 011 | 3RD TRANSMITTER, 2ND NETWORK, PER FIG. 11 |
| 000 | 4TH TRANSMITTER, 2ND NETWORK, PER FIG. 12 |

Fig. 37 RS Frame recovered from 10 M/H Groups of CCC

Fig. 38 RS Frame recovered from 15 M/H Groups of CCC

Fig. 39 RS Frame recovered from 20 M/H Groups of CCC

FIG. 43 A First Embodiment of Information-exchange Unit 150

FIG. 44 A Second Embodiment of Information-exchange Unit 150

Fig. 47  Method of Extracting IP Packets from Turbo Decoding Results

Fig. 48  Method of Turbo Decoding by FIG. 40 Turbo Decoder 130-1

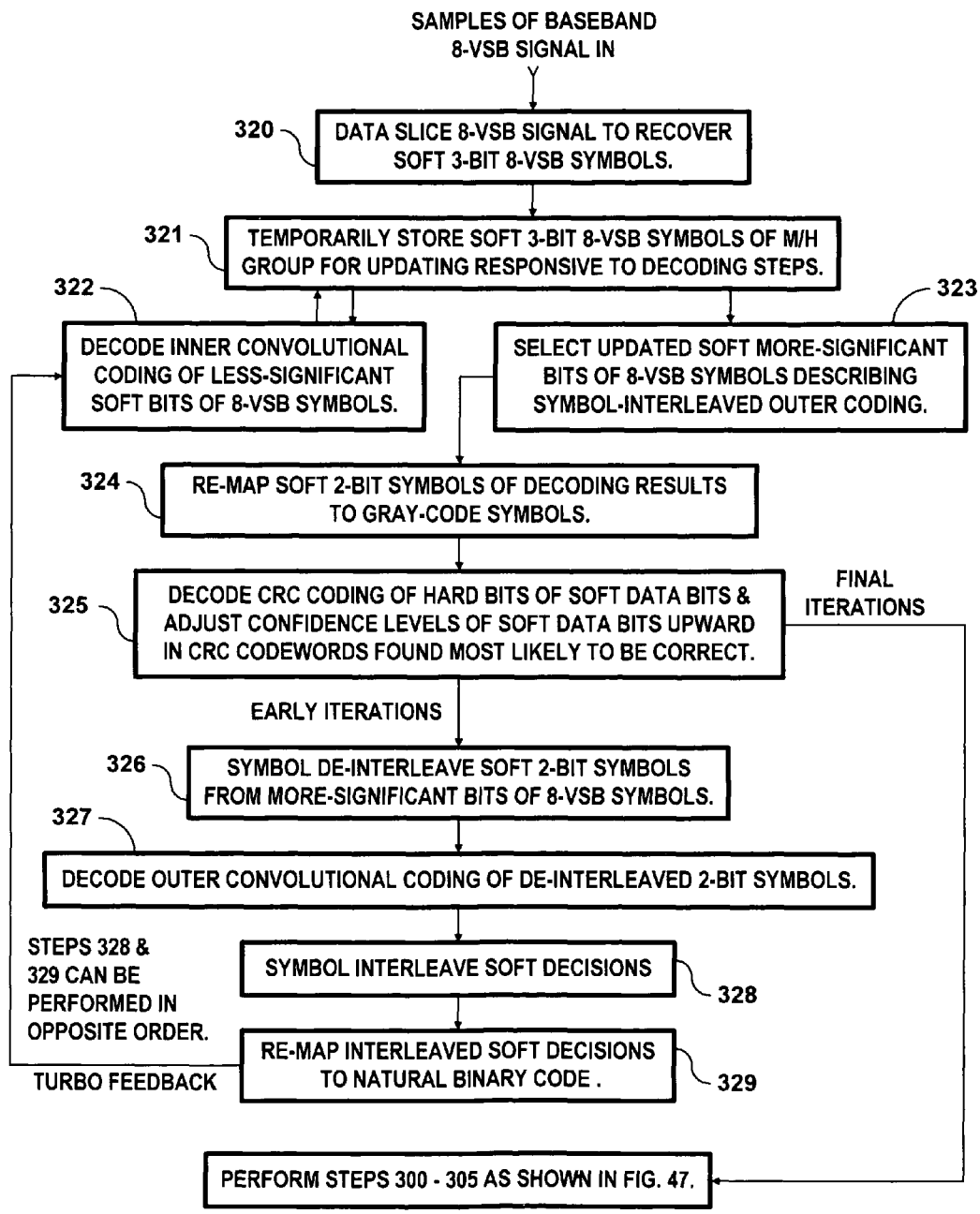
Fig. 50  Method of Turbo Decoding by FIG. 49 Turbo Decoder 130-2

BURST-ERROR CORRECTION METHODS AND APPARATUSES FOR WIRELESS DIGITAL COMMUNICATIONS SYSTEMS

This application claims the benefit of the filing dates of provisional U.S. Pat. App. Ser. No. 61/216,535 filed 18 May 2009, of provisional U.S. Pat. App. Ser. No. 61/217,887 filed 6 Jun. 2009, of provisional U.S. Pat. App. Ser. No. 61/280,626 filed 6 Nov. 2009, of provisional U.S. Pat. App. Ser. No. 61/283,673 filed 7 Dec. 2009, of provisional U.S. Pat. App. Ser. No. 61/335,246 filed 4 Jan. 2010, and of provisional U.S. Pat. App. Ser. No. 61/337,680 filed 11 Feb. 2010.

By way of specific example, the invention relates to transmitters for over-the-air broadcasting of digital television (DTV) signals, receivers for such broadcast DTV signals, and in particular those items as designed for implementing a system of broadcasting concatenated convolutionally coded (CCC) data to mobile and hand-held receivers, collectively referred to as "M/H" receivers.

BACKGROUND OF THE INVENTION

The Advanced Television Systems Committee (ATSC) published a Digital Television Standard in 1995 as Document A/53, hereinafter referred to simply as "A/53" for sake of brevity. ATSC published "ATSC Mobile DTV Standard, Parts 1-8" on 26 Oct. 2009 as Document A/153, hereinafter referred to simply as "A/153" for sake of brevity. A/153 specifies robust ancillary transmissions time-division multiplexed into 8VSB DTV, which ancillary signals are designed for reception by mobile receivers and by hand-held receivers that are referred to collectively as "M/H receivers". The ancillary data employ internet-protocol (IP) transport streams. The ancillary data are randomized and subjected to transverse Reed-Solomon (TRS) forward-error-correction (FEC) coding before serially concatenated convolutional coding (SCCC) that uses the 2/3 trellis coding of 8VSB as inner convolutional coding. This TRS FEC coding helps overcome temporary fading in which received signal strength momentarily falls below that needed for successful reception. The strongest TRS codes prescribed by A/153 can overcome such drop-outs in received signal strength that are as long as four tenths of a second.

Rows of data bytes and rows of parity bytes in the RS Frames of TRS-coded data are subjected to cyclic-redundancy-check (CRC) coding before SCCC. An M/H receiver can use the CRC coding as an error-locating code for the TRS FEC codewords. This permits the use of a Reed-Solomon decoding algorithm that can correct twice as many byte errors in each TRS codeword as an algorithm that must locate, as well as correct, byte errors. The SCCC coding is designed primarily for correcting errors arising from all-white-Gaussian noise (AWGN) or similar noise, and the TRS FEC coding is relied on for the correction of errors arising from sustained burst noise. The TRS FEC coding is quite effective in overcoming drop-outs in received signal strength that cause sustained burst noise leading to the loss or severe corruption of as much as two complete M/H sub-Frames of the received signal. There are five sub-Frames in each 986 milliseconds long M/H Frame.

The capability of the TRS FEC coding to correct frequently occurring shorter noise bursts is compromised, however, by the symbol interleaving employed between the outer convolutional coding and inner convolutional coding of the SCCC. This symbol interleaving disperses a noise burst occurring in a single data segment over several data segments that share the same Block of symbol interleaving. This tends to increase the number of rows in the RS Frame in which the CRC codes indicate byte error. When the TRS codewords all use the same CRC codes for error location, a modest sprinkling of short burst errors throughout the RS Frame may overwhelm the two-dimensional FEC decoding. The TRS decoders can be designed to change to an error-locating-and-error-correcting FEC decoding algorithm when this occurs. However, the performance of such an algorithm will also be compromised by the dispersal of burst errors by the symbol interleaving employed between the outer convolutional coding and inner convolutional coding of the SCCC. Such dispersal will cause more byte errors in TRS FEC codewords.

The symbol interleaving that follows outer convolutional coding in the M/H transmitter constructed in accordance with A/153 has two functions. It introduces time diversity between the single-phase outer convolutional coding and the inner convolutional coding afforded by the 12-phase trellis decoder, which is the sine qua non of SCCC. The symbol interleaving also compensates for complementary symbol de-interleaving in the M/H receiver. The symbol de-interleaving in the M/H receiver disperses lateral burst noise that accompanies the received SCCC and affects inner convolutional coding. Hopefully, the outer convolutional decoding will then be better able to overcome fragments of that lateral burst noise as so dispersed. The inventor noted that neither of these functions is affected by the order in which data is supplied for outer convolutional coding in the transmitter.

This validated his speculation that the dispersal of burst noise by the symbol de-interleaving in the M/H receiver might be overcome if the randomized M/H data were de-interleaved before outer convolutional coding of them. That is, so as to compensate against the subsequent symbol interleaving of the outer convolutional coding before inner convolutional coding. The inventor contemplated the M/H receiver being modified to interleave the randomized de-interleaved M/H data that would be recovered by the decoder for the outer convolutional coding before making hard decisions concerning the randomized M/H data. Since symbol interleaving of the results of decoding of the outer convolutional coding is customary in turbo decoding procedures anyway, the M/H receiver would require no substantial increase in size or complexity, the inventor perceived. The only change in receiver design would be an insightful relocation of the point in the turbo-decoding loop from which to extract input signal for the hard-decision unit.

The output signal from the hard-decision unit in a M/H receiver modified as described in the preceding paragraph comprises randomized IP transport stream (TS) packets that are written to rows of a framestore used for decoding the two-dimensional RS-CRC coding. Since these randomized IP transport streams are collateral with burst noise, fewer of them will contain burst noise for correction by the TRS FEC decoding procedures. Accordingly, if TRS FEC coding is unable to correct byte errors, it is likely that fewer IP TS packets will contain byte error than was the case with transmissions as specified by A/153.

The principal design task for the transverse Reed-Solomon (TRS) coding used in the RS Frames prescribed by A/153 is overcoming drop-outs in received strength caused by reception nulls when the receiver is moved through an electromagnetic field subject to multipath reception. However, the shortened 255-byte Reed-Solomon (RS) codes used for TRS coding are very powerful codes for correcting shorter burst errors, especially when used together with codes for locating byte errors. If RS codes are relieved of having to locate byte errors as well as correct them, RS codes can correct as many byte errors within each of them as each has parity bytes. If RS codes have to locate byte errors as well as correct them, they can correct only one-half as many byte errors within each of them as each has parity bytes. Providing a sufficient number of parity bytes in each RS code to implement the principal design task for TRS coding requires a significant investment in reduced M/H payload. So, care should be taken to maximize the return from that investment.

A/153 prescribes two-dimensional coding of RS Frames of randomized M/H data in which the bytes in each RS frame are cyclically redundantly coded row by row to form respective cyclical redundant code (CRC) codewords. These row-long CRC codewords can be used as error-locating codes for the TRS codewords, but only in common, on a collectively shared basis. This works reasonably well when overcoming protracted drop-outs in received strength caused by reception nulls when the receiver is moved through an electromagnetic field subject to multipath reception. These protracted errors typically extend over several rows of bytes in the RS Frame and affect all TRS codewords in the RS Frame.

Each occurrence of shorter burst noise is apt to affect only some of the TRS codewords in the RS Frame. Several occurrences of such shorter burst noise are apt to occur in some RS Frames. The row-long CRC codewords will respond to each occurrence of shorter burst noise to locate a byte error in every one of the TRS codewords in the RS Frame. Several occurrences of shorter burst noise in an RS Frame can cause the row-long CRC codewords to locate more possible byte-error locations than can be accommodated by a TRS decoder using a byte-error-correction-only decoding algorithm for correcting TRS codewords. The TRS decoder can be designed so as then to switch over to a byte-error-location-and-correction decoding algorithm for correcting TRS codewords. However, as noted above, the byte-error-correction capability of the TRS decoder is halved by switching over to a byte-error-location-and-correction decoding algorithm.

Using shorter cyclical redundant coding (CRC) codewords in each row of the RS Frame is likely to result in fewer TRS codewords requiring the switch-over to a decoding algorithm that provides both location and correction of erroneous bytes. If the RS Frame is coded in a number 5M of M/H Groups, M being an integer more than one, each row of bytes in the RS Frame is preferably apportioned into M or a prescribed multiple of M CRC codewords. These shorter RS codewords have utility in improving turbo decoding of the concatenated convolutional coding (CCC) for M/H receivers, particularly when parallel concatenated convolutional coding (PCCC) is used rather than the serial concatenated convolutional coding (SCCC) prescribed by A/153. PCCC transmissions at code rate one-half the 8-VSB symbol rate are preferred for iterative-diversity and frequency-diversity reception, as described by A. L. R. Limberg in his patent application Ser. No. 12/580, 534 filed on 16 Oct. 2009 and titled "Digital Television Systems Employing Concatenated Convolutional Coded Data".

CRC codes can be used to check whether or not strings of data bits in the results of decoding outer convolutional coding of a PCCC transmission at code rate one-half the 8-VSB symbol rate are presumably correct. Those strings of data bits with checksums indicating they are very likely to be correct can have the confidence levels associated with their parent soft bits heightened. Re-interleaving will scatter the parent soft bits descriptive of data that have the heightened confidence levels throughout the extrinsic information fed back via the turbo loop, to be used in the next iteration of decoding of inner convolutional coding by a turbo decoder. When the CRC codes indicate that substantially all the strings of data bits in the results of decoding outer convolutional coding of the PCCC transmission are very likely to be correct, this information can be used to discontinue the iterative procedures associated with turbo decoding the PCCC.

Suggestions have been made by some ATSC members to include further FEC coding of the IP transport stream to correct remnant errors in the rows of bytes from RS Frames supplied to later stages of the M/H receiver: The inventor observes that the problem with the proposed further FEC coding is that it is not transverse to the direction of the running errors that characterize the decoding of the outer convolutional coding of CCC when symbol interleaving is done per A/153. There is no interleaving to break up running errors insofar as the further FEC coding of the IP transport stream is concerned.

SUMMARY OF THE INVENTION

A transmitter for 8VSB digital television (DTV) signals that incorporate M/H Groups of concatenated convolutionally coded (CCC) data is constructed in accordance with an aspect of the invention to include apparatus for de-interleaving the bits of randomized ancillary data before their outer convolutional coding to offset the symbol interleaving of the outer convolutional coding results before their inner convolutional coding. This results in the ancillary data being transmitted so as to be collateral with burst noise arising from momentary loss of signal or electrical disturbances.

Other aspects of the invention concern receivers for CCC data time-division multiplexed within 8VSB DTV signals, which receivers turbo decode CCC M/H Group data in a novel way. Hard-decision decoding results are extracted from the turbo loop after symbol-interleaving soft-decision decoding results from the decoder for the outer convolutional coding, rather than being extracted directly from the soft-decision decoding results from the decoder for the outer convolutional coding: Running errors occurring in the soft-decision decoding results from the decoder for the outer convolutional coding are broken up by this subsequent symbol-interleaving. This is generally beneficial to decoding any forward-error-correction (FEC) coding of the IP transport stream.

Still other aspects of the invention concern receivers for CCC data time-division multiplexed within 8VSB DTV signals, in which receivers the cyclical-redundant-code (CRC) codewords are decoded and used to strengthen the soft decisions concerning data bits in the CRC codewords found to be correct. Instead of using the CRC codewords to locate erroneous bytes, the soft decisions are processed to be used for locating byte errors for the transverse Reed-Solomon (TRS) codes on an individual basis. In preferred embodiments of such an M/H receiver, the RS decoder for the TRS codewords initially processes each TRS codeword using a byte-error-location-and-correction decoding algorithm. If the TRS codeword has too many byte errors to be corrected by this algorithm, the selected decoder then resorts to a byte-error-correction-only decoding algorithm that relies on the byte errors being located based on the confidence levels of soft data bits generated during turbo decoding procedures.

BRIEF DESCRIPTION OF THE DRAWING

FIGS. 5, 6, 7 and 8 are tables showing a first way of allocating Slots to transmissions for iterative-diversity and frequency-diversity reception.

FIGS. 9, 10, 11 and 12 are tables showing a second way of allocating Slots to transmissions for iterative-diversity and frequency-diversity reception.

FIG. 16 is a detailed schematic diagram of a representative embodiment of one of the RS Frame encoders in the FIG. 4 M/H Frame encoder, which RS Frame encoder combines TRS coding of columns of bytes in the RS Frame with CRC coding of the rows of bytes.

FIG. 17 is a diagram of the bit order in half-rate outer convolutional coding when M/H data are encoded in SCCC.

FIG. 18 is a diagram of the bit order in half-rate outer convolutional coding when M/H data are encoded in PCCC.

FIG. 24 is a table depicting a representative bit syntax for the Transmission Parameter Channel (TPC) that the novel signaling encoder of the FIG. 1 DTV transmitter apparatus uses during the initial two sub-Frames of each M/H Frame, which bit syntax includes novel indications of the differential delay between pairs of signals received during diversity reception.

FIG. 25 is a table depicting a representative bit syntax for the Transmission Parameter Channel (TPC) that the novel signaling encoder of the FIG. 1 DTV transmitter apparatus uses during the final three sub-Frames of each M/H Frame.

FIG. 26 is a table showing a bit syntax for a CCC_outer_code_mode that the FIG. 24 and FIG. 25 TPC tables use in place of the SCCC_outer_code_mode used in the TPC tables specified by A/153.

FIG. 27 is a table depicting a detailed bit syntax of the RS_Frame_mode field included in each of the FIG. 24 and FIG. 25 bit syntax tables for TPC.

FIG. 28 is a table depicting a detailed bit syntax of the RS_code_mode field included in each of the FIG. 24 and FIG. 25 bit syntax tables for TPC.

FIG. 29 is a table depicting a detailed bit syntax of a novel iterative_diversity_mode field included in each of the FIG. 24 and FIG. 25 bit syntax tables for TPC.

FIG. 30 is a table depicting a detailed bit syntax of a novel iterative_diversity_delay field included in each of the FIG. 24 and FIG. 25 bit syntax tables for TPC.

FIG. 31 is a table depicting a detailed bit syntax of a novel subchannel_interleaving field included in each of the FIG. 24 and FIG. 25 bit syntax tables for TPC.

FIG. 50 is a flow chart illustrating the basic decoding method performed by one of the paralleled turbo decoders of FIG. 49 and a subsequent RS-Frame decoder, when receiving single-time M/H transmissions at a code rate one-half the 8-VSB symbol rate.

Figure 1:
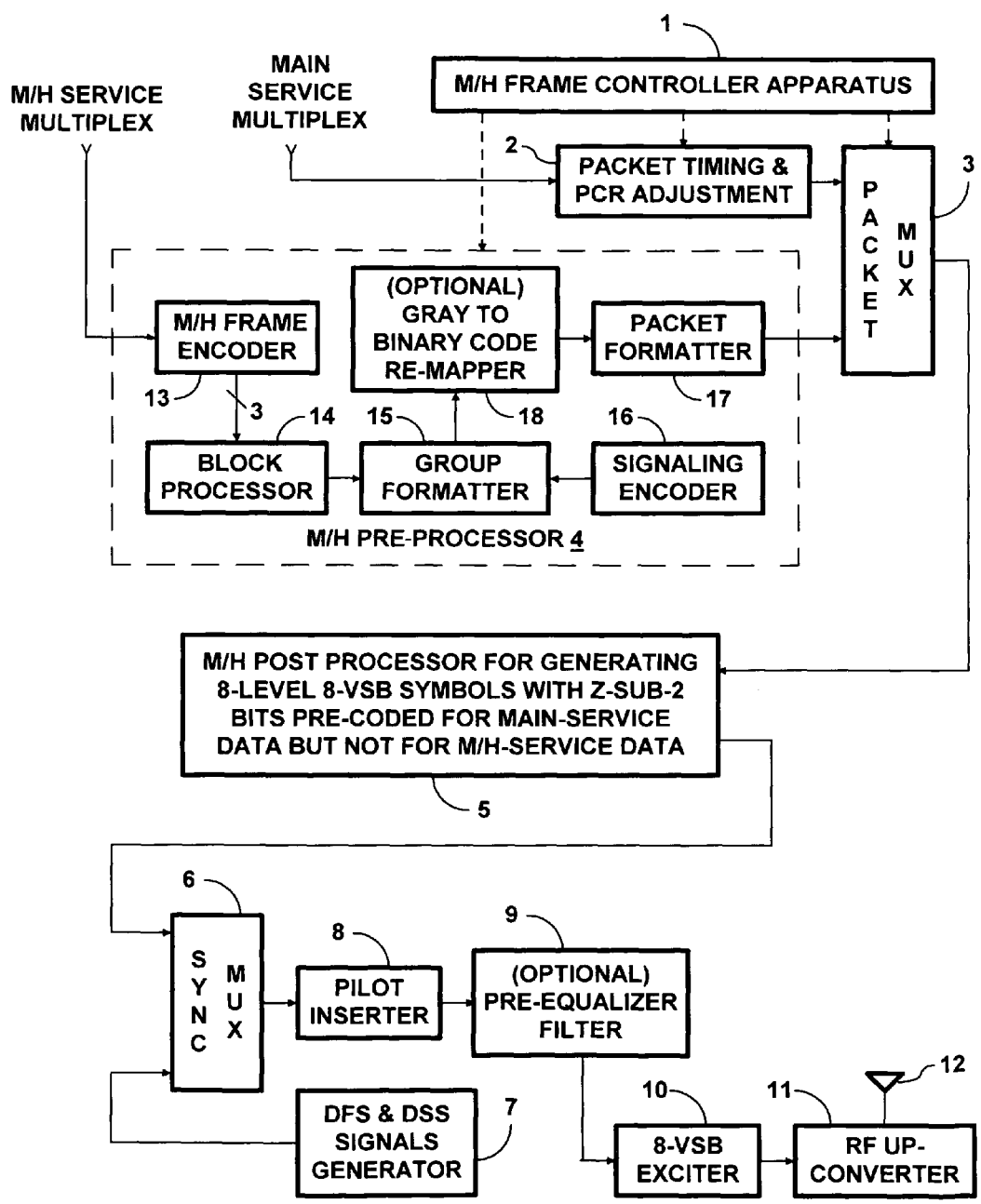
FIG. 1 is a schematic diagram of DTV transmitter apparatus in which interference filter pre-coding of Z-sub-2 bits is discontinued during the transmission of coded M/H data.

Connections for control signals are indicated by successions of short dashes, although not all control signal connections are explicitly shown. Shim delays that a person of ordinary skill in the art would customarily introduce to make signal timings precisely correct in some instances are apt to be omitted in the figures of the drawing. Such omissions are made to conform to drafting limitations and to keep the figures easier to understand.

DETAILED DESCRIPTION

FIG. 1 shows transmitter apparatus for broadcast DTV signals including those intended for reception by mobile receivers and by hand-held receivers, which receivers are collectively referred to as "M/H receivers". The transmitter apparatus receives two sets of input streams, one composed of the MPEG TS packets of the main-service data and the other composed of IP TS packets of the M/H-service data. The M/H-service data are encapsulated in 208-byte-long MPEG-like TS packets before emission, which MPEG-like TS packets are called "M/H encapsulating packets" or "MHE packets". This avoids disrupting the reception of the main-service data by legacy 8VSB receivers. The FIG. 1 transmitter apparatus combines the MPEG TS packets of the main-service data and the IP TS packets of the M/H-service data within one stream of MPEG or MPEG-like TS packets, then processes the combined stream for transmission as an ATSC trellis-coded 8VSB signal.

M/H Frame controller apparatus 1 controls these procedures. The main-service multiplex stream of data is supplied to packet timing and PCR adjustment circuitry 2 before the packets of that stream are routed to a packet multiplexer 3 to be time-division multiplexed with MHE packets encapsulating M/H-service data. (PCR is the acronym for "Program Clock Reference".) Because of their time-division multiplexing with the MHE packets encapsulating M/H-service data, changes have to be made to the time of emission of the main-service stream packets compared to the timing that would occur with no M/H stream present. The packet timing and PCR adjustment circuitry 2 makes these timing changes responsive to control signals supplied thereto from the M/H Frame controller apparatus 1. The packet multiplexer 3 time-division multiplexes the main-service TS packets with TS packets encapsulating M/H-service data, as directed by control signals from the M/H Frame controller apparatus 1. The operations of the M/H transmission system on the M/H data are divided into two stages: the M/H pre-processor 4 and the M/H post-processor 5.

The M/H-service multiplex stream of data is supplied to the M/H pre-processor 4 for processing. The pre-processor 4 rearranges the M/H-service data into an M/H data structure, enhances the robustness of the M/H-service data by additional coding procedures, inserts training sequences, and subsequently encapsulates the processed enhanced data within MHE packets, thus to generate an ancillary transport stream (TS). The MHE transport-stream packets are supplied to the packet multiplexer 3 after data encapsulation within their payload fields is completed. The operations performed by the pre-processor 4 include M/H Frame encoding, block processing, Group formatting, optional Gray-code-to-natural-binary-code conversion, packet formatting, and encoding M/H signaling. The M/H Frame controller apparatus 1 provides the necessary transmission parameters to the pre-processor 4 and controls the multiplexing of the main-service data packets and the M/H-service data packets by the packet multiplexer 3 to organize the M/H Frame. Preferably, the pre-processor 4 differs from that described in A/153 in regard to the M/H Frame encoding, in regard to the block processing and in regard to Gray-code-to-natural-binary-code conversion. The block processing includes capability for the generation of parallel concatenated convolutional coding (PCCC) that has half the code rate of 8-VSB transmissions of the type originally prescribed by A/53.

The post-processor 5 processes the main-service data by normal 8-VSB encoding and re-arranges the pre-processed M/H-service data in the combined stream to assure backward compatibility with ATSC 8-VSB. The post-processor 5 differs from that described in A/153 in that pre-coding of the most significant bits of 8-VSB symbols is disabled when the symbols describe M/H-service data. Consequently, receivers need not use post-comb filtering of the most significant bits of 8-VSB symbols during reception of M/H transmissions, avoiding the loss in signal-to-noise ratio associated with such filtering. Disabling the pre-coding of the most significant bits of 8-VSB symbols descriptive of M/H-service data allows the use of Gray-code labeling of outer convolutional coding of the CCC and also allows the use of PCCC. The most significant bits of 8-VSB symbols descriptive of main-service data are pre-coded, so as not to disrupt the operation of legacy receivers. Main-service data in the combined stream are processed exactly the same way as for ordinary 8-VSB transmission: randomizing, Reed-Solomon (RS) encoding, convolutional byte interleaving, and trellis encoding. The M/H-service data in the combined stream are processed differently from the main-service data, with the pre-processed M/H- service data bypassing data randomization. The pre-processed M/H-service data are subjected to non-systematic RS encoding, which re-arranges the bytes of that data within RS codewords. The non-systematic RS encoding allows the insertion of the regularly spaced long training sequences so as not to disrupt the operation of legacy receivers. Additional operations are done on the pre-processed M/H-service data to initialize the trellis encoder memories at the beginning of each training sequence included in the pre-processed M/H-service data.

A synchronization multiplexer 6 is connected for receiving, as the first of its two input signals, the 2/3 trellis-coded data generated by the post-processor 5. The sync multiplexer 6 is connected for receiving its second input signal from a generator 7 of synchronization signals comprising the data segment sync (DSS) and the data field sync (DFS) signals. Per custom, the DSS and DFS signals are time-division multiplexed with the 2/3 trellis-coded data in the output signal from the sync multiplexer 6, which is supplied to a pilot inserter 8 as input signal thereto. The pilot inserter 8 introduces a direct-component offset into the signal to cause a pilot carrier wave to be generated during subsequent balanced modulation of a suppressed intermediate-frequency (IF) carrier wave. The output signal from the pilot inserter 8 is a modulating signal with offset, which optionally is passed through a pre-equalizer filter 9 before being supplied as input signal to an 8-VSB exciter 10 to modulate the suppressed IF carrier wave. Alternatively, the pre-equalizer filter 9 precedes the pilot inserter 8 in their cascade connection with each other. Other transmitter designs omit the pre-equalizer filter 9 in favor of a direct connection. The 8-VSB exciter 10 is connected for supplying the suppressed IF carrier wave to a radio-frequency (RF) up-converter 11 to be converted upward in frequency to repose within the broadcast channel. The up-converter 11 also amplifies the power of the RF signal it applies to a broadcast antenna 12.

More specifically, the M/H pre-processor 4 comprises an M/H Frame encoder 13, a block processor 14, a Group formatter 15, a signaling encoder 16, a packet formatter 17 and optionally a Gray-code-to-binary-code re-mapper 18. The M/H-service multiplex stream of data supplied to the M/H pre-processor 4 is applied as input signal to the M/H Frame encoder 13, which provides transverse Reed-Solomon (TRS) coding of data packets. The data packets can also be subjected to periodic cyclic-redundancy-check (CRC) coding to locate byte errors for the TRS coding. Each M/H Frame is composed of one or two frames of the TRS coding. The data in each frame of the TRS-CRC coding are randomized independently from each other and from the data of the main-service multiplex. In a departure from A/153 prescribed by patent application Ser. No. 12/580,534 filed 16 Oct. 2009, when CCC transmissions are made at one-half 8-VSB symbol rate, the CRC byte-error-location coding is done for the M/H Groups in an M/H Frame on an individual basis, rather than on a collective basis. This is particularly advantageous for PCCC transmissions, since it mitigates any BER floor problem that is experienced during reception of such transmissions. An alternative departure from A/153 is to use CRC codewords each of which consists of a predetermined number of bytes.

The M/H Frame encoder 13 is connected for supplying TRS-CRC-coded randomized M/H-service data to the block processor 14, as input signal thereto. The block processor 14 includes encoders for each type of single-phase outer convolutional coding used for SCCC M/H transmissions and a subsequent symbol interleaver for successive bit pairs of each type of single-phase outer convolutional coding. Furthermore, the block processor 14 includes an encoder for the outer convolutional coding used for PCCC M/H transmissions at a code rate one half the 8-VSB symbol rate. The outer convolutional coding used for PCCC M/H transmissions can be single-phase. Alternatively, it can be 12-phase.

The Group formatter 15 is connected for receiving the interleaved outer convolutional coding from the block processor 14 as input addressing signal. The Group formatter 15 includes an interleaved Group format organizer that operates on the Group format as it will appear after the ATSC data interleaver. The interleaved Group format organizer maps the FEC coded M/H-service data from the block processor into the corresponding M/H blocks of a Group, adding pre-determined training data bytes and data bytes to be used for initializing the trellis encoder memories. The interleaved Group format organizer inserts headers for the MHE packets, preferably truncated to just 2-byte length to accommodate more bytes of M/H data in those packets. The interleaved Group format organizer also inserts place-holder bytes for main-service data and for non-systematic RS parity. The interleaved Group format organizer inserts a few dummy bytes to complete construction of the intended Group format. The interleaved Group format organizer assembles a group of 118 consecutive TS packets. Some of these TS packets are composed of the interleaved outer convolutional coding supplied by the block processor 14. A signaling encoder 16 generates others of these TS packets.

Still others of these TS packets are prescribed training signals stored in read-only memory within the Group formatter 15 and inserted at prescribed intervals within the group. The prescribed training signals inserted by the Group formatter 15 in FIG. 1 will differ from those described in A/153 if the Z-sub-2 bits of the training signal symbols are modified to take into account the pre-coding of those bits being selectively discontinued during M/H signals. The apparatus for selective discontinuation of such pre-coding is described in more detail further on in this specification, with reference to FIG. 3 of the drawing. However, because transmitter apparatus constructed for implementing A/153 is already in the field, it is more likely that the Z-sub-2 bits of the training signal symbols will be pre-coded, avoiding the Group formatter 15 having to be modified in this regard.

The M/H transmission system has two kinds of signaling channels generated by the signaling encoder 16. One is the Transmission Parameter Channel (TPC), and the other is the Fast Information Channel (FIC). The TPC is for signaling the M/H transmission parameters such as various FEC modes and M/H Frame information. The FIC is provided to enable a receiver to acquire a broadcast service quickly, and the FIC contains cross-layer information between the physical layer of the receiver and its upper layer(s). The "physical layer" of the receiver is that portion of the receiver used to recover the IP transport stream, and the succeeding "upper layer" processes the IP transport stream. The TPC and FIC signals are encoded within parallel concatenated convolutional coding that has a code rate one-quarter the 8-VSB symbol rate.

Within the Group formatter 15 the interleaved Group format organizer is followed in cascade connection by a byte de-interleaver that complements the ATSC convolutional byte interleaver. The Group formatter 15 is connected for supplying the response of this de-interleaver as its output signal, which is applied as input signal to the Gray-code-to-binary-code re-mapper 18. The Gray-code-to-binary-code re-mapper 18 recodes 2-bit symbols of its input signal which is considered to be in reflected-binary (Gray) code to the natural-binary code that governs the modulating signal used in 8-VSB amplitude modulation. This implements a procedure known as "Gray-code labeling". The conversion is performed by exclusive-ORing the least significant bit (LSB) of each 2-bit symbol of the re-mapper 18 input signal with the most significant bit (MSB) thereof to generate the LSB of the re-mapper 18 output signal. The MSB of the re-mapper 18 output signal reproduces the MSB of the re-mapper 18 input signal. The MSB and the LSB of the re-mapper 18 output signal respectively correspond to bits referred to as the "X-sub-2 bit" and the "X-sub-1 bit" during subsequent trellis coding procedure. The Gray-code-to-binary-code re-mapper 18 recodes the quarter-rate PCCC encoding the TPC and FIC signals unless provision is made for the re-mapper 18 not to do so. The re-mapper 18 output signal is supplied to the packet formatter 17.

The inclusion of the Gray-code-to-binary-code re-mapper 18 in the FIG. 1 transmitter apparatus is optional. If the re-mapper 18 is not included, the output signal from the Group formatter 15 is supplied directly to the packet formatter 17 as input signal thereto. In an initial procedure therein, the packet formatter 17 expunges the main-service data place holders and the RS parity place holders that were inserted by the interleaved Group format organizer for proper operation of the byte de-interleaver in the Group formatter 15. The packet formatter 17 inserts an MPEG TS sync byte before each 187-byte data packet as a prefix thereof. The packet formatter 17 supplies 118 M/H-service transport-stream packets per group to the packet multiplexer 3, which time-division multiplexes the M/H-service TS packets and the main-service TS packets to construct M/H Frames.

The M/H Frame controller apparatus 1 controls the packet multiplexer 3 in the following way when the packet multiplexer schedules the 118 TS packets from the packet formatter 17. Thirty-seven packets immediately precede a DFS segment in a 313-segment VSB field of data, and another eighty-one packets immediately succeed that DFS segment. The packet multiplexer 3 reproduces next-in-sequence main-service TS packets in place of MPEG null packets that contain place-holder bytes for main-service data in their payload fields. The packet multiplexer 3 is connected to supply the TS packets it reproduces to the M/H post-processor 5 as input signal thereto.

Figure 2:
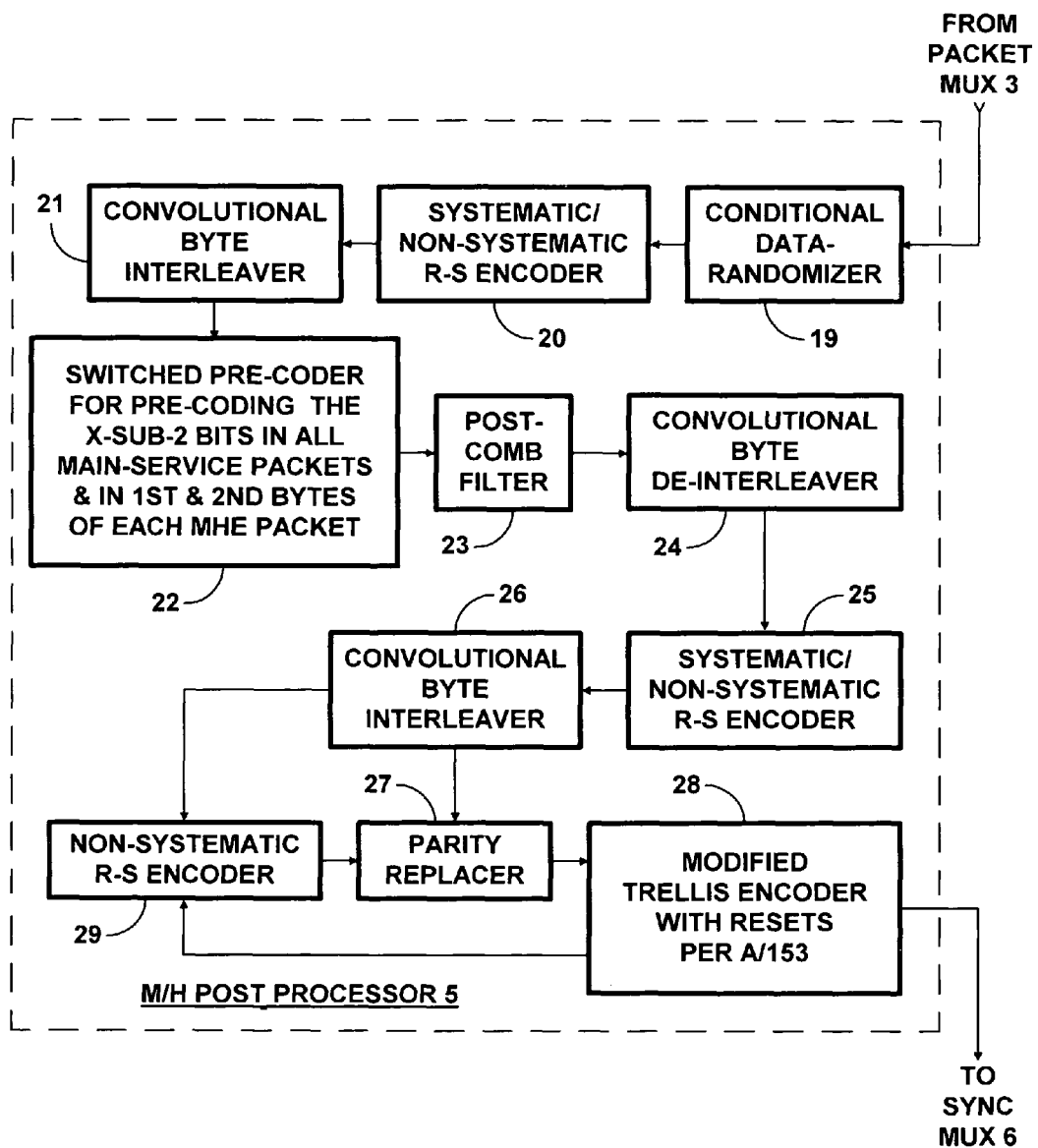
FIG. 2 is a detailed schematic diagram of a representative embodiment of the M/H post-processor in the FIG. 1 DTV transmitter apparatus, which M/H post-processor discontinues interference filter pre-coding of Z-sub-2 bits during the transmission of coded M/H data.

FIG. 2 shows in more detail a representative construction of the M/H post-processor 5, which includes a conditional data randomizer 19. FIG. 2 shows the packet multiplexer 3 connected to apply the TS packets it reproduces to the conditional data randomizer 19 as the input signal thereto. The conditional data randomizer 19 suppresses the sync bytes of the 188-byte TS packets and randomizes the remaining data in accordance with conventional 8-VSB practice, but only on condition that it is not within an M/H-service TS packet. The M/H-service TS packets bypass data randomization by the conditional data randomizer 19. The other remaining data are randomized per A/53, Annex D, §4.2.2. The conditional data randomizer 19 is connected for supplying the conditionally randomized data packets that it generates to an encoder 20 for preliminary systematic and non-systematic (207, 187) Reed-Solomon coding. The systematic/non-systematic Reed-Solomon encoder 20 is connected for supplying the resulting segments of the data field generated therein as input signal to a convolutional byte interleaver 21 of the type specified in Section 5.3.2.10 "Convolutional Data Byte Interleaver" of Part 2 of A/153 or of a type equivalent in function. The byte-interleaver 21 response is supplied as a serial stream of 2-bit symbols, each composed of a respective X-sub-2 bit and a respective X-sub-1 bit. This serial stream of 2-bit symbols is applied as input signal to a switched interference-filter pre-coder 22 for precodinq all the X-sub-2 bits of the main-service data and the X-sub-2 bits of the first two bytes of MHE packets. The pre-coder 22 provides selective pre-coding of the X-sub-2 bits received as input signal, skipping over the X-sub-2 bits of the M/H-service data in the final 205 bytes of MHE packets. If the Group formatter 15 inserts M/H training signals that have their X-sub-2 bits already pre-coded, the pre-coder 22 skips over pre-coding those X-sub-2 bits as well. If the Group formatter 15 inserts M/H training signals that do not have their X-sub-2 bits already pre-coded, the pre-coder 22 pre-codes those X-sub-2 bits. The pre-coder 22 response is applied as input signal to a post-comb filter 23 similar to those used in DTV receivers, and the post-comb filter 23 response is applied as input signal to a convolutional byte de-interleaver 24 of a type complementary to the convolutional byte interleaver 21. Except for changes that may be subsequently introduced into a few of the MHE packets during deterministic trellis resetting, the response of the convolutional byte de-interleaver 24 resembles the data segments that a DTV receiver is expected to supply to its decoder of (207, 187) Reed-Solomon forward-error-correction coding, presuming that the X-sub-2 bits of M/H data are not pre-coded.

An encoder 25 for systematic and non-systematic (207, 187) Reed-Solomon coding is connected to receive, as its input signal, the 187-byte packets supplied as portions of the output signal from the convolutional byte de-interleaver 24. The R-S encoders 22 and 25 are similarly constructed. The RS parity generator polynomial and the primitive field generator for the Reed-Solomon encoders 22 and 25 are the same as those that A/53, Annex D, FIG. 13 prescribes for (207, 187) Reed-Solomon coding. When the RS encoder 25 receives a main-service data packet, the RS encoder 25 performs the systematic RS coding process prescribed in A/53, Annex D, §4.2.3. The resulting twenty bytes of RS parity data are appended to the conclusion of the 187-byte packet in the main-service data packet subsequently appearing at the output port of the time-division multiplexer 26. When the RS encoder 25 receives an M/H-service data packet, the RS encoder 25 performs a non-systematic RS encoding process. The twenty bytes of RS parity data obtained from the non-systematic RS encoding process are inserted in various parity byte locations within each M/H-service TS packet subsequently appearing at the output port of the time-division multiplexer 26. These insertions correspond to what A/153 prescribes for M/H-service TS packets similarly located within an 8-VSB data field.

A convolutional byte interleaver 26 is connected for receiving as its input signal the 207-byte RS codewords supplied from the output port of the Reed-Solomon encoder 25. The byte interleaver 26 is the type specified in Section 5.3.2.10 "Convolutional Data Byte Interleaves" of Part 2 of A/153 or an equivalent thereof. The byte interleaver 26 is connected for supplying byte-interleaved 207-byte RS codewords to a parity replacer 27 that reproduces portions of those codewords in its response supplied to a switched trellis encoder 28 as input signal thereto. A modified trellis encoder 30 as specified by A/153 converts the byte-unit data from the parity replacer 27 to successive 2-bit symbols and performs a 12-phase trellis coding process on those symbols. The modified trellis encoder 28 is connected for supplying its output signal as the output signal from the M/H post-processor 5 that is applied as input signal to the sync multiplexer 6 shown in FIG. 1.

In order for the output signal from the trellis encoder 28 to include pre-defined known training data, initialization of the memories in the trellis encoder 28 is required, as described in A/153. This initialization is very likely to cause the RS parity data calculated by the RS encoder 25 prior to the trellis initialization to be erroneous. The RS parity data must be replaced to ensure backward compatibility with legacy DTV receivers. Accordingly, as described in A/153, Part 2, §5.3.2.11 "Modified Trellis Encoder", the switched trellis encoder 28 is connected for supplying the changed initialization bytes to an encoder 29 for non-systematic (207, 187) Reed-Solomon codes, which RS encoder 29 re-calculates the RS parity of the affected M/H packets. The RS encoder 29 is connected for supplying the re-calculated RS parity bytes to the RS parity replacer 27, which substitutes the re-calculated RS parity bytes for the original RS parity bytes before they can be supplied to the modified trellis encoder 28. That is, the RS parity replacer 27 reproduces the output of the byte interleaver 26 as regards the data bytes for each packet in its output signal, but reproduces the output of the non-systematic RS encoder 29 as regards the RS parity bytes for each packet in its output signal.

Figure 3:
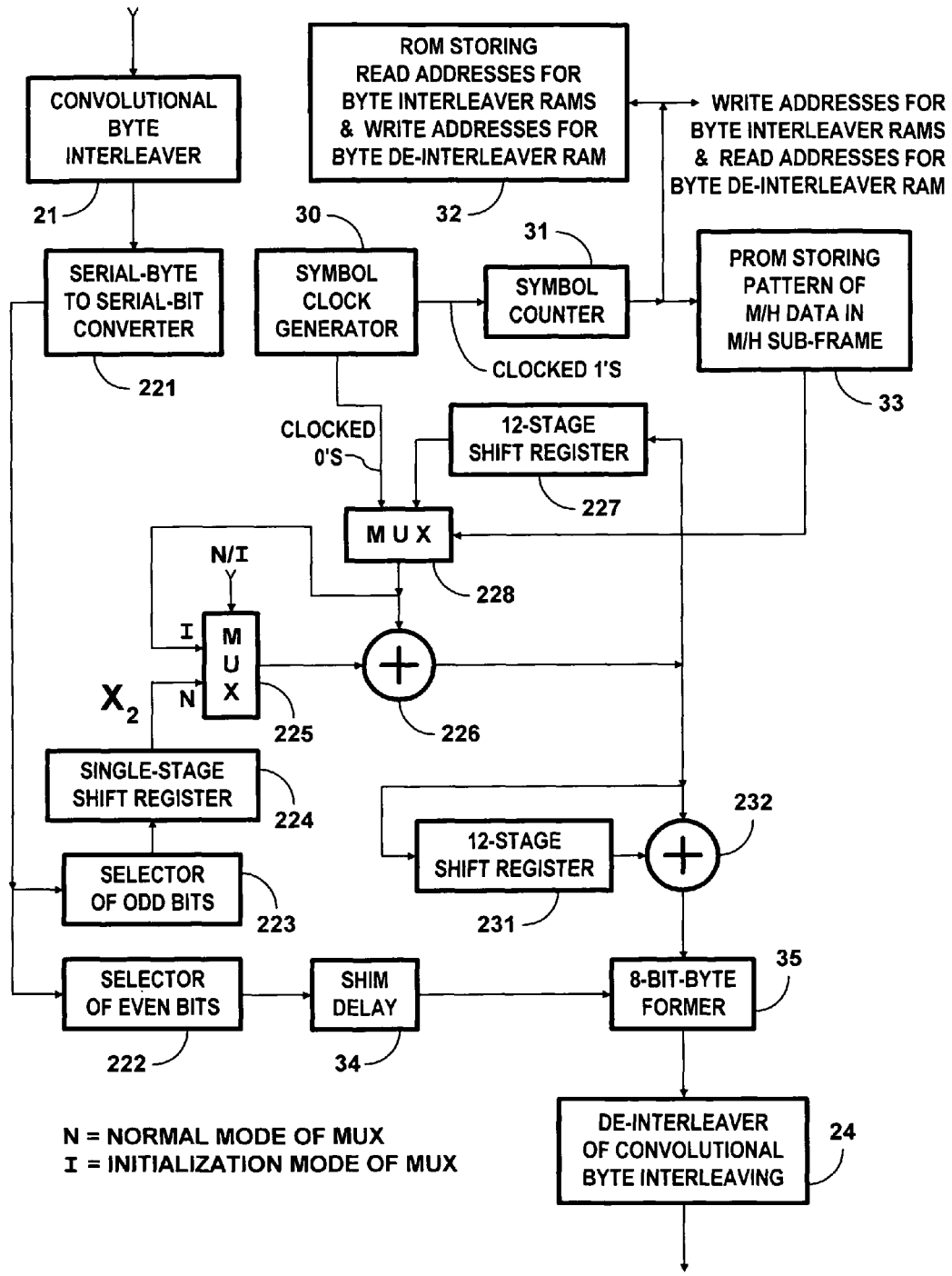
FIG. 3 is a schematic diagram showing in more detail the switched interference-filter pre-coder for only the X-sub-2 bits of main-service data and the post-comb filter used in the FIG. 2 M/H post-processor.

FIG. 3 shows in more detail representative constructions of the switched interference-filter pre-coder 22 for only the X-sub-2 bits of main-service data and the post-comb filter 23 cascaded thereafter. The precoder 22 comprises elements 221-228. The post-comb filter 23 comprises a 12-stage shift register 231 and a modulo-2 adder 232 (which is an exclusive-OR gate). A symbol clock generator 30 generates clocked ONEs and clocked ZEROes during 8-VSB data segments. The clocked ONEs are applied to a symbol counter 31 that counts the symbols in each M/H sub-Frame. This count is most convenient to use if made on a symbol-per-data-segment and data-segment-per-M/H-sub-Frame basis, since such count can be used with suitable delays as write addressing of respective random-access memories (RAMs) within the byte interleavers 21 and 26. With suitable delay, such count can also be used as read addressing of random-access memory (RAM) within the byte de-interleaver 24. Portions of the count from the symbol counter 31 are applied as read addressing to a read-only memory 32 and as read addressing to a programmable read-only memory 33. With suitable delays, the response from the ROM 32 provides write addressing of the RAM within the byte de-interleaver 24 and read addressing of the respective RAMs within the byte interleavers 21 and 26. With suitable delay, the response from the PROM 33 maps the pattern of M/H data symbols within each M/H-sub-Frame to control the selective precoding of the X-sub-2 bits of main-service data by the interference-filter pre-coder 22. The programmability of the PROM 33 permits the broadcaster to change the number of M/H Groups per M/H-sub-Frame.

More particularly, the PROM 33 stores a pattern of ONEs and ZEROes descriptive of the pattern of M/H-service and main-service 8-VSB symbols in an M/H sub-Frame. The pattern of ONEs and ZEROes descriptive of the pattern of M/H-service and main-service 8-VSB symbols in an M/H sub-Frame is read from the PROM 33 for controlling the operation of the pre-coder 22 in the M/H post processor 5 as shown in FIG. 2. Since the pattern changes only at boundaries between bytes, the size of the PROM can be reduced if byte pattern information, rather than symbol pattern information, is stored therein. If the PROM 33 is reduced in size by storing byte pattern information, the two least significant bits of the symbol count from the symbol counter 31 are not included in the input addressing applied to the PROM 33.

The convolutional byte interleaver 21 is connected for applying successive eight-bit bytes of its response to the input port of a byte-to-bit converter 221 for conversion to serial-bit format at the input of the pre-coder 22. A selector 222 is connected for selectively reproducing just the even-occurring X-sub-1 bits from the serial-bit response of the byte-to-bit converter 221. These X-sub-1 bits are forwarded via shim delay 34 to an 8-bit byte former 35 to be bit-interleaved with processed X-sub-2 bits from the post-comb filter 23 as a preparatory step in forming 8-bit bytes for application to the byte de-interleaver 24. A selector 223 is connected for selectively reproducing just the odd-occurring X-sub-2 bits from the serial-bit response of the byte-to-bit converter 221. The selector 223 is connected for applying the reproduced X-sub-2 bits to the input port of a single-stage shift register 224. The output port of the shift register 224 is connected for applying the reproduced X-sub-2 bits to the one of two input ports of a multiplexer 225, which port is labeled 'N' in FIG. 3. The single-stage shift register 224 delays X-sub-2 bits selected from the serial-bit response of the byte-to-bit converter 221 for better aligning them temporally with X-sub-1 bits selected from that serial-bit response. During normal operation the multiplexer 225 receives a normal/initialize (N/I) control signal that conditions it to reproduce at its output port the reproduced X-sub-2 bits supplied to its input port labeled 'N'. The output port of the multiplexer 225 is connected for applying a first of two summand input signals applied to a modulo-2 adder 226 (which is an exclusive-OR gate). The modulo-2 adder 226 is connected for applying a serial-bit sum output signal therefrom to the post-comb filter 23.

The modulo-2 adder 226 is also connected for applying its serial-bit sum output signal to the input port of a 12-stage shift register 227. The output port of the 12-stage shift register 227 is connected to one of two input ports of a multiplexer 228, the output port of which is connected for supplying a second of the two summand input signals applied to the modulo-2 adder 226. The other input port of the multiplexer 228 is connected for receiving ZERO bits clocked at symbol rate from the symbol clock generator 30. When the multiplexer 228 receives a control signal conditioning it to reproduce the serial-bit sum output signal of the adder 226 as delayed by the 12-stage shift register 227, the bits supplied to the post-comb filter 23 are pre-coded. When the multiplexer 228 receives a control signal conditioning it to reproduce the clocked ZEROes supplied from the symbol clock generator 30, the bits supplied to the post-comb filter 23 are not pre-coded. Rather, they are identical to the X-sub-2 bits supplied from the output port of the multiplexer 228.

FIG. 3 shows the modulo-2 adder 226 connected for applying the selectively pre-coded X-sub-2 bits of its serial-bit sum output signal to the input port of a 12-stage shift register 231 in the post-comb filter 23. The output port of the 12-stage shift register 227 is connected for supplying delayed response to the adder 226 sum output signal as a first of the two summand input signals of the modulo-2 adder 232 in the post-comb filter 23. The adder 226 is connected for applying its sum output signal to the modulo-2 adder 232 as the second of the two summand input signals thereof. The adder 232 is connected for applying the selectively post-comb-filtered X-sub-2 bits of its serial-bit sum output signal to the 8-bit byte former 35 to be bit-interleaved with X-sub-1 bits forwarded via shim delay 34. The byte former 35 forms 8-bit bytes from the results of this bit-interleaving, which bytes are supplied to the byte de-interleaver 24 as input signal thereto.

The FIG. 3 arrangement can be modified to omit the shift register 231. The response of the 12-stage shift register 227 is then applied as the first summand input signal of the modulo-2 adder 232 instead of the response of the 12-stage shift register 231 being so applied.

Figure 4:
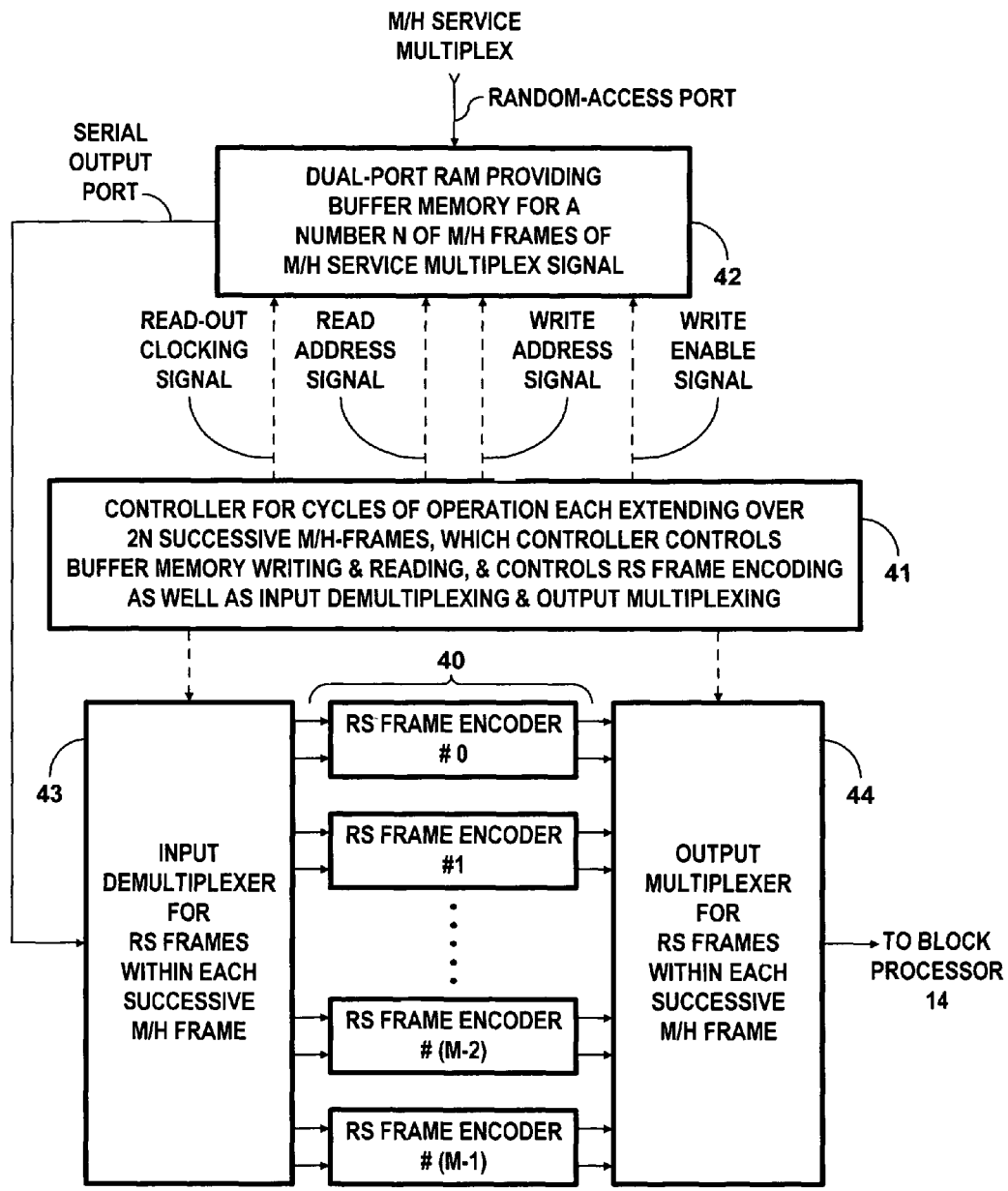
FIG. 4 is a detailed schematic diagram of a representative embodiment of the M/H Frame encoder used in the FIG. 1_DTV transmitter apparatus, which M/H Frame encoder is depicted in combination with buffer memory that supports iterative-diversity transmissions.

FIG. 4 depicts in some detail a particular form for the M/H Frame encoder 13 of the FIG. 1 DTV transmitter apparatus, which includes a set 40 of RS Frame encoders. This set 40 preferably includes as many RS Frame encoders as there can be Parades in two M/H Frames—that is, 32, twice as many as in the M/H Frame encoder described in A/153. A controller 41 is included in the FIG. 4 M/H Frame encoder 13 for controlling its operations, including those of the RS Frame encoders in the set 40 of them.

The FIG. 4 M/H Frame encoder 13 further includes a dual-port random-access memory 42 connected to provide buffer memory for the Ensembles of M/H Service Multiplex data supplied as input signals to an input de-multiplexer 43 for distribution to the set 40 of RS Frame encoders. The RAM 42 has the temporary storage capability to store the Ensembles of M/H Service Multiplex data for a number P at least one of successive M/H Frames. Ensembles of M/H Service Multiplex data are applied to the random-access port of the RAM 42 and are written into temporary storage locations therein in accordance with write address and write enable signals generated within the controller 41 and supplied to the RAM 42. Read-out clocking signal is generated within the controller 41 and is supplied to the RAM 42 for clocking the read-out of successive Ensembles of M/H Service Multiplex data. These successive Ensembles of M/H Service Multiplex data are read to respective ones of the set 40 of RS Frame encoders as selected by the input de-multiplexer 43 under the direction of the controller 41. A (partial) read addressing signal is generated within the controller 41 and is supplied to the RAM 42 for selecting the temporarily stored Ensembles of M/H Service Multiplex data to be clocked out through the RAM 42 serial output port to the input port of the input de-multiplexer 43. The RAM 42 allows the Ensembles of M/H Service Multiplex data temporarily stored therewithin to be read via its serial port with timing that facilitates the random-access memories within the set 40 of RS Frame encoders being over-written during reading therefrom.

The Ensembles of M/H Service Multiplex data that are read from the serial output port of the RAM 42 are applied as input signals to the input de-multiplexer 43. The input de-multiplexer 43 is further connected for distributing those M/H Ensembles to the set 40 of RS Frame encoders as their respective input signals. This distribution is controlled by respective control signals that the controller 41 generates and supplies to the input de-multiplexer 43. An output multiplexer 44 for RS sub-Frames is connected for time-division multiplexing sub-Frame responses from the set 40 of RS Frame encoders for application to the block processor 14. This time-division multiplexing is controlled by respective control signals that the controller 41 generates and supplies to the output multiplexer 44.

The output multiplexer 44 for reading from the set 40 of RS Frame encoders is operated to provide RS Frame portion to SCCC Block conversion for the block processor 14. Considering the operation of the output multiplexer 44 more generally, it converts RS Frame portions to concatenated-convolutional-coding (CCC) Blocks, which CCC Blocks may be considered as being either SCCC Blocks or PCCC Blocks, depending on the subsequent processing of these CCC Blocks.

The controller 41 is designed to be capable of conducting the writing and reading of the RAM 42 so as to support iterative-diversity transmissions when the RAM 42 is capable of storing the Ensembles of M/H Service Multiplex for several M/H Frames. That is, when the number P of stored M/H Frames of data is apt to be as large as up to thirty-two or so. Each Ensemble of M/H Service Multiplex data is read a first time from the RAM 42 to a respective one of the set 40 of RS Frame encoders to be processed for its first transmission earlier in time than a second transmission of that same Ensemble. Each Ensemble of M/H Service Multiplex data is subsequently read a second time from the RAM 42 to a respective one of the set 40 of RS Frame encoders to be processed for its second transmission later in time than the first transmission of that same Ensemble. These first and second transmissions can be separated by almost as much as P M/H Frames. The separation is apt not to be an integral number of M/H Frames, however. Then, each M/H Frame can contain M/H Groups used for transmitting earlier components of the iterative-diversity transmissions and can further contain M/H Groups used for transmitting later components of the iterative-diversity transmissions. Respective transmissions of the two types of M/H Groups are staggered within each M/H sub-Frame. The separation between the first and second transmissions can be as little as only one Slot. The separation between the first and second transmissions can be just two Slots or can be just three Slots.

FIGS. 5, 6, 7 and 8 are tables showing a how in a first network Slots are allocated amongst up to four different transmitters that have coverage areas which overlap at least in part. The Slot allocations facilitate frequency-diversity reception. Each M/H sub-Frame includes four sets of Slots. The Slots in each set are separated by intervening sequences of three Slots. Transmitters that have coverage areas which overlap transmit similar program material in different ones of these sets of Slots so that an M/H receiver located in an overlapping coverage area can receive the similar program material twice, as time-division multiplexed between two of these sets of Slots. The time-division multiplexing accommodates an M/H receiver with just a single front-end tuner of a frequency-agile type that can rapidly switch tuning between the different carrier frequencies of two 8-VSB transmitters.

A second transmission of Program A information repeats a first transmission of Program A information in an earlier M/H Frame when Program A information is transmitted twice to implement iterative-diversity reception. A second transmission of Program A information repeats the first transmission of Program A information within the same or next M/H sub-Frame when Program A information is transmitted twice principally to implement decoding the outer convolutional coding of the M/H CCC at one-quarter the 8-VSB symbol rate. A first transmission of Program C replaces the second transmission of Program A information if the Program A information is transmitted only one time. While each of the FIGS. 5-8 shows the Program A information being transmitted in four M/H Groups, the Program A information can be divided into smaller individual programs transmitted in all or just some of the four M/H Groups.

A second transmission of Program B information repeats a first transmission of Program B information in an earlier M/H Frame when Program B information is transmitted twice to implement iterative-diversity reception. A second transmission of Program B information repeats the first transmission of Program B information within the same or next M/H sub-Frame when Program B information is transmitted twice principally to implement decoding the outer convolutional coding of the M/H CCC at one-quarter the 8-VSB symbol rate. A first transmission of Program D information replaces the second transmission of Program B information if the Program B information is transmitted only one time. While each of the FIGS. 5-8 shows the Program B information being transmitted in four M/H Groups, the Program B information can be divided into smaller individual programs transmitted in all or just some of the four M/H Groups.

The FIG. 5 table shows how Slots for diversity transmissions are allocated within the first 8-VSB transmitter in the first network of transmitters. The set of Slots #0, #4, #8 and #12 is used for a first transmission of Program A information. The set of Slots #1, #5, #9 and #13 is used for a second transmission of Program A information, presuming it to be transmitted twice. The set of Slots #1, #5, #9 and #13 is used for a single transmission of Program C information, however, if Program A information is transmitted only once. The set of Slots #2, #6, #10 and #14 is used for a first transmission of Program B information. The set of Slots #3, #7, #11 and #15 is used for a second transmission of Program B information, presuming it to be transmitted twice. The set of Slots #3, #7, #11 and #15 is used for a single transmission of Program D information, however, if Program B information is transmitted only once.

The FIG. 6 table shows how Slots for diversity transmissions are allocated within the second 8-VSB transmitter in the first network of transmitters. The set of Slots #0, #4, #8 and #12 is used for a first transmission of Program B information. The set of Slots #1, #5, #9 and #13 is used for a second transmission of Program B information, presuming it to be transmitted twice. The set of Slots #1, #5, #9 and #13 is used for a single transmission of Program D information, however, if Program B information is transmitted only once. The set of Slots #2, #6, #10 and #14 is used for a first transmission of Program A information. The set of Slots #3, #7, #11 and #15 is used for a second transmission of Program A information, presuming it to be transmitted twice. The set of Slots #3, #7, #11 and #15 is used for a single transmission of Program C information, however, if Program A information is transmitted only once.

The FIG. 7 table shows how Slots for diversity transmissions are allocated within the third 8-VSB transmitter in the first network of transmitters. The set of Slots #0, #4, #8 and #12 is used for a second transmission of Program A information, presuming it to be transmitted twice. The set of Slots #0, #4, #8 and #12 is used for a single transmission of Program C information, however, if Program A information is transmitted only once. The set of Slots #1, #5, #9 and #13 is used for a first transmission of Program B information. The set of Slots #2, #6, #10 and #14 is used for a second transmission of Program B information, presuming it to be transmitted twice. The set of Slots #2, #6, #10 and #14 is used for a single transmission of Program D information, however, if Program B information is transmitted only once. The set of Slots #3, #7, #11 and #15 is used for a first transmission of Program A information.

The FIG. 8 table shows how Slots for diversity transmissions are allocated within the fourth 8-VSB transmitter in the first network of transmitters. The set of Slots #0, #4, #8 and #12 is used for a second transmission of Program B information, presuming it to be transmitted twice. The set of Slots #0, #4, #8 and #12 is used for a single transmission of Program D information, however, if Program B information is transmitted only once. The set of Slots #1, #5, #9 and #13 is used for a first transmission of Program A information. The set of Slots #2, #6, #10 and #14 is used for a second transmission of Program A information, presuming it to be transmitted twice. The set of Slots #2, #6, #10 and #14 is used for a single transmission of Program C information, however, if Program A information is transmitted only once. The set of Slots #3, #7, #11 and #15 is used for a first transmission of Program B information.

Other networks with up to four transmitters having overlapping coverage areas can have Slot allocations for diversity transmissions different from those shown in FIGS. 5, 6, 7 and 8, respectively. FIGS. 9, 10, 11 and 12 are tables showing how Slots are allocated among up to four different transmitters that are included in a second network and have coverage areas which overlap at least in part. These Slot allocations facilitate frequency-diversity reception using an M/H receiver with just a single front-end tuner of a frequency-agile type that can rapidly switch tuning between the different carrier frequencies of two 8-VSB transmitters.

The FIG. 9 table shows how Slots for diversity transmissions are allocated within the first 8-VSB transmitter in the second network of transmitters. The set of Slots #0, #4, #8 and #12 is used for a first transmission of Program A information. The set of Slots #1, #5, #9 and #13 is used for a first transmission of Program B information. The set of Slots #2, #6, #10 and #14 is used for a second transmission of Program A information, presuming it to be transmitted twice. The set of Slots #2, #6, #10 and #14 is used for a single transmission of Program C information, however, if Program A information is transmitted only once. The set of Slots #3, #7, #11 and #15 is used for a second transmission of Program B information, presuming it to be transmitted twice. The set of Slots #3, #7, #11 and #15 is used for a single transmission of Program D information, however, if Program B information is transmitted only once.

The FIG. 10 table shows how Slots for diversity transmissions are allocated within the second 8-VSB transmitter in the second network of transmitters. The set of Slots #0, #4, #8 and #12 is used for a first transmission of Program B information. The set of Slots #1, #5, #9 and #13 is used for a first transmission of Program A information. The set of Slots #2, #6, #10 and #14 is used for a second transmission of Program B information, presuming it to be transmitted twice. The set of Slots #2, #6, #10 and #14 is used for a single transmission of Program D information, however, if Program B information is transmitted only once. The set of Slots #3, #7, #11 and #15 is used for a second transmission of Program A information, presuming it to be transmitted twice. The set of Slots #3, #7, #11 and #15 is used for a single transmission of Program C information, however, if Program A information is transmitted only once.

The FIG. 11 table shows how Slots for diversity transmissions are allocated within the third 8-VSB transmitter in the second network of transmitters. The set of Slots #0, #4, #8 and #12 is used for a second transmission of Program A information, presuming it to be transmitted twice. The set of Slots #0, #4, #8 and #12 is used for a single transmission of Program C information, however, if Program A information is transmitted only once. The set of Slots #1, #5, #9 and #13 is used for a second transmission of Program B information, presuming it to be transmitted twice. The set of Slots #1, #5, #9 and #13 is used for a single transmission of Program D information, however, if Program B is transmitted only once. The set of Slots #2, #6, #10 and #14 is used for a first transmission of Program A information. The set of Slots #3, #7, #11 and #15 is used for a first transmission of Program B information.

The FIG. 12 table shows how Slots for diversity transmissions are allocated within the fourth 8-VSB transmitter in the second network of transmitters. The set of Slots #0, #4, #8 and #12 is used for a second transmission of Program B information, presuming it to be transmitted twice. The set of Slots #0, #4, #8 and #12 is used for a single transmission of Program D information, however, if Program B information is transmitted only once. The set of Slots #1, #5, #9 and #13 is used for a first transmission of Program A information. The set of Slots #2, #6, #10 and #14 is used for a first transmission of Program B information. The set of Slots #3, #7, #11 and #15 is used for a second transmission of Program A information, presuming it to be transmitted twice. The set of Slots #3, #7, #11 and #15 is used for a single transmission of Program C information, however, if Program A information is transmitted only once.

Figure 13:
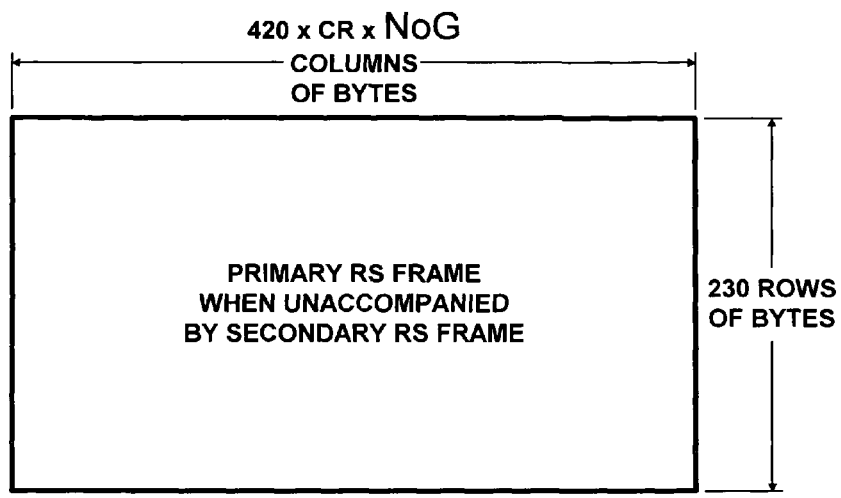
FIG. 13 is a depiction of a novel primary RS Frame format preferred in a component RS Frame encoder in the FIG. 4 M/H frame encoder when there is no accompanying secondary RS Frame.

FIG. 13 shows the inventor's preferences as to the size and proportions of a sole primary RS Frame that is unaccompanied by a secondary RS Frame. The number of coded bytes respectively associated with each M/H Group is preferably a multiple of twelve. Then, an integral number of bytes of one-quarter-rate, one-third-rate and one-half-rate outer convolutional codes will fit within the M/H Group, with no bytes being split between two M/H Groups. It is desirable to pack the byte epochs available for data in the M/H Groups as fully as possible and to minimize the number of those byte epochs left over which will be filled with "stuffing" bytes. The number of columns of bytes in an RS Frame is accordingly preferably a multiple of TNoG, the total number of M/H Groups per M/H Frame in the M/H Parade that will fill that RS Frame. Up to 19,358 bytes of coded primary RS Frame can be accommodated within each M/H Group if the A/153 dummy bytes and the third bytes of MHE packets are replaced with data bytes. (This is described in detail in U.S. patent application Ser. No. 12/660,757 filed for A. L. R. Limberg on 4 Mar. 2010, titled "Terminated concatenated convolutional coding of M/H Group data in 8VSB digital television signals". U.S. patent application Ser. No. 12/660,757 also describes preferred order for the coding and turbo decoding of M/H Groups to facilitate proper termination of CCC coding within each M/H Group.)

Preferably, the transverse Reed-Solomon (TRS) codewords are a multiple of five bytes long, with one-fifth of the bytes in the RS Frame being transmitted in each M/H sub-Frame with as few bytes left over as possible. Preferably, each M/H Group should contain the same number of complete CRC codewords with as few bytes left over as possible. The inventor prefers that the transverse Reed-Solomon (TRS) codewords be 230 bytes long. Dividing the 9679 bytes from an M/H Group coded at one-half the 8-VSB symbol rate by 230/5=46 means CRC codewords can each consist of 210 bytes, with only 19 bytes being left over from the M/H Group. The weakest of the 230-byte TRS codewords can use (230, 206) coding designed to overcome a drop-out in received signal strength that extends somewhat over an M/H sub-Frame. The strongest of the 230-byte TRS codewords can use (230, 182) coding designed to overcome a drop-out in received signal strength that extends somewhat over two M/H sub-Frames.

FIG. 13 shows the sole primary RS Frame that is unaccompanied by a secondary RS Frame to have 230 rows of 8-bit bytes. The number of 8-bit bytes in each row is 420 times NoG times the code rate CR of the outer convolutional coding, NoG being the number of M/H Groups per M/H sub-Frame that are included in the same Parade. The fact that the number of columns of 8-bit bytes in the sole primary RS Frame is a multiple of three makes it possible to split the sole primary RS Frame into a primary RS Frame and a secondary RS Frame half the size of the primary RS Frame. U.S. patent application Ser. No. 12/660,757 describes the respective portion of the sole primary RS Frame contained in each M/H Group as preferably beginning in Block 4, continuing on to Block 9, and then wrapping around to continue on from Block 1 through Block 3. Outer convolutional coding with one-half, one-third and one-fourth code rates result in RS Frames with 210 times NoG columns of bytes, with 140 times NoG columns of bytes, and with 105 times NoG columns of bytes, respectively.

Figures 14, 15:
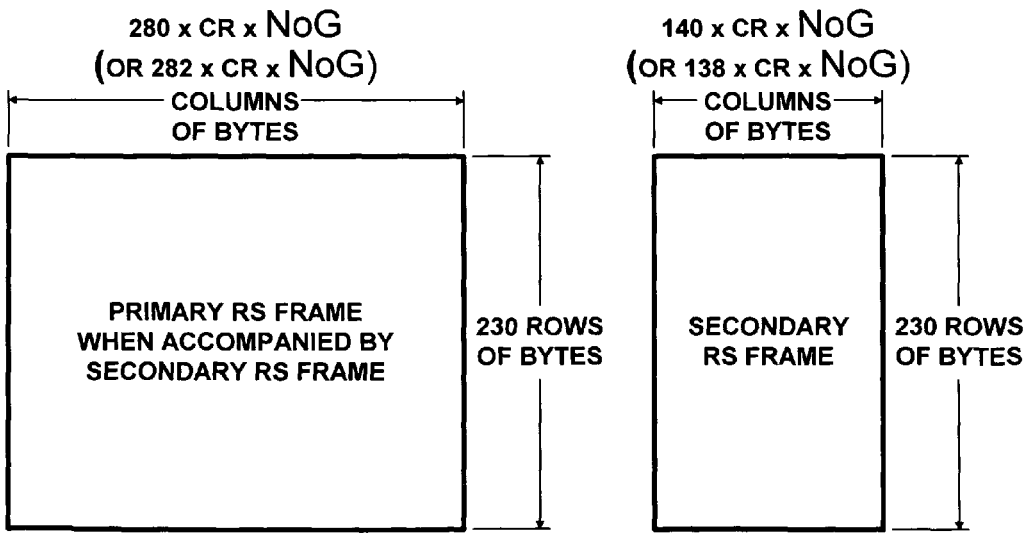
FIG. 14 is a depiction of novel primary RS Frame formats preferred in a component RS Frame encoder in the FIG. 4 M/H frame encoder when there is an accompanying secondary RS Frame.
FIG. 15 is a depiction of novel secondary RS Frame formats preferred in a component RS Frame encoder in the FIG. 4 M/H frame encoder, when a secondary RS Frame accompanies a primary RS Frame having the format depicted in FIG. 14.

FIG. 14 shows the preferred size and proportions of a primary RS Frame that is accompanied by a secondary RS Frame and that is contained within Blocks 4, 5, 6, 7 and 8 of the M/H Group(s) of the Parade. FIG. 14 shows the primary RS Frame that is accompanied by a secondary RS Frame still to have 230 rows of 8-bit bytes. Outer convolutional coding with one-half or one-quarter code rate can be accommodated conveniently by a primary RS Frame in which the number of 8-bit bytes in each row is 280 times NoG times the code rate CR of the outer convolutional coding. Outer convolutional coding with one-half and one-fourth code rates then result in RS Frames with 140 times NoG columns of bytes and with 70 times NoG columns of bytes, respectively. Outer convolutional coding with one-half or one-third code rate can be accommodated conveniently by a primary RS Frame in which the number of 8-bit bytes in each row is 282 times NoG times the code rate CR of the outer convolutional coding. Outer convolutional coding with one-half and one-fourth code rates then result in RS Frames with 141 times NoG columns of bytes and with 94 times NoG columns of bytes, respectively.

FIG. 15 shows the preferred size and proportions of a secondary RS Frame that is contained within Blocks 9, 10, 1, 2 and 3 of the M/H Group(s) of the Parade and possibly within their Blocks 8 as well. FIG. 15 shows the secondary RS Frame to have 230 rows of 8-bit bytes. If the number of 8-bit bytes in each row of the primary RS Frame is 280 times NoG times the code rate CR, the number of 8-bit bytes in each row of the secondary RS Frame is 140 times NoG times the code rate CR. Outer convolutional coding with one-half and one-fourth code rates result in RS Frames with 70 times NoG columns of bytes and with 35 times NoG columns of bytes, respectively. If the number of 8-bit bytes in each row of the primary RS Frame is 282 times NoG times the code rate CR, the number of 8-bit bytes in each row of the secondary RS Frame is 138 times NoG times the code rate CR of the outer convolutional coding. Outer convolutional coding with one-half and one-third code rates result in RS Frames with 69 times NoG columns of bytes and with 46 times NoG columns of bytes, respectively.

The number of 8-bit bytes in each row of the primary RS Frame could be made 276 times NoG times the code rate CR to accommodate outer convolutional coding with one-half, one-third or one-quarter code rates. Then, the number of 8-bit bytes in each row of the secondary RS Frame could be made 144 times NoG times the code rate CR to accommodate outer convolutional coding with one-half, one-third or one-quarter code rates. This introduces a further departure from the primary and secondary RS Frame sizes being in 2:1 ratio, which may present some problem in regard to standardizing the lengths of pre-recorded programming.

FIG. 16 shows in more detail the structure of an RS Frame encoder 400-1 representative of the set 40 of RS Frame encoders. An M/H data randomizer 401 is connected for receiving as input signal thereto a primary Ensemble from the input multiplexer 43 of the M/H Frame encoder 13. The M/H data randomizer 401 is further connected for supplying its response to an 8-bit byte former 402, which forms 8-bit bytes of randomized M/H data to be written into rows of byte-storage locations in a byte-organized random-access memory 403. Thereafter, the byte-storage locations in the RAM 403 are read one partial column at a time to an encoder 404 for transverse Reed-Solomon coding, which generates parity bytes to write the remaining byte-storage locations in the column. This completes the primary RS frame stored within the RAM 403. Successive rows of the byte-storage locations in the RAM 403 are subsequently read from to provide input signal to an encoder 405 for cyclic-redundancy-check (CRC) coding. The response of the CRC encoder 405 reproduces the successive bytes read from the RAM 403, breaking up the succession of bytes into shorter sequences of a prescribed number of bytes, and appending a respective 2-byte check-sum to each shorter sequence of a prescribed number of bytes. The response of the CRC encoder 405 is supplied to the output multiplexer 44 of the M/H Frame encoder 13.

An M/H data randomizer 406 is connected for receiving as input signal thereto a secondary Ensemble from the input multiplexer 43 of the M/H Frame encoder 13. The M/H data randomizer 406 is further connected for supplying its response to an 8-bit byte former 407, which forms 8-bit bytes of randomized M/H data to be written into rows of byte-storage locations in a byte-organized random-access memory 408. Thereafter, the byte-storage locations in the RAM 408 are read one partial column at a time to an encoder 409 for transverse Reed-Solomon coding which generates parity bytes to write the remaining byte-storage locations in the column. This completes the secondary RS frame stored within the RAM 408. Successive rows of the byte-storage locations in the RAM 408 are subsequently read from to provide input signal to an encoder 410 for cyclic-redundancy-check (CRC) coding. The response of the CRC encoder 410 reproduces the successive bytes read from the RAM 408, breaking up the succession of bytes into shorter sequences of a prescribed number of bytes, and appending a respective 2-byte checksum to each shorter sequence of a prescribed number of bytes. The response of the CRC encoder 410 is supplied to the output multiplexer 44 of the M/H Frame encoder 6.

A respective 2-byte CRC checksum would be inserted after each row of bytes in the primary RS Frame read from the RAM 403 if the M/H transmission complied with the prescription of A/153. A respective 2-byte CRC checksum would be inserted after each row of bytes in the secondary RS Frame read from the RAM 406 if the M/H transmission complied with the prescription of A/153. A fundamental question is whether this periodicity of CRC checksum is frequent enough to supply enough multiple external code error checks to lower the error floor for PCCC using methodology similar to that described by Eidson et alii in their U.S. Pat. No. 7,568,147 issued 28 Jul. 2009 and titled "Iterative decoder employing multiple external code error checks to lower the error floor". There is also a problem as to whether those CRC checksums are timed so that they are reasonably convenient to utilize in turbo decoding procedures performed on a Group-by-Group basis.

FIG. 16 includes at its foot a legend indicating that the CRC encoders 405 and 410 can be operated per the prescription of A/153. The legend indicates that the CRC encoders 405 and 410 can be operated in a different manner, to insert NoG checksums into each row of bytes in the RS Frames. A/153 defines NoG as the number of M/H Groups in a sub-Frame that pertain to a specific M/H Ensemble. The CRC coding in the CRC encoder 405 inserts into each row of bytes read from the RAM 403 for the primary RS Frame a respective checksum for each M/H Group per M/H sub-Frame. The CRC encoder 410 inserts into each row of bytes read from the RAM 408 for the secondary RS Frame a respective checksum for each M/H Group per M/H sub-Frame. The respective final checksum that the CRC encoder 405 appends to each row of bytes of the primary RS Frame read from the RAM 403 does not necessarily correspond to that prescribed by A/153, since there are NoG checkwords in the row. The respective final checksum that the CRC encoder 405 appends to each row of bytes will relate to only a concluding portion of that row of bytes, rather than the entire row of bytes, if NoG is more than one. The respective final checksum that the CRC encoder 410 appends to each row of bytes of the secondary RS Frame read from the RAM 408 does not necessarily correspond to that prescribed by A/153, since there are NoG checkwords in the row. The respective final checksum that the CRC encoder 410 appends to each row of bytes will relate to only a concluding portion of that row of bytes, rather than the entire row of bytes, if NoG is more than one.

The legend at the foot of FIG. 16 suggests another alternative manner for operating the CRC encoders 405 and 410, in which alternative manner the CRC codewords each consist of a prescribed number of bytes. This prescribed number of bytes is preferably a sub-multiple of the number of bytes of M/H data in each M/H Group, so that no CRC codeword begins in one M/H Group and concludes in another M/H Group. If each M/H Group contains 19,320 bytes of M/H data to accommodate 230-byte TRS codewords, the CRC encoders 405 and 410 can use CRC codewords that are 210 bytes long or a submultiple thereof for CCC with one-half-rate or one-quarter-rate outer convolutional coding. This results in the checksum bytes of the CRC codewords being arrayed in columns within each RS Frame.

FIG. 17 shows the bit order in the outer convolutional coding generated for SCCC responsive to a byte of data composed of successive bits $D_1, D_2, D_3, D_4, D_5, D_6, D_7$ and $D_8$ of data. The parity bits $P_1, P_2, P_3, P_4, P_5, P_6, P_7$ and $P_8$ succeed respective ones of the data bits $D_1, D_2, D_3, D_4, D_5, D_6, D_7$ and $D_8$ in the 2-bit symbols generated by the block processor 14 and ultimately supplied to the modified trellis encoder 28.

FIG. 18 shows the bit order in the outer convolutional coding generated for PCCC responsive to a byte of data composed of successive bits $D_1, D_2, D_3, D_4, D_5, D_6, D_7$ and $D_8$ of data. The parity bits $P_1, P_2, P_3, P_4, P_5, P_6, P_7$ and $P_8$ precede respective ones of the data bits $D_1, D_2, D_3, D_4, D_5, D_6, D_7$ and $D_8$ in the 2-bit symbols generated by the block processor 14 and ultimately supplied to the modified trellis encoder 28.

Figure 19:
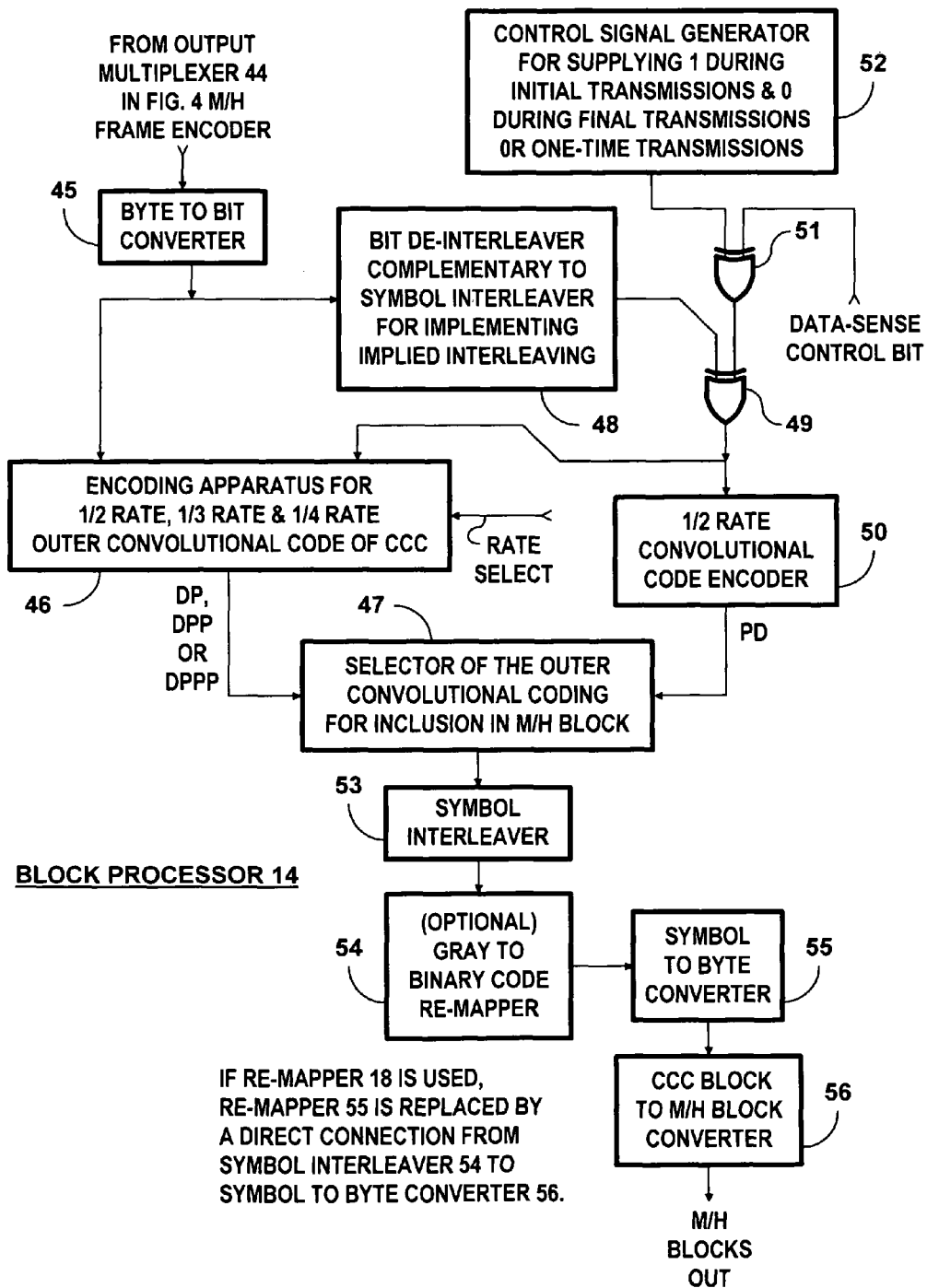
FIG. 19 is a detailed schematic diagram of a representative embodiment of the block processor in the FIG. 1 DTV transmitter apparatus, which embodiment provides for implied symbol interleaving of the one-half-code-rate outer convolutional coding for PCCC in accordance with an aspect of the invention.

FIG. 19 is a detailed schematic diagram of the novel block processor 14 in the FIG. 1 DTV transmitter apparatus. As noted supra the output multiplexer 44 in the FIG. 4 M/H Frame encoder 13 is operated to convert RS Frame Portions to CCC Blocks of TRS-CRC-coded M/H Service data supplied to the block processor 14. Either single M/H Blocks or pairs of M/H Blocks are converted into respective CCC Blocks of TRS-CRC-coded M/H Service data that are supplied to a byte-to-bit converter 45 in the block processor 14.

Encoding apparatus 46 for one-half-rate or one-fourth rate outer convolutional coding of SCCC per A/153 is connected for receiving TRS-CRC-coded M/H Service data in serial-bit form from the byte-to-bit converter 45. The encoding apparatus 46 is also capable of generating one-third-rate outer convolutional coding for CCC that is a mixture of SCCC and PCCC. The coding rate of the outer convolutional coding that the encoding apparatus 46 generates is determined responsive to a rate-selection signal RATE SELECT supplied to the encoding apparatus 46. The encoding apparatus 46 is connected to supply 2-bit symbols as a first of two input signals applied to a selector 47 of the outer convolutional coding for inclusion in each M/H Block.

The byte-to-bit converter 45 is connected for supplying its bit-stream response to a prefatory data-bit de-interleaver 48 to be de-interleaved in accordance with a pattern complementary to that employed for 2-bit symbols in a symbol interleaver used in later processing. This is done to help implement implied interleaving of outer convolutional coding supplied as a second of the two input signals applied to the selector 47 of the outer convolutional coding for inclusion in each M/H Block. An exclusive-OR gate 49 is connected for supplying its response to an encoder 50 for one-half-rate convolutional coding. One input port of the XOR gate 49 is connected for receiving the de-interleaved TRS-CRC-coded M/H-service data that the bit de-interleaver 48 generates as its response.

The other input port of the XOR gate 49 is connected for receiving the response of an exclusive-OR gate 51. One input port of the XOR gate 51 is connected for receiving a control signal from a control signal generator 52, and the other input port of the XOR gate 51 is connected for receiving a DATA-SENSE CONTROL bit. This DATA-SENSE CONTROL bit is a logic ZERO, except in selected ones of cooperating transmitters that broadcast the same material in different DTV channels.

The control signal generator 52 generates a logic ONE control signal when the de-interleaved TRS-CRC-coded M/H Service data from the bit de-interleaver 48 is to be transmitted as the initial part of an iterative-diversity transmission. If the DATA-SENSE CONTROL bit is a logic ZERO, the XOR gate 51 response is a logic ONE. This logic ONE conditions the XOR gate 49 to generate a response that ones' complements the de-interleaved TRS-CRC-coded M/H-service data received from the bit de-interleaver 48. If the DATA-SENSE CONTROL bit is a logic ONE, the XOR gate 51 response is a logic ZERO. This logic ZERO conditions the XOR gate 49 to reproduce in its own response the de-interleaved TRS-CRC-coded M/H-service data received from the bit de-interleaver 48.

The control signal generator 52 generates a logic ZERO control signal when the de-interleaved TRS-CRC-coded M/H Service data received from the bit de-interleaver 48 is to be transmitted as the final part of an iterative-diversity transmission or is to be transmitted only a single time. If the DATA-SENSE CONTROL bit is a logic ZERO, the XOR gate 51 response is a logic ZERO. This ZERO conditions the XOR gate 49 to generate a response that reproduces the de-interleaved TRS-CRC-coded M/H-service data received from the bit de-interleaver 48. If the DATA-SENSE CONTROL bit is a logic ONE, the XOR gate 51 response is a logic ONE. This logic ONE conditions the XOR gate 49 to generate a response that ones' complements the de-interleaved TRS-CRC-coded M/H-service data received from the bit de-interleaver 48.

The XOR gate 49 response is supplied as input signal to the encoder 50 for one-half-rate convolutional coding. The encoder 50 responds to this input signal to generate successive 2-bit symbols for supplying a second of the two input signals applied to the selector 47 of the outer convolutional coding for inclusion in each M/H Block.

The set of parity bits in the final-transmission component of an iterative-diversity transmission differs from the set of parity bits in the initial-transmission component of the iterative-diversity transmission. If there are portions of the response of the input signal supplied to the encoder 50 that are only sparsely populated by ONEs, the convolutional coding generated by the encoder 50 will also be sparsely populated by ONEs and consequently will be less powerful. A desirable feature of a parallelly concatenated convolutional code is for its additional set of parity bits to be densely populated by ONEs where the original set of parity bits is sparsely populated by ONEs. If there are portions of the de-interleaver 48 response that are only sparsely populated by ONEs, the ones' complemented de-interleaver 48 response will be densely populated by ONEs. The additional set of parity bits that the encoder 50 generates in response to this denser population of ONEs will tend to be less under-populated by ONEs than the set generated in response to the non-complemented response of the bit de-interleaver 48.

Each of the 2-bit symbols generated by the encoder 50 consists of an initial parity bit and a succeeding data bit, which are supplied to the selector 47 as the second input signal thereto. The selector 47 is connected for supplying the 2-bit symbols that it selectively reproduces to a symbol interleaver 53 as input signal thereto. FIG. 19 shows the output port of the symbol interleaver 53 connected for supplying the output symbols in its symbol-interleaved response to the input port of a Gray-to-binary-code re-mapper 54. The re-mapper 54 Gray-code labels the symbol-interleaved outer convolutional coding supplied as natural-binary-coded response to a symbol-to-byte converter 55 for conversion to 8-bit bytes for being written into a byte-organized random-access memory operated as an CCC Block to M/H Block converter 56.

FIG. 1 shows the possible connection of the Gray-to-binary-code re-mapper 18 following the M/H Group formatter 15. The Gray-to-binary-code re-mapper 18 can be operated to re-map symbols of the TPC and FIC signaling as well as the symbols of M/H data. If in such an alternative procedure the Gray-to-binary-code re-mapper 18 performs the Gray-to-binary-code re-mapping, the Gray-to-binary-code re-mapper 54 is replaced by a direct connection from the output port of the symbol interleaver 53 to the input port of a symbol-to-byte converter 55. The Gray-to-binary-code re-mapper 54 is also replaced by a direct connection from the output port of the symbol interleaver 53 to the input port of the symbol-to-byte converter 55 if the symbol-interleaved outer convolutional coding is conveyed by 8-VSB symbols without the use of Gray-code labeling.

M/H Blocks are read from the byte-organized RAM operated as the CCCC Block to M/H Block converter 56 shown in FIG. 19 to the Group formatter 15 shown in the FIG. 1 general schematic diagram. The Group formatter 15 in the FIG. 1 DTV transmitter apparatus is operated for placing the initial and final transmissions of data for iterative-diversity reception into different sets of Slots within M/H sub-Frames. The general principle for delaying the final transmissions from the corresponding initial transmissions is that the delay is always the same, being an integral number of M/H sub-Frames plus or minus an integral number of Slots. By way of illustration this integral number of M/H Frames is ten, which provides for withstanding drop-outs in received signal strength that are almost a second in duration. The initial and final transmissions of coded M/H-service data for iterative-diversity reception are positioned within different sets of Slots within each M/H sub-Frame as described supra, with reference to FIGS. 5-8.

Figure 20:
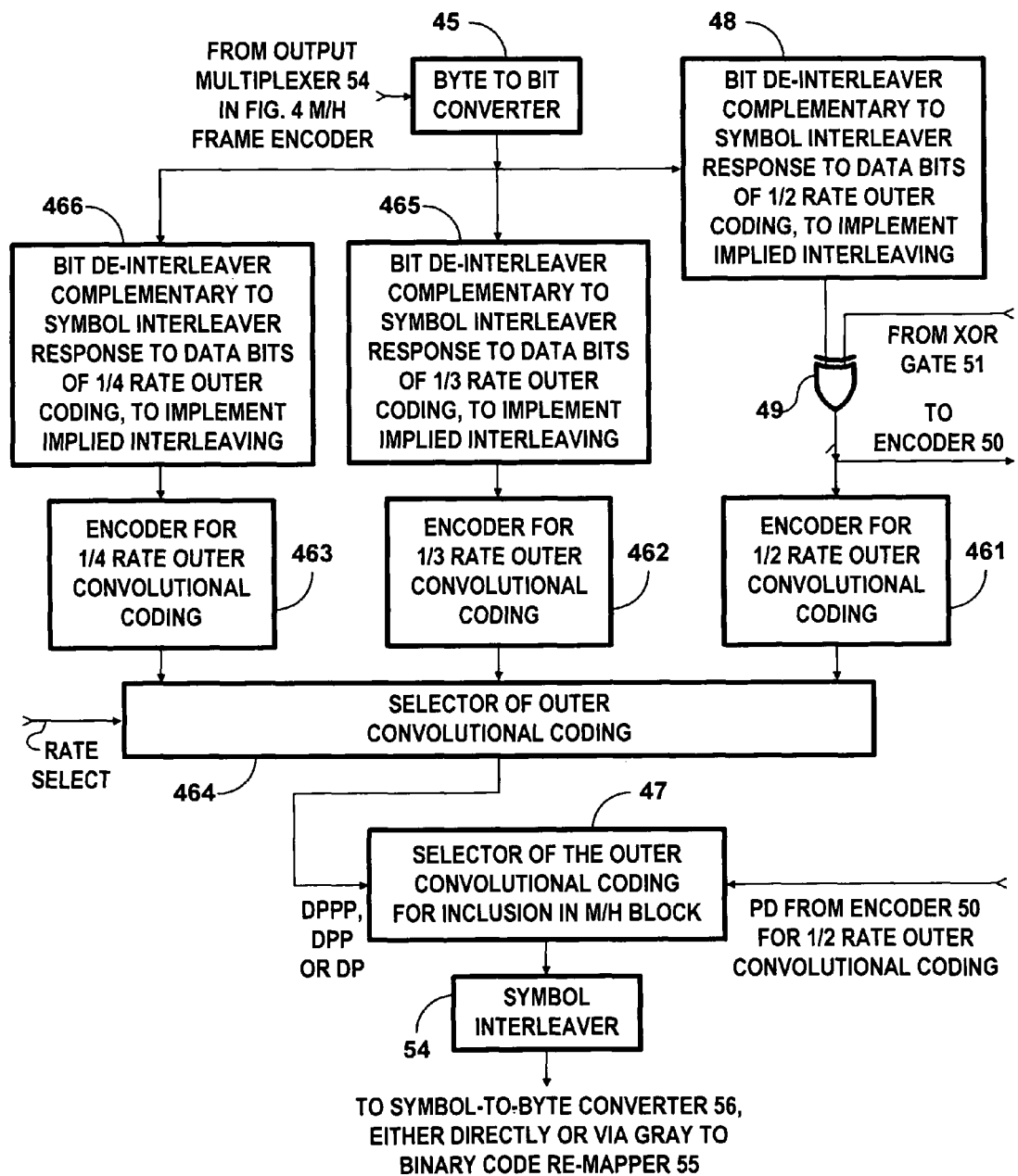
FIG. 20 is a detailed schematic diagram of a modification made to part of the FIG. 19 block processor, which modification in accordance with various aspects of the invention provides for implied symbol interleaving of one-half-code-rate, one-third-code-rate and one-quarter-code-rate outer convolutional coding for SCCC.

FIG. 20 shows in part how the FIG. 19 block processor is modified when, in accordance with aspects of the invention, implied symbol interleaving is utilized in the encoding apparatus 46. FIG. 20 shows the encoding apparatus 46 to comprise an encoder 461 for one-half-rate outer convolutional coding, an encoder 462 for one-third-rate outer convolutional coding, and an encoder 463 for one-quarter-rate outer convolutional coding. The encoders 461, 462 and 463 are connected for supplying their respective responses to a selector 464 as respective input signals. Responsive to a RATE SELECT signal, the selector 464 reproduces a selected one of the three input signals to supply outer convolutional coding to the selector 47 of the outer convolutional coding to be applied to the symbol-interleaver 53. Alternatively, rather than using the selectors 464 and 47 for selecting the outer convolutional coding to be applied to the symbol-interleaver 53, the outer convolutional coding can be selected by powering up just one of the encoders 461, 462, 463 and 51.

The encoder 461 for one-half-rate outer convolutional coding is connected for receiving the XOR gate 49 response to be coded. The encoder 462 for one-third-rate outer convolutional coding is connected for receiving its input signal to be encoded from a bit de-interleaver 465. The de-interleaver 465 has a bit de-interleaving pattern complementary to the pattern with which the symbol interleaver 53 will interleave the data bits of one-third-rate outer convolutional coding that originated from the encoder 462. The encoder 463 for one-quarter-rate outer convolutional coding is connected for receiving its input signal to be encoded from a bit de-interleaver 466. The de-interleaver 466 has a bit de-interleaving pattern complementary to the pattern with which the symbol interleaver 53 will interleave the data bits of one-quarter-rate outer convolutional coding that originated from the encoder 463.

Figure 21:
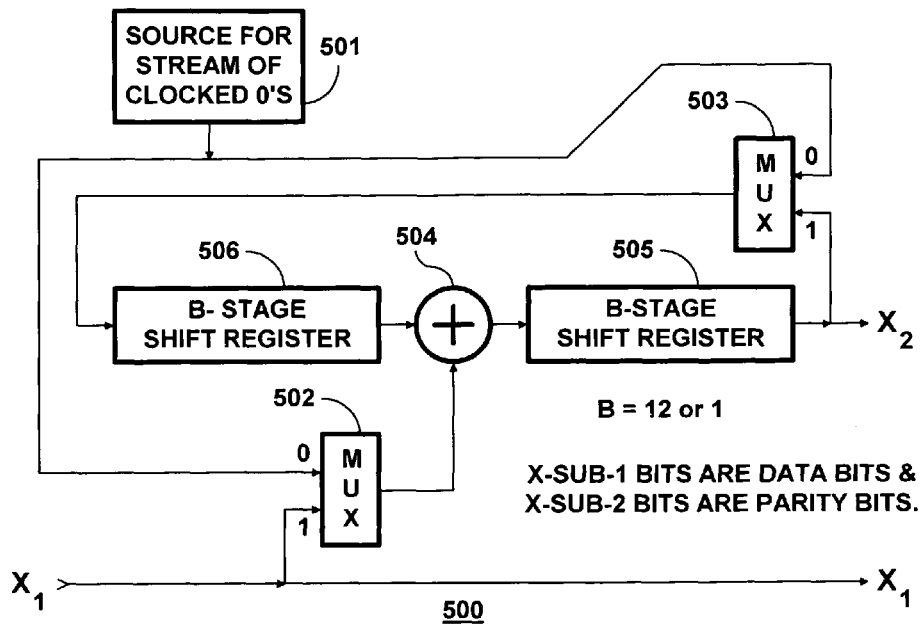
FIG. 21 is a detailed schematic diagram of representative encoders of half-rate outer convolutional coding that the FIG. 19 embodiment of the block processor can use for generating PCCC.

FIG. 21 details a representative general construction 500 of the FIG. 19 encoder 50 for generating half-rate outer convolutional coding for PCCC. The construction 500 includes a source of ZEROes 501 clocked at 8-VSB symbol rate to the respective first input ports of time-division multiplexers 502 and 503, each of which has a respective pair of input ports. The second input port of the multiplexer 502 is connected for receiving the X-sub-1 bits of M/H data. The response from the multiplexer 502 is applied as a first summand input signal to a clocked modulo-2 adder 504, which essentially comprises a two-input exclusive-OR gate. The sum output response from the adder 504 is subjected to B bits of delay from a shift register 505 before its application to the second input port of the multiplexer 503. The response from the multiplexer 503 is subjected to B bits of delay from a shift register 506 before its application to the clocked modulo-2 adder 504 as a second summand input signal. FIG. 21 shows the shift register 505 response supplying X-sub-2 parity bit responses to successive X-sub-1 M/H data bits. The number B of bits of delay each of the shift registers 505 and 506 provides can be essentially one, as A/153 prescribes for an encoder generating half-rate outer convolutional coding for SCCC. However, if the number B of bits of delay each of the shift registers 505 and 506 provides is twelve, the M/H receiver apparatus can use the same decoding apparatus on a staggered time basis both for decoding inner convolutional coding and for decoding outer convolutional coding.

Usually, the time-division multiplexers 502 and 503 respond to their respective input signals as received at the second ones of their respective input ports. When the M/H coding of a portion of an RS Frame included within an M/H Group concludes, there is a zero-flushing procedure for sweeping out the stored contents of the shift registers 505 and 506. During each such zero-flushing procedure, which lasts for twenty-four 8-VSB symbol epochs, the time-division multiplexers 502 and 503 respond to the clocked ZEROes as received at the first ones of their respective input ports.

Figure 22:
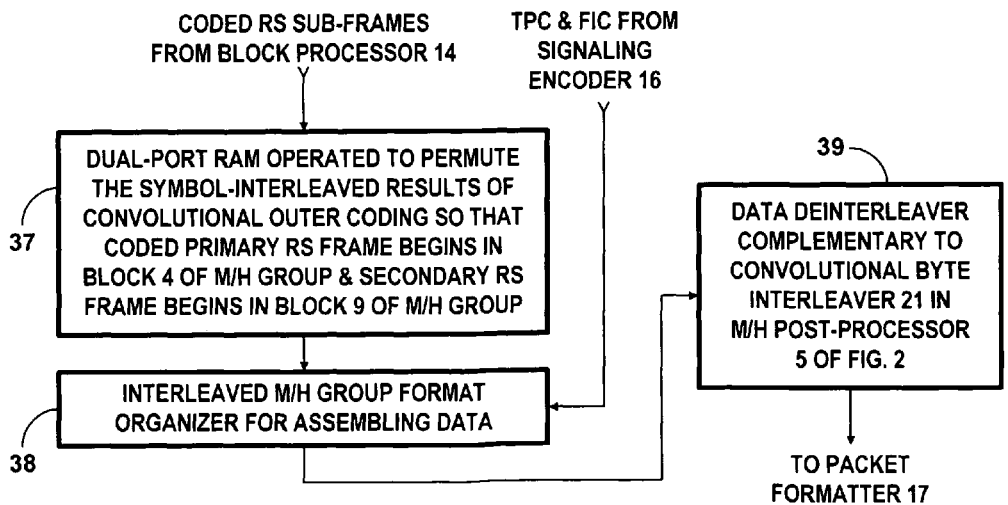
FIG. 22 is a schematic diagram of a representative embodiment of the M/H Group processor employed in the FIG. 1 DTV transmitter apparatus, which embodiment of the M/H Group processor includes random-access memory that can be operated to permute the positioning of RS Frames within M/H Groups.

FIG. 22 shows a preferred construction of the M/H Group formatter 15 in more detail. Bytes from the block processor 14 are written to a dual-port random-access memory 37 within the Group formatter 15. The RAM 37 is operated for permuting the symbol-interleaved results of outer convolutional coding read from the RAM 37 and supplied as input signal to an interleaved M/H Group format organizer 38 included within the Group formatter 15. The permutation is such that the coded primary RS Frame of each M/H Group will begin immediately after the sequence of TPC and FIC signaling in Block 4 of that M/H Group. If the coded primary RS Frame is not accompanied by a secondary RS Frame within the same M/H Group, the coded primary RS Frame loops back to the beginning of the M/H Group and concludes just before the training signal in Block 3 of that M/H Group. If the coded primary RS Frame is accompanied by a secondary RS Frame within the same M/H Group, the coded primary RS Frame concludes near the conclusion of Block 8 of that M/H Group with the coded secondary RS Frame beginning shortly thereafter. Then, following Block 10 of the M/H Group, the coded secondary RS Frame loops back to the beginning of the M/H Group and concludes just before the training signal in Block 3 of that M/H Group.

The interleaved Group format organizer 38 is generally similar to that described in A/153, operating on the Group format as it will appear after the ATSC data interleaver. The interleaved Group format organizer 38 maps the FEC-coded M/H-service data from the block processor into the corresponding M/H blocks of a Group, adding pre-determined training data bytes and place-holder bytes that will later be replaced by deterministic trellis reset (DTR) bytes. The interleaved Group format organizer 38 also inserts 2-byte headers for the MHE packets. In a departure from A/153 practice the third byte of each MHE packet header is replaced by an M/H data byte. The interleaved Group format organizer 38 also inserts place-holder bytes for main-service data and for non-systematic RS parity. The interleaved Group format organizer 38 supplies the resulting interleaved M/H Group to a byte de-interleaver 39 that complements the ATSC convolutional byte interleaver. This byte de-interleaver 39 is included within the Group formatter 15. The Group formatter 15 is connected for supplying the response of the byte de-interleaver 39 as its output signal, which is applied as input signal to the packet formatter 17. Initially, the packet formatter 17 expunges the place-holder bytes that were inserted by the interleaved Group format organizer 38 for proper operation of the byte de-interleaver in the Group formatter 17. The packet formatter 17 inserts an MPEG TS sync byte before each 187-byte data packet as a prefix thereof, thereby generating a respective MHE packet supplied to the packet multiplexer 3 for time-division multiplexing with the main-service TS packets.

Figure 23:
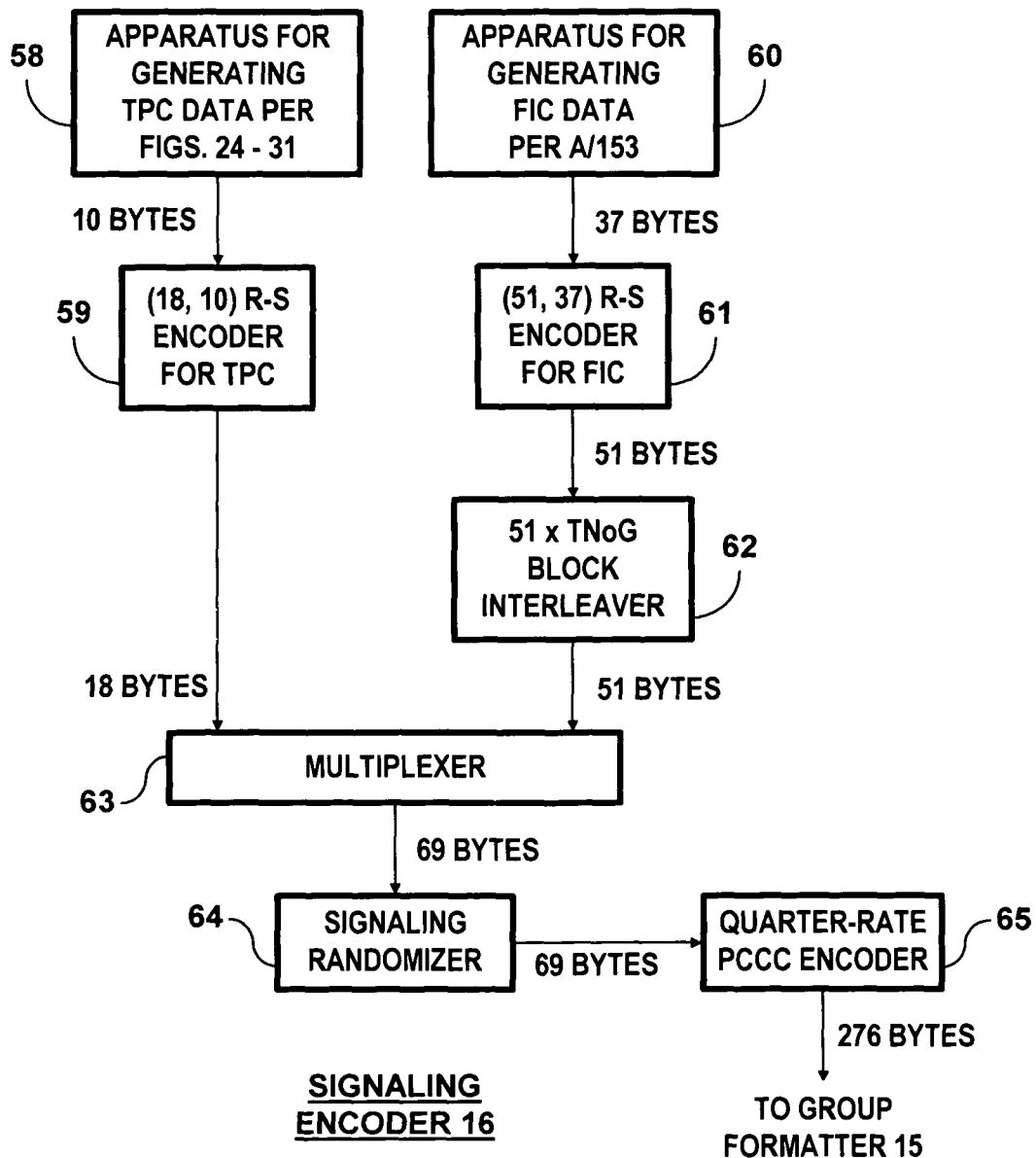
FIG. 23 is a schematic diagram of a representative embodiment of the novel signaling encoder employed in the FIG. 1 DTV transmitter apparatus.

FIG. 23 is a detailed schematic diagram of a representative embodiment of the signaling encoder 16 in the FIG. 1 DTV transmitter apparatus. Apparatus 58 for generating Transmission Parameter Channel (TPC) data using the bit syntax shown in FIGS. 26-33 is connected for supplying that TPC data to an encoder 59 for (18, 10) Reed-Solomon coding bytes of that TPC data. Apparatus 60 for generating Fast Information Channel (FIC) data using the bit syntax prescribed by A/153 is connected for supplying that FIC data to an encoder 61 for (51, 37) Reed-Solomon coding FIC bits. The encoder 61 encodes thirty-seven bits per Group and is connected for supplying the resulting 51 bits of RS-coded FIC to a matrix-type block interleaver 62. A time-division multiplexer 63 is connected for supplying a response that interleaves 51 bytes of block interleaver 62 response as received at a first input port of the multiplexer 63 between each 18-byte RS codeword received from the encoder 59 at a second input of the multiplexer 63. The multiplexer 63 is connected for supplying its response to a signaling randomizer 64. The signaling randomizer 64 is connected for supplying its response as input signal to a quarter-rate PCCC encoder 65, which is in turn connected to supply the quarter-rate PCCC that it generates to the Group formatter 15.

Each of the FIGS. 24 and 25 is a table showing a preferred syntax of bits in the TPC data. The FIG. 24 table specifies the bit syntax for TPC signal transmitted in each M/H Group contained in the initial two sub-Frames #0 and #1 of each M/H Frame. The FIG. 25 table specifies the bit syntax for TPC signal transmitted in each M/H Group contained in the final three sub-Frames #2. #3 and #4 of each M/H Frame. There are eighty bits in the TPC data transmitted with each Group, and in this specification they are referred to by number according to the order of their transmission within the M/H Group. The bits 1-59 and 70-80 of the TPC bit syntax shown in the tables of FIGS. 24 and 25 have syntax similar to that specified in A/153. However, bits 31-40 are descriptive of concatenated convolutional coding (CCC) in general, including parallel concatenated convolutional coding (PCCC) as well as serial concatenated convolutional coding (SCCC). A/153 specifies the TPC bits 60-75 as being reserved, but the tables in FIGS. 24 and 25 show only bits 64-75 of this sequence of bits to be reserved.

In both the FIG. 24 and FIG. 25 tables the bits 1-3 specifying sub_Frame_number the bits 4-7 specifying Slot_number and the bits 8-14 specifying the Parade_ID always apply to the M/H Group being currently received, as well as to the corresponding M/H Group in the next M/H Frame in the Parade repetition cycle (PRC). The Parade_repetition_cycle_minus_one number appearing in bits 22-24 of the TPC bit syntax ranges from zero to seven. It applies to the M/H Group being currently received and signals the number of M/H Frames skipped over from one M/H Frame containing parts of a Parade to the next Frame containing parts of the Parade. The bits 41-45 specify FIC_version as a modulo-32 number. This number is usually the same as that for the corresponding M/H Group in the previous M/H Frame. However, it increments by one when an FIC-Chunk in the current M/H Frame that describes the next M/H Frame differs from a previous FIC-Chunk of like FIC_chunk_major_protocol_version that described the current M/H Frame. The bits 46-49 specify Parade_continuity_counter count as a modulo-16 number that increments by one every M/H Frame in the Parade Repetition Cycle. (Specification of a count of zero or of one, rather than an expected consecutive count, can be used to signal the beginning of a new Parade.)

The last five bits of the TPC data signal the version of TPC data syntax that is being used. Bits 76 and 77 signal major changes in the TPC data used in the M/H Standard. These major changes cause the TPC data to be indecipherable to receivers designed for receiving transmissions made in accordance with earlier versions of the M/H Standard. Bits 78, 79 and 80 signal minor changes in the TPC data used in the M/H Standard. These minor changes leave parts of the TPC data decipherable to receivers designed for receiving transmissions made in accordance with earlier versions of the M/H Standard. In A/153 all the bits 78, 79 and 80 in TPC are ONEs, and each of them shall be rolled to ZERO when the first change in TPC version is adopted by ATSC. In A/153 the bits 76 and 77 in TPC are both ONEs, and each of them shall be rolled over to ZERO when the initial major change in TPC version is adopted by ATSC.

In the FIG. 24 TPC syntax table, bits 15-18 specify the current_starting_Group_number, bits 19-21 specify the current_number_of_Groups_minus_one, bits 25-40 describe forward-error-correction (FEC) coding for the M/H Frame that is currently received, and bits 50-54 specify the current_total_number_of_Groups. The current_starting_Group_number is the Slot number of the initial M/H Group beginning or resuming the Parade identified by bits 8-14 in each sub-frame of the M/H Frame that is currently received. The current_number_of_Groups_minus_one is one less than the number of M/H Groups assigned to the Parade identified by bits 8-14 in each sub-frame of the M/H Frame that is currently received. The current_total_number_of_Groups specifies the total number of M/H Groups in each sub-frame of the M/H Frame that is currently received.

In the FIG. 25 TPC syntax table bits 15-18 specify the next_starting_Group_number, bits 19-21 specify the next_number_of_Groups_minus_one, and bits 25-40 describe FEC coding for the M/H Frame to be received next. Bits 55-59 specify the current_starting_Group_number. The next_starting_Group_number is the Slot number of the initial M/H Group beginning or resuming the Parade identified by bits 8-14 in each sub-frame of the M/H Frame that will be received next. The next_number_of_Groups_minus_one is one less than the number of M/H Groups assigned to the Parade identified by bits 8-14 in each sub-frame of the M/H Frame that will be received next. The bits 55-59 in the FIG. 25 table specify the next_total_number_of_Groups. That is, the total number of M/H Groups in each sub-frame of the M/H Frame that will be received next after the M/H Frame being currently received.

In the TPC syntax tables of FIGS. 24 and 25 the bits 15-18 specifying a starting Group number and the bits 25-40 prescribing forward-error-correction coding constitute "normally continuing" TPC information. This "normally continuing" TPC information not only stays the same for each Slot of the same number in the sub-Frames of one M/H Frame, but also usually is the same for each Slot of the same number in the sub-Frames of the next M/H Frame in the PRC. The specification of CCC coding conditions in bits 31-40 of the FIG. 24 and FIG. 25 tables encompass PCCC coding conditions, as well as the SCCC coding conditions specified in A/153.

The FIG. 24 TPC syntax table shows bits 25 and 26 specifying current_RS_frame_mode, bits 30 and 31 specifying current_RS_code_mode_primary, and bits 29 and 30 specifying current_RS_code_mode_secondary, which corresponds to the prescription of A/153 for TPC bit syntax in M/H sub-Frames #0 and #1. The FIG. 24 table shows bits 31 and 32 specifying current_CCC_block_mode, bits 33 and 34 specifying current_CCC_outer_code_mode_a, bits 35 and 36 specifying current_CCC_outer_code_mode_b, bits 37 and 38 specifying current_CCC_outer_code_mode_c, and bits 39 and 40 specifying current_CCC_outer_code_mode_d.

The FIG. 25 TPC syntax table shows bits 25 and 26 specifying next_RS_frame_mode, bits 30 and 31 specifying next_RS_code_mode_primary, and bits 29 and 30 specifying next_RS_code_mode_secondary, which corresponds to the prescription of A/153 for TPC bit syntax in M/H sub-Frames #2, #3 and #4. The FIG. 25 table shows bits 31 and 32 specifying next_CCC_block_mode, bits 33 and 34 specifying next_CCC_outer_code_mode_a, bits 35 and 36 specifying next_CCC_outer_code_mode_b, bits 37 and 38 specifying next_CCC_outer_code_mode_c, and bits 39 and 40 specifying next_CCC_outer_code_mode_d.

FIG. 26 depicts in tabular form a preferred bit syntax of the RS_Frame_mode specified by the bits 25-26 of the FIG. 24 and FIG. 25 tables. The use of this bit syntax of the RS_Frame_mode requires that the TPC bit syntax tables of FIGS. 24 and 25 indicate in their bits 76-80 that they are of a version in which RS_Frame_mode bit syntax differs from that prescribed by A/153. Bits 25-26 being 00 specifies that there is only a primary RS Frame for the Parade containing the M/H Group including the TPC. This primary RS Frame begins in Block 4 of the M/H Group, has wrap-around and concludes in Block 3 of the same M/H Group. The bits 25-26 being 01 specifies that there is both a primary RS Frame and a secondary RS Frame for the Parade containing the M/H Group including the TPC. The primary Frame begins in Block 4 of the M/H Group and concludes in Block 8 of the same M/H Group. The secondary RS Frame begins in Block 8 of the M/H Group, has wrap-around and concludes in Block 3 of the same M/H Group. Bits 25-26 being 10 specifies that there is only a primary RS Frame for the Parade containing the M/H Group including the TPC. This primary Frame begins in Block 4 of the M/H Group, has no wrap-around and concludes in Block 3 of the next-transmitted M/H Group in the same Ensemble. Bits 25-26 being 11 specifies that there is both a primary RS Frame and a secondary RS Frame for the Parade containing the M/H Group including the TPC. The primary Frame begins in Block 4 of the M/H Group and concludes in Block 8 or 9 of the same M/H Group. The secondary RS Frame begins in Block 8 or 9 of the M/H Group, has no wrap-around and concludes in Block 3 of the next-transmitted M/H Group in the same Ensemble.

FIG. 27 depicts in tabular form the specific syntax of the RS_code_mode_primary specified by the bits 27-28 and of the RS_code_mode_secondary specified by the bits 29-30 of the FIG. 24 and FIG. 25 tables. Either of these pairs of bits being 00 specifies that (230, 182) TRS coding is employed to generate the RS Frame that they relate to. Either of these pairs of bits being 01 specifies that (230, 194) TRS coding is employed to generate the RS Frame that they relate to. Either of these pairs of bits being 10 specifies that (230, 206) TRS coding is employed to generate the RS Frame that they relate to. FIG. 27 shows the bit pair 11 being held in reserve.

FIG. 28 depicts in tabular form a preferred syntax of the pair of bits in each of the four CCC_outer_code_mode fields in the TPC signal for an M/H Frame that is either currently received or is next to be received. The FIG. 24 TPC syntax table includes current_CCC_outer_code_mode_a, current_CCC_outer_code_mode_b, current_CCC_outer_code_mode_c and current_CCC_outer_code_mode_d fields regarding an M/H Frame that is being currently received. The FIG. 25 TPC syntax table includes a next_CCC_outer_code_mode_a, next_CCC_outer_code_mode_b, next_CCC_outer_code_mode_c and next_CCC_outer_code_mode_d fields regarding for an M/H Frame that is next to be received. The bit syntax specified by the FIG. 28 table is applicable all eight of these fields. The values '00' and '01' provide signaling similar to that prescribed by A/153. A value of '00' signals that the outer convolutional coding has a code rate of 1/2 and its bit pairs are coded in the CCC block so as to give rise to SCCC response after 2/3 trellis coding. A value of '01' signals that the outer convolutional coding has a code rate of 1/4 and its bit pairs are coded in the CCC block so as to give rise to SCCC response after 2/3 trellis coding. The values '10' and '11' are reserved in A/153, but FIG. 28 shows these values being used to signal specific types of CCC transmissions. A value of '10' signals that the outer convolutional coding has a code rate of 1/3 and its bit pairs are coded in the CCC block so as to give rise to CCC response after 2/3 trellis coding. This CCC response is a mixture of SCCC and PCCC. A value of '11' signals that the outer convolutional coding has a code rate of 1/2 and that its bit pairs are coded in the CCC block so as to give rise to PCCC response after 2/3 trellis coding.

M/H signals may be transmitted using iterative diversity in which earlier and later transmissions of the same data are designed to be combined during turbo decoding procedures. When such transmissions are received by an M/H receiver capable of combining earlier and later transmissions of the same data during turbo decoding procedures, the M/H receiver needs to know whether the currently received Group belongs to the earlier transmission or to the later transmission. If the currently received Group belongs to the earlier transmission, it is diverted to a digital delay line. The digital delay line is usually implemented as a first-in/first-out memory and delays the earlier transmission so its turbo decoding takes place concurrently with the turbo decoding of the later transmission of the same data. The TPC bit syntax in A/153 does not provide for signaling when broadcast transmissions are made that are specifically designed for iterative-diversity reception. The TPC bit syntax in A/153 does not provide for signaling the amount of delay between an earlier transmission of M/H data and a later re-transmission of the same M/H data.

A/153 reserves the bits 55-59 in the TPC syntax for sub-Frames #0 and #1. Bits 55-57 specify Frames_of_iterative_diversity_delay in the FIG. 24 TPC syntax table in coded form. FIG. 29 tabulates the numbers of M/H Frames between early and late transmissions of the same data for iterative-diversity reception. Bits 58-59 specify extra_Slot_intervals_of_delay descriptive of the offset in Slot phasing between earlier and later transmissions of M/H data for diversity reception.

The TPC bit syntax in A/153 does not specify the different ways in which similar program material is broadcast by cooperating DTV transmitters that transmit over different RF channels and have respective coverage areas that partially overlap at least one of the coverage areas of the other DTV transmitters. In each of the TPC syntax tables of FIGS. 24 and 25 the bit 60 transmits an M/H_data_not_ones'_complemented? datum. Bit 60 is a ONE if the M/H data bits are not ones' complemented, but is a ZERO if the M/H data bits are ones' complemented.

The FIG. 24 and FIG. 25 TPC syntax tables each show their respective bits 61 and 62 being used as an iterative_diversity_mode field. Bits 61 and 62 of the iterative_diversity_mode field appear together in the same (18, 10) RS FEC codewords for TPC, which reduces the chance for error in this field. The FIG. 30 table depicts a representative bit syntax for the iterative_diversity_mode field. The iterative_diversity_mode field being '11' signals that an M/H Group is one not being iteratively transmitted, which simplifies design of a receiver that can also receive transmissions made in accordance with A/153. The following other values of the iterative_diversity_mode field signals are suggested by way of example. The iterative_diversity_mode field being '01' signals that the Group currently being received is an initial one of a pair of iteratively transmitted Groups designed for being combined during turbo decoding procedures. The iterative_diversity_mode field being '10' signals that the Group currently being received is a final one of a pair of iteratively transmitted Groups designed for their respective data being combined later on in the receiver using procedures that combine transport stream packets. The iterative_diversity_mode field being '00' signals that the Group currently being received is an intermediate one of a trio of iteratively transmitted Groups.

The FIG. 24 and FIG. 25 TPC syntax tables each show their respective bits 63, 64 and 65 being used as an subchannel-interleaving field. The bits 63, 64 and 65 of this field appear together in the same (18, 10) RS FEC codewords for TPC, which reduces the chance for error in the field. The FIG. 31 table depicts a representative bit syntax for the subchannel-interleaving field. The three bits of this field designate which one of the eight subchannel-interleaving patterns shown in FIGS. 5-12 is used by the DTV transmitter that transmits the TPC signal, presuming that the iterative_diversity_mode field is not '11' in value. If the iterative_diversity_mode field is '11', in value, standard practice can be to use a subchannel-interleaving field that is '111'.

In each of the TPC syntax tables of FIGS. 24 and 25, the bit 66 transmits a Z-sub-2_bits_in_M/H_data_precoded? datum. Preferably, the bit 66 is a ZERO indicating that the Z-sub-2 bits in the M/H data are not pre-coded. However, the bit 66 is allowed to be a ONE to signal that the Z-sub-2 bits in the M/H data are pre-coded per A/153 to accommodate transmissions that can be received by legacy M/H receivers designed only for receiving signals as specified by A/153. Alternatively, the bit 66 is reserved for other purposes, and the TPC version bits 76-80 are used by M/H receivers to determine when there is no pre-coding of the Z-sub-2 bits in the M/H data.

Figure 32:
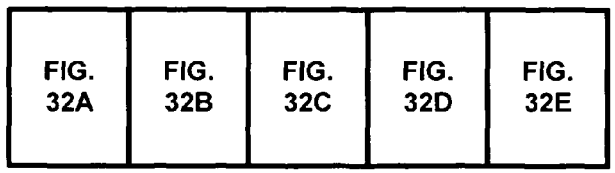
FIG. 32 is an assembly drawing indicating how FIGS. 32A, 32B, 32C, 32D and 32E combine to provide a schematic diagram of receiver apparatus for receiving M/H transmissions sent over the air from the FIG. 1 DTV transmitter apparatus, which receiver apparatus is novel and is a representative embodiment of aspects of the invention.
Figure 32A:
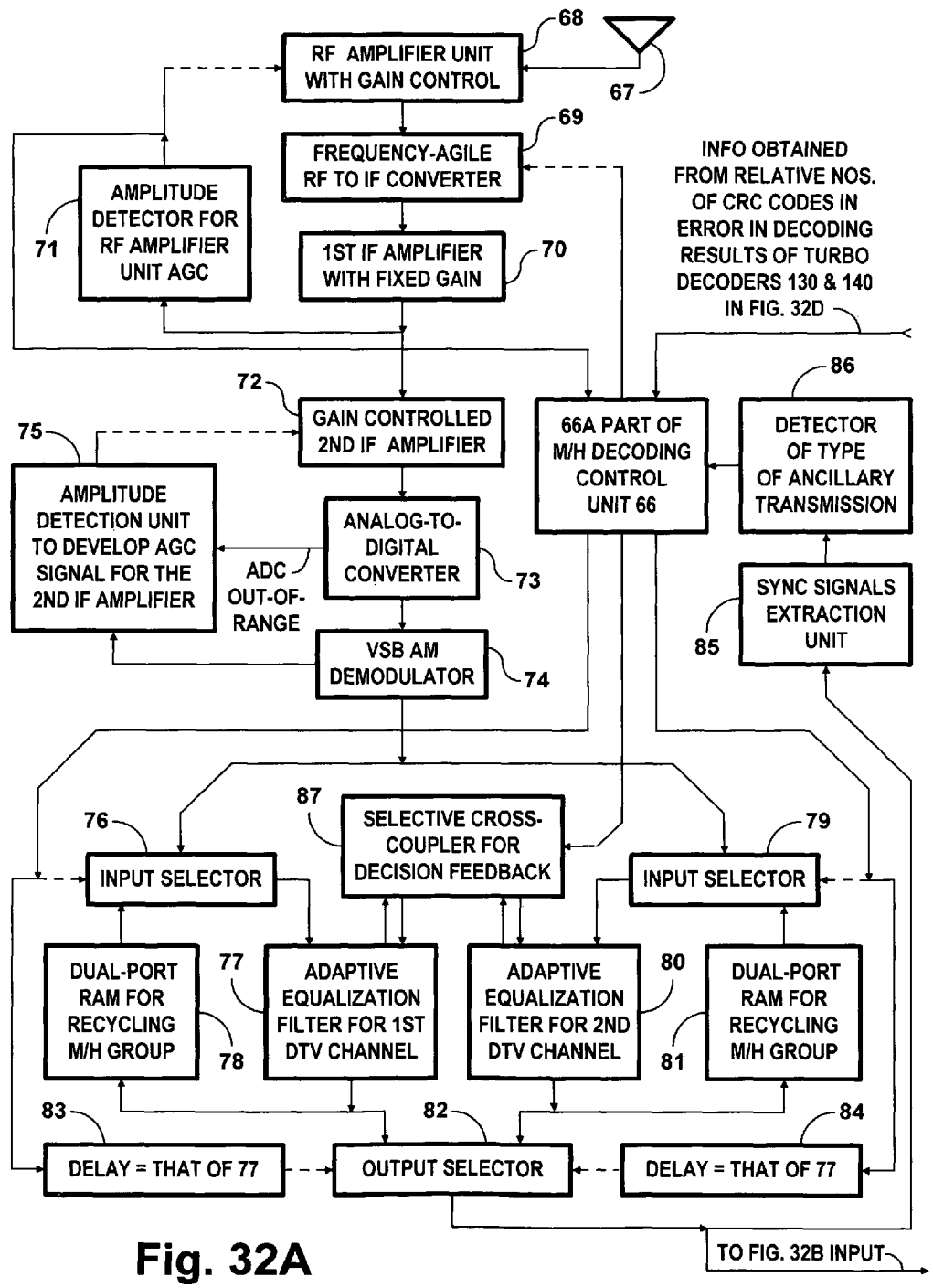
Figure 32B:
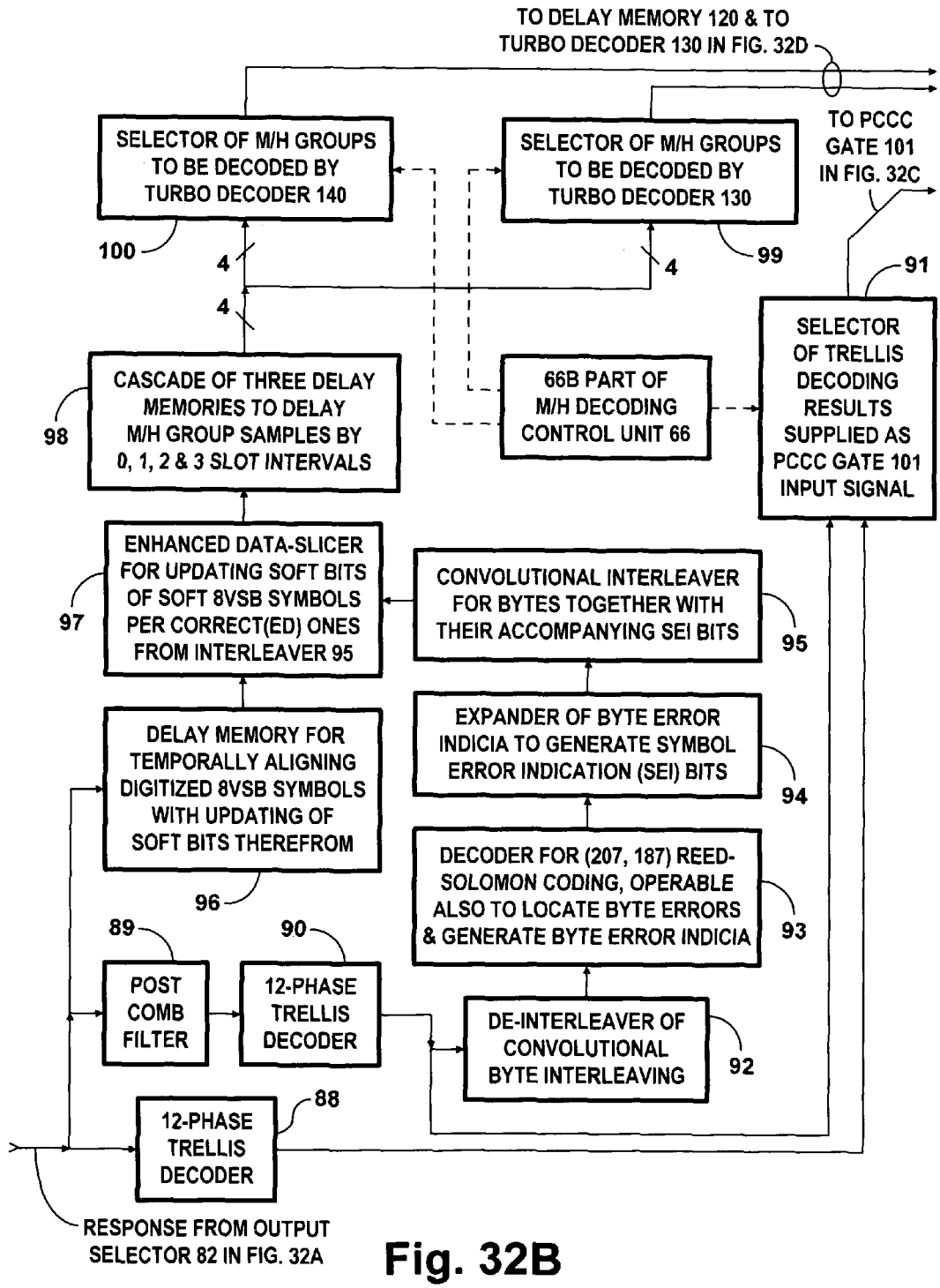
Figure 32C:
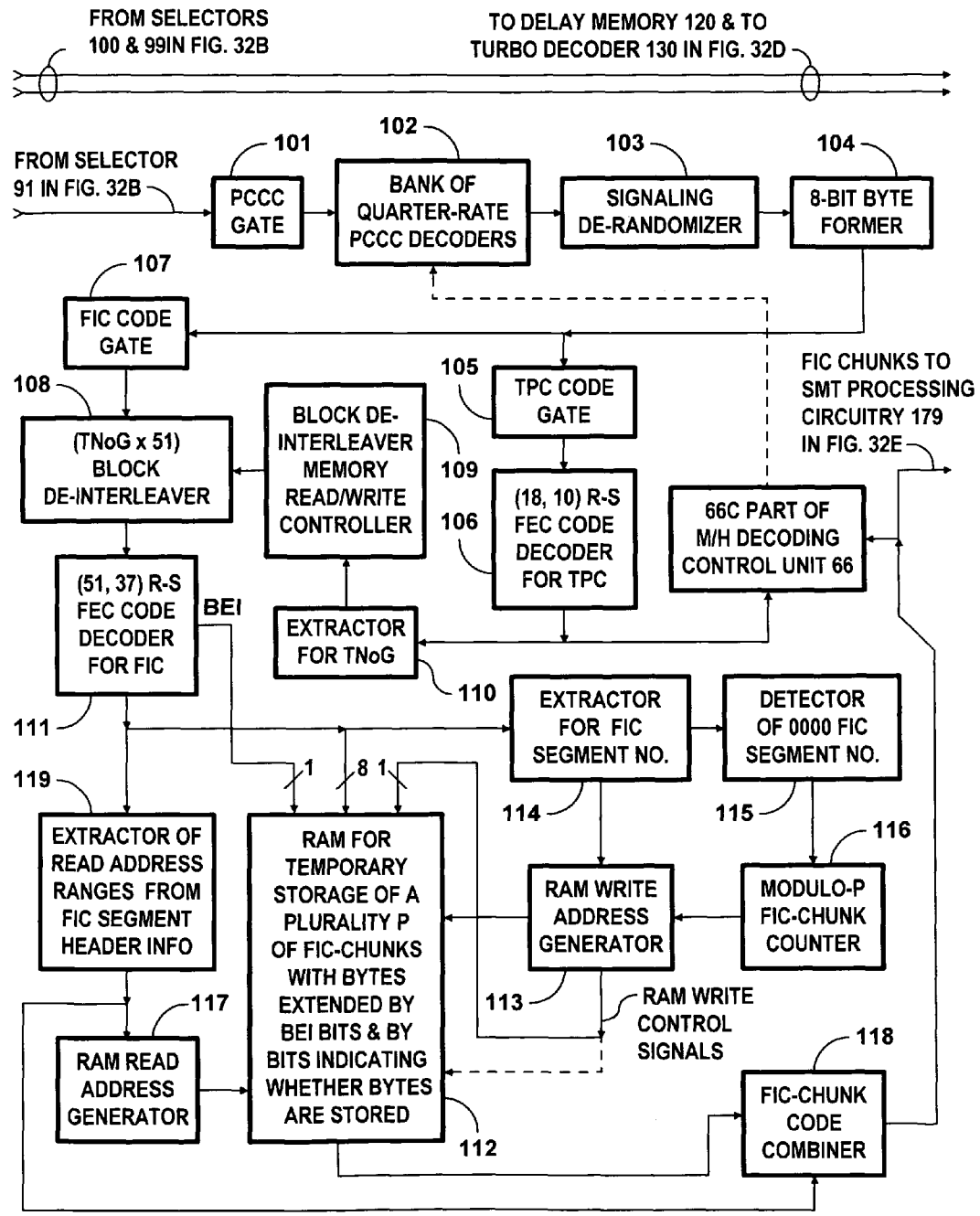

FIG. 32 is an assembly drawing that shows how FIGS. 32A, 32B, 32C, 32D and 32E combine to provide a schematic diagram of a DTV receiver apparatus for receiving M/H transmissions broadcast from two DTV transmitters, each of the sort shown in FIG. 1. The two DTV transmitters broadcast similar program material over different radio-frequency (RF) channels, and their coverage areas partially overlap. The FIG. 32 DTV receiver apparatus is designed for having continuing reception of the similar program material as it is moved from the coverage area of one of the two DTV transmitters to the coverage area of the other of the two DTV transmitters. Continuing reception of the similar program material requires that the movement of the FIG. 32 DTV receiver apparatus remain within the coverage area of at least one of the DTV transmitters broadcasting the similar program material. The number of the DTV transmitters broadcasting the similar program material can exceed two, and there may be regions where the coverage areas of more than two of these DTV transmitters overlap. If the FIG. 32 DTV receiver apparatus is moved into such a region, its reception will be primarily directed towards receiving the stronger two of the RF signals available to it. The DTV transmitters that broadcast similar program material and that have overlapping coverage areas are presumed to transmit information concerning the respective TV channels those DTV transmitters use for broadcasting. This information is included in an optional Cell Information Table for ATSC-M/H (CIT-MH) that the transmitters contemporaneously transmit in selected IP packets for each M/H Service. One of the several functions of the first part 66A of the M/H decoding control unit 66 shown in FIG. 32A is the selection of the radio-frequency (RF) channels to be received, which selection takes the CIT-MH table into account. The third part 66C of the M/H decoding control unit 66 shown in FIG. 32C is connected to receive the TPC signals of the RF channels selected for reception. The M/H decoding control unit 66 responds to the subchannel_interleaving numbers contained within these TPC signals to coordinate the selection of subchannels conveying the same program material FIG. 32A shows an antenna 67 for capturing RF DTV signals applied as input signal to an RF amplifier unit 68 with automatic gain control (AGC). The antenna 67 and the RF amplifier unit 68 are capable of capturing and amplifying ultra-high-frequency (UHF) DTV signals. In some embodiments of the FIG. 32 DTV receiver apparatus the antenna 67 and the RF amplifier unit 68 are further capable of capturing and amplifying very-high-frequency (VHF) DTV signals, or at least the higher-frequency VHF DTV signals. The RF amplifier unit 68 is connected for supplying amplified RF DTV signals to a frequency-agile RF-to-IF converter 69 that converts radio-frequency (RF) DTV signals to intermediate-frequency (IF) DTV signals for application to a first intermediate-frequency amplifier 70 as input signal thereto. The first part 66A of the M/H decoding control unit 66 is connected for selecting the beat frequency oscillations that the frequency-agile RF-to-IF converter 69 generates for implementing its RF-to-IF conversion. The first IF amplifier 70 has fixed gain and the amplified RF signal it supplies as output signal is applied as input signal to an amplitude detector 71, which responds to supply gain-control signal to the RF amplifier unit 68, thus completing a loop for its AGC. The gain-control signal developed by the amplitude detector 71 is also supplied to the first part 66A of the M/H decoding control unit 66, which includes circuitry for comparing the gain-control signals developed for RF DTV signals received at different times from different DTV transmitters. The results of this comparison are used to help in deciding when the signal received from a DTV transmitter is no longer of sufficient strength to be turbo decoded usefully.

The output signal from the first IF amplifier 70 is also applied as input signal to a second IF amplifier 72, which is gain-controlled. The second IF amplifier 72 is connected for supplying an amplified IF signal as its output signal. An analog-to-digital converter 73 is connected for digitizing the amplified IF signal supplied by the second IF amplifier 72. The ADC 73 is connected for supplying digitized amplified IF signal to a demodulator 74 for the digitized vestigial-sideband amplitude-modulated IF carrier wave in that digitized amplified IF signal. The demodulator 74 supplies a digital signal descriptive of the baseband DTV signal that modulated the amplitude of the RF carrier wave from a DTV transmitter that was selected for reception by the FIG. 32 receiver apparatus. An amplitude detection unit 75 is used to develop automatic-gain-control (AGC) signal supplied to the second IF amplifier 72 for controlling the gain thereof. FIG. 32A shows the amplitude detection unit 75 developing AGC signal partly in response to indications from the ADC 73 that its input signal from the first IF amplifier 70 is so large as to be out of range for proper digitization. FIG. 32A shows the amplitude detection unit 75 developing AGC signal in further response to the amplified IF signal that the second IF amplifier 72 supplies as its output signal. A sophisticated design of the amplitude detection unit 75 data-slices the second IF amplifier 72 output signal using a bin comparator. Then, the amplitude detection unit 75 adjusts the gain of the second IF amplifier 72 to make the positive and negative variances of the output signal from bin centers substantially equal to each other. The portion of the FIG. 32 receiver apparatus described in this paragraph has a number of known substantial equivalents, some of which demodulate the amplified VSB AM IF signal before analog-to-digital coversion to recover digital signal descriptive of baseband DTV signal.

An input selector 76 has a first input port to which the output signal of the demodulator 74 is applied, a second input port, and an output port connected for to the input port of an adaptive equalization filter 77. The first part 66A of the M/H decoding control unit 66 supplies a respective control signal to the input selector 76 conditioning the input selector 76 to reproduce at is output port a selected one of the respective signals applied to its first and second input ports. The control signal conditions the input selector 76 to reproduce only those portions of the output signal of the demodulator 74 responsive to DTV signal received from a first DTV transmitter. The adaptive equalization filter 77 performs adaptive channel equalization solely for the baseband DTV signal received from that first DTV transmitter, as reproduced at the output port of the input selector 76. A dual-port random-access memory 78 has a random-access port connected for being written to from the output port of the equalization filter 77 and has a serial output port connected for reading to the second input port of the input selector 76. The RAM 78 and the input selector 76 are operated for recycling the output signal of the adaptive equalization filter 77 to its input port when signal broadcast by the first DTV transmitter is not otherwise available for updating adaptation of the equalization filter 77.

An input selector 79 has a first input port to which the output signal of the demodulator 74 is applied, a second input port, and an output port connected for to the input port of an adaptive equalization filter 80. The M/H decoding control unit 66 supplies a respective control signal to the input selector 79 conditioning the input selector 79 to reproduce at is output port a selected one of the respective signals applied to its first and second input ports. The control signal conditions the input selector 79 to reproduce only those portions of the output signal of the demodulator 74 responsive to DTV signal received from a second DTV transmitter. The adaptive equalization filter 80 performs adaptive channel equalization solely for the baseband DTV signal received from that second DTV transmitter, as reproduced at the output port of the input selector 79. A dual-port random-access memory 81 has a random-access port connected for being written to from the output port of the equalization filter 80 and has a serial output port connected for reading to the second input port of the input selector 79. The RAM 81 and the input selector 79 are operated for recycling the output signal of the adaptive equalization filter 80 to its input port when signal broadcast by the second DTV transmitter is not otherwise available for updating adaptation of the equalization filter 80.

The part 66A of the M/H decoding control unit 66 generates respective control signals applied to the input selector 76 and to the input selector 79, taking into account the subchannel_interleaving information extracted from the TPC signals of received RF channels. When two or more DTV transmitters broadcast the same program material and their respective coverage areas overlap, each DTV transmitter will broadcast that same program material in a different set of M/H Groups than the other DTV transmitter(s). This is done as described supra with reference to FIGS. 5-8. The M/H decoding control unit 66 relies on the subchannel_interleaving information for determining the time offset(s) between the same program material being transmitted at different radio frequencies by respective DTV transmitters. The FIG. 32 receiver may be situated where the coverage areas of two or more of these DTV transmitters overlap. The first part 66A of the M/H decoding control unit 66 can then arrange for the frequency-agile RF-to-IF converter 69 to convert the RF signals from these DTV transmitters on a time-staggered basis to IF signal for amplification by the IF amplifiers 70 and 72. The amplified IF signals can then be digitized by the ADC 73 and subsequently demodulated by the VSB AM demodulator 74 to recover two transmissions of the same program material on the time-staggered basis. Subsequent parts 66B and 66C of the M/H decoding control unit 66 shown in FIGS. 32B and 32C respectively can then arrange for the earlier received duplicate program material to be delayed so as to be contemporaneous with the duplicate program material as later received. Then, the part 66C of the M/H decoding control unit 66 can arrange for both the earlier received and the later received duplicate program material to be turbo decoded contemporaneously with respective turbo decoders shown in FIG. 32D. The turbo decoders can exchange information with each other concerning the confidence levels of the data bits they each decode, improving the decoding capability of the FIG. 32 receiver when it is situated where the coverage areas of two DTV transmitters overlap.

An output selector 82 is connected for reproducing at an output port thereof a selected one of the equalized baseband DTV signals respectively received at first and second input ports thereof. The first input port of the output selector 82 is connected for receiving the baseband response of the equalization filter 77, and the second input port of the output selector 82 is connected for receiving the baseband response of the equalization filter 80. FIG. 32A shows the control signal applied to the input selector 76 being subjected to a delay 83 that compensates for the latent delay of the adaptive equalization filter 77 and thereafter supplied as a first control signal to the output selector 82. The output selector 82 is conditioned by this first control signal to reproduce at its output port the adaptive equalization filter 77 response to the DTV signal received from the first DTV transmitter. FIG. 32A shows the control signal applied to the input selector 79 being subjected to a delay 84 that compensates for the latent delay of the adaptive equalization filter 80 and thereafter supplied as a second control signal to the output selector 82. The output selector 82 is conditioned by this second control signal to reproduce at its output port the adaptive equalization filter 80 response to the DTV signal received from the second DTV transmitter.

The output port of the output selector 82 is connected for supplying these selectively reproduced responses of the adaptive equalization filters 77 and 80 to the input port of a synchronization signals extraction unit 85. Responsive to data-field-synchronization (DFS) signals, the sync extraction unit 85 detects the beginnings of data frames and fields. Responsive to data-segment-synchronization (DSS) signals, the sync extraction unit 85 detects the beginnings of data segments. The FIG. 32 DTV receiver apparatus uses the DSS and DFS signals for controlling its operations similarly to the way this is conventionally done in DTV receivers. None of FIGS. 32A, 32B, 32C, 32D and 32E explicitly shows the apparatus and connections thereof for effecting these operations.

A decoder 86 for detecting the type of ancillary transmission responds to 8-bit sequences contained in final portions of the reserved portions of DFS signals separated by the sync extraction unit 85. The decoder 86 is connected for indicating the type of ancillary transmission to part 66A of the M/H decoding control unit 66, which control unit 66 controls turbo decoding of CCC and plural-dimensional decoding of RS Frames in the FIG. 32 DTV receiver apparatus. The type of ancillary transmission that the decoder 86 detects may be one that conditions the decoder 86 to extract further information concerning the ancillary transmission from the initial portions of the reserved portions of DFS signals separated by the sync extraction unit 85. The decoder 86 is connected for supplying such further information to part 66A of the M/H decoding control unit 66. Many of the connections of the M/H decoding control unit 66 to the elements involved in turbo decoding of CCC and in plural-dimensional decoding of RS Frames are not explicitly shown in FIGS. 32A, 32B, 32C, 32D and 32E. This is done so as to keep those figures from being too cluttered to be understood readily.

A selective cross-coupling of decision feedback for the adaptive equalization filters 77 and 80 provides for parallel incremental updating of their respective filter coefficients during iterative-diversity reception. The adaptive equalization filters 77 and 80 are structurally similar, each of them being of a type that uses a Kalman feedback loop for incrementally adjusting its filter coefficients. The M/H decoding control unit 66 connected for generating control signal for controlling a selective cross-coupler 87 of decision feedback for the adaptive equalization filters 77 and 80. This control signal indicates the times when frequency-diversity reception is not being used, but iterative-diversity reception is being used. During such times a portion of the selective cross-coupler 87 transmits incremental error information from the Kalman loop of the adaptive equalization filter 77 to the Kalman loop of the adaptive equalization filter 80. Also, during such times the selective cross-coupler 87 transmits incremental error information from the Kalman loop of the adaptive equalization filter 80 to the Kalman loop of the adaptive equalization filter 77. The one-to-three Slot-interval differential delay between the respective input signals to the equalization filters 77 and 80 is so long that there is no appreciable increase risk of undesired tendency toward self-oscillation in either Kalman loop. However, there appears to be an increase in adaptive gain. The selective cross-coupler 87 provides no cross-coupling of the Kalman loops of the adaptive equalization filters 77 and 80 during frequency-diversity reception, when the filters 77 and 80 have to equalize respective signals transmitted by two different transmitters.

The output port of the output selector 82 is connected for supplying the selectively reproduced responses of the adaptive equalization filters 77 and 80 to the portion of the FIG. 32 receiver shown in FIG. 32B. FIG. 32B shows the output signal from the output selector 82 being received directly as input signal for a 12-phase trellis decoder 88. FIG. 32B shows the output signal from the output selector 82 being supplied to the input port of a post comb filter 89 that has its output port connected for supplying input signal for a 12-phase trellis decoder 90. A selector 91 has first and second input ports connected for receiving trellis decoding results as supplied from the output ports of the trellis decoders 88 and 90 respectively. The part 66B of the M/H decoding control unit 66 is connected for supplying a control signal to the selector 91 for selecting which of the trellis decoding results received at the first and second input ports of the selector 91 will be reproduced at the output port thereof. The M/H decoding control unit 66 determines whether or not the DFS signal includes an indication that the most significant bits of the 8-VSB symbols of the PCCC used for TPC and FIC signaling were not precoded. The trellis coding results from the trellis decoder 88 are selected for reproduction by the selector 91 if the M/H decoding control unit 66 determines that the DFS signal includes such an indication. The selection of the trellis coding results from the trellis decoder 91 for reproduction by the selector 91 is based on the M/H decoding control unit 66 determining that the DFS signal includes no such indication. The trellis coding results reproduced at the output port of the selector 91 are forwarded to the portion of the FIG. 32 receiver shown in FIG. 32C to be used in the recovery of TPC and FIC signals.

The input port of a de-interleaver 92 of convolutional byte interleaving per A/53 is connected to receive trellis coding results from the trellis decoder 90. The output port of the byte de-interleaver 92 is connected for supplying segments of a de-interleaved data field to a decoder 93 of (207, 187) Reed-Solomon codewords. If possible, the Reed-Solomon decoder 93 corrects any byte errors in each (207, 187) Reed-Solomon codeword supplied thereto. The RS decoder 93 is operable for individually locating probable errors within the RS codewords it finds to be correctable. The RS decoder 93 is arranged to supply a respective indication of whether each byte of each codeword is or is not probably in error. The RS decoder 93 is arranged to supply a respective indication of probable error in each of the bytes of the RS codewords that the RS decoder 93 finds to have too many bytes probably in error to be capable of correction. The RS decoder 93 is arranged to supply respective indicia of no probable error for each of the bytes of the RS codewords that the RS decoder 93 finds to be correct. These respective indicia of whether or not the bytes in each successive codeword are probably in error are supplied from the RS decoder 93 in the same order as the bytes from the byte de-interleaver 92. The bytes of each (207, 187) RS codeword, as corrected if possible, are supplied to an expander 94 together with corresponding byte error indicia. The expander 94 converts the byte error indicia to Symbol Error Indication (SEI) bits indicating whether or not the four successive 2-bit symbols in each byte are probably in error. The expander 94 supplies the successive bytes of each (207, 187) RS codeword, each byte having been expanded to twelve bits, to a convolutional byte interleaver 95 to be interleaved in a pattern that maps the convolutional byte interleaving prescribed by A/53. FIG. 32B shows a delay memory 96 connected to be written with the output signal from the output selector 82. The output signal from the output selector 82 is temporarily stored in the delay memory 96 for subsequent reading, with the 8-VSB symbol delay in the delay memory 96 essentially matching that of the cascaded elements 89, 90, 91, 93, 94 and 95. Delayed 8-VSB symbols are read from the delay memory 96 to an enhanced data-slicer 97 that provides data-slicing for both the turbo decoders 130 and 140. The enhanced data-slicer 97 includes a conventional data-slicer followed by apparatus for updating the soft bits in the resulting soft 8-VSB symbols per the correct(ed) 8-VSB symbols. A representative construction of the enhanced data-slicer 97 is described in detail further on in the specification, with reference to FIG. 33 of the drawings.

The enhanced data-slicer 97 is connected for supplying enhanced soft data concerning each successively received M/H Group of 8-VSB symbols for application as input signal to a tapped cascade connection 98 of three delay memories operated to delay each successively received M/H Group by 0, 1, 2 and 3 slot intervals. This tapped cascade connection 98 of the three delay memories is used to compensate for any differential delay between signals that contain the same program information and are received from different DTV transmitters used to implement frequency-diverse transmissions. These frequency-diverse transmissions have different types of subchannel interleaving as well to permit reception by an M/H receiver that has only a single frequency-agile front-end tuner for RF signals. This compensation for the differential delay between signals that contain the same program information aligns the signals temporally, permitting them to be turbo-decoded contemporaneously by respective turbo decoders that interchange information concerning the confidence levels of data bits of that same program information.

Figure 32D:
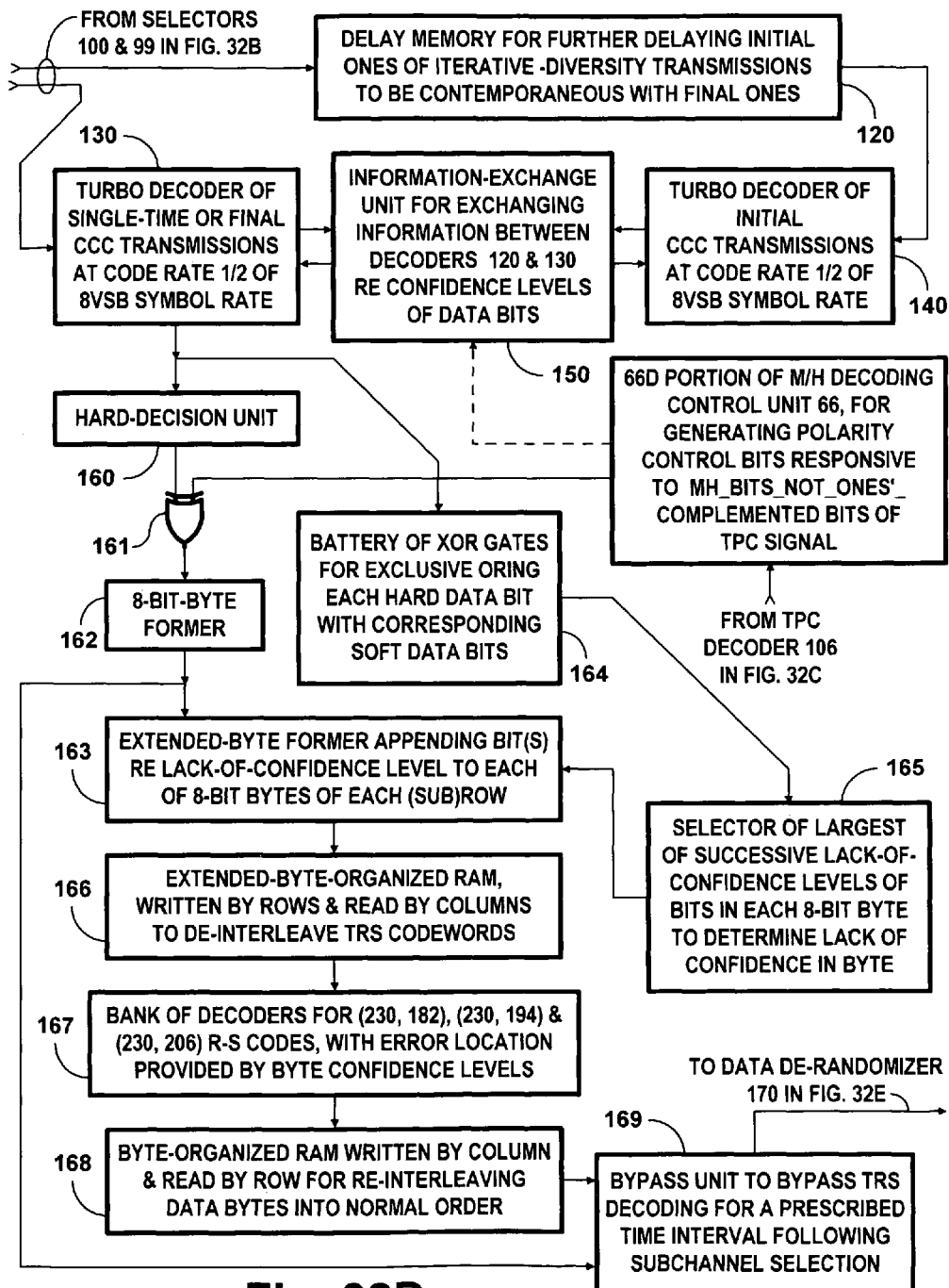

A selector 99 is connected for selectively reproducing one of four input signals thereto at an output port thereof for subsequent application to the input port of a turbo decoder 130 shown in FIG. 32D. These four input signals corresponds to the M/H Groups of 8-VSB symbols (with SEI bit extensions) as respectively delayed by 0, 1, 2 and 3 slot intervals by the tapped cascade connection 98 of three delay memories. FIG. 32B shows the selector 99 connected for receiving a control signal from part 66B of the M/H decoding control unit 66. This control signal controls the selector 99 in its selection of the one of the four input signals thereto that the selector 99 reproduces at its output port.

A selector 100 is connected for selectively reproducing one of four input signals thereto at an output port thereof to be delayed by a delay memory 120 shown in FIG. 32D before subsequent application to the input port of a turbo decoder 140 shown in FIG. 32D. These four input signals corresponds to the M/H Groups of 8-VSB symbols (with SEI bit extensions) as respectively delayed by 0, 1, 2 and 3 slot intervals by the tapped cascade connection 98 of three delay memories. FIG. 32B shows the selector 100 connected for receiving a control signal from part 66B of the M/H decoding control unit 66. This control signal controls the selector 100 in its selection of the one of the four input signals thereto that the selector 100 reproduces at its output port.

FIG. 32C shows a PCCC gate 101 connected for receiving trellis-decoding results from the selector 91, shown in FIG. 32B. The PCCC gate 101 is operated for extracting the PCCC'd signaling within each Group and reproducing that PCCC'd signaling to be applied as input signal to a decoder 102 for quarter-rate PCCC. The decoder 102 reproduces randomized signaling decoded (possibly with some errors) from the quarter-rate PCCC supplied thereto and is connected for supplying that randomized signaling as input signal to a signaling de-randomizer 103. The signaling de-randomizer 103 is connected for supplying de-randomized coded signaling to an 8-bit byte former 104.

FIG. 32C shows a TPC code gate 105 connected for extracting bytes of TPC code from bytes of the de-randomized signaling supplied by the byte former 104 and for supplying those extracted bytes of TPC code as input signal to a decoder 106 for (18, 10) Reed-Solomon coding. The decoder 106 recovers TPC information and is connected for supplying the TPC information to part 66C of the M/H decoding control unit 66 and to other elements of the receiver apparatus. The M/H decoding control unit 66 is able to respond to the TPC information to control selection of the type of outer convolutional decoding to be used on CCC portions of each M/H Group.

FIG. 32C shows an FIC code gate 107 connected for extracting byte-interleaved FIC code bytes from the bytes of de-randomized signaling supplied by the byte former 104 and reproducing those extracted bytes for application as input signal to a block de-interleaver 108. The block de-interleaver 108 is of matrix type and complements the block interleaving done by the block interleaver 62 described supra with reference to FIG. 23. In this specification (over)writing refers both to memory writing procedures in which storage locations are empty of content when written by new content and to memory writing procedures in which storage locations have their original contents overwritten by new content. The block de-interleaver 108 is essentially a byte-organized random access memory (RAM) with byte-storage locations arrayed in rows and columns to be (over)written and read in accordance with addressing and read/write control signals supplied from a block de-interleaver memory read/write controller 109. The byte-storage locations are arrayed in 51-byte rows for being (over)written by RS coded FIC data from respective Groups within each M/H sub-Frame. The memory read/write controller 109 needs to know the total number of Groups, TNoG, within each M/H sub-Frame in order to know the number of these 51-byte rows. The memory read/write controller 109 uses this knowledge to control the addressing of successive columns of TNoG byte-storage locations when writing to them. An extractor 110 is connected to extract TNoG for the current M/H sub-Frame (current_TNoG) from the response of the decoder 106 of the (18, 10) Reed-Solomon coded TPC data. The value of current_TNoG appears NoG times in the TPC data recovered by the decoder 106 from the previous M/H sub-Frame. The extractor 110 selects from the TPC data those bit sequences descriptive of current_TNoG estimates and decides the value of current_TNoG based on the majority of concurring estimates. The extractor 110 is connected to supply that value of current_TNoG to the memory read/write controller 109.

After the final Group of each M/H sub-Frame concludes, the read/write controller 109 generates read addresses for reading rows of 35×TNoG bytes from the RAM in the block de-interleaver 108. The reading is completed before the initial Group of the next M/H sub-Frame begins and the contents of the memory in the block de-interleaver 108 will be overwritten. The block de-interleaver 108 is connected for supplying its de-interleaved FIC code response as input signal to a decoder 111 for (51, 37) Reed-Solomon coding. The decoder 111 recovers FIC information and is connected for supplying that FIC information to be written into addressed temporary-storage locations within a random-access memory 112. The decoder 111 generates a Byte Error Indication (BEI) bit whenever a (51, 37) Reed-Solomon codeword is found to contain byte error(s) that cannot be corrected. A BEI bit is generated when there is a momentary fade in received RF signal strength, for example.

The RAM 112 provides temporary storage for the bytes of the FIC information for one entire M/H Frame, plus two-bit extensions of those bytes. One of these extension bits is the BEI bit from the decoder 111 for (51, 37) RS coding. A further one of these extension bits is used for signaling whether or not byte-storage locations in the RAM 112 contain FIC information content. When the M/H receiver is initially powered up, or when there is a change in selection of the major reception channel, the contents of the RAM 112 are erased in bulk. This erasure sets the further one-bit extensions to signal the erasure—e.g., the further one-bit extensions are all set to ZERO.

A write address generator 113 is connected for supplying write addressing to the RAM 112 such that FIC information is stored at appropriate locations within the M/H Frame, even if that FIC information begins to be furnished part way through the M/H Frame. An extractor 114 is connected for extracting the current FIC-Segment number from the header of the FIC Segment being currently written into the RAM 112 and supplying that current FIC-Segment number to the write address generator 113. The extractor 114 is further connected for supplying the current FIC-Segment number to a detector 115 for generating a pulse response to the current FIC-Segment number being '0000'. The detector 115 can be a four-input NOR gate operating as a decoder for 0000. An FIC-Chunk counter 116 is connected for receiving pulse responses from the detector 115 as count input signal. The write address generator 113 combines the FIC-Chunk count supplied from the counter 116 with the current FIC-Segment number supplied from the extractor 114 to generate each write address that the write address generator 113 supplies to the RAM 112.

The write addresses that the write address generator 113 supplies to the RAM 112 are accompanied by write control signals, which write control signals are also supplied as the further extension bits of the extended bytes supplied for being written into storage locations of the RAM 112. The value of these write control signals is the opposite—e.g., ONE—of the value indicating that a byte-storage location is empty of content. Accordingly, the further extension bits temporarily stored in respective extended-byte-storage locations of the RAM 112 are indicative of whether or not those locations store bytes of FIC information.

Figure 32E:
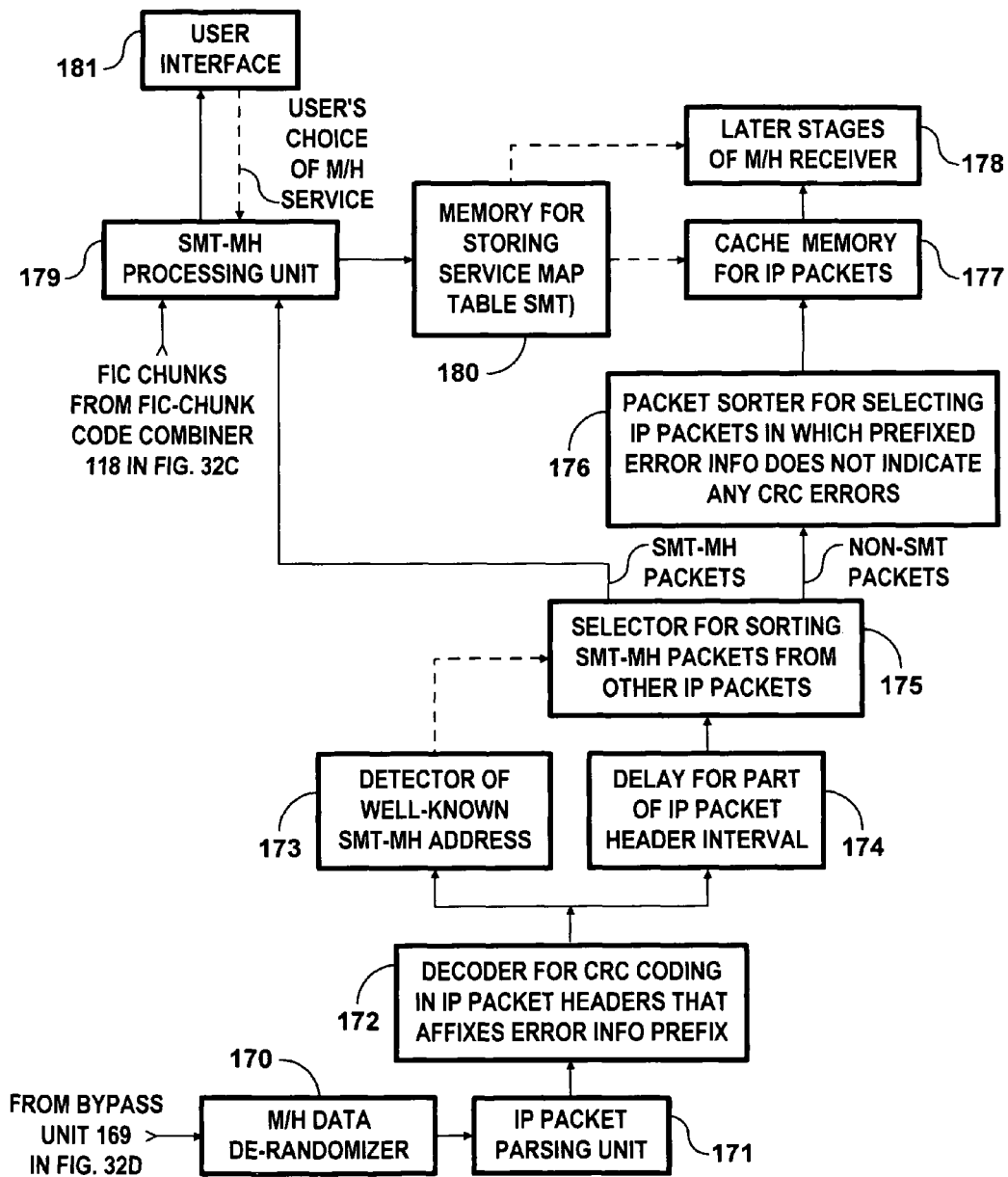

A read address generator 117 is connected for supplying read addressing to the RAM 112 when the RAM 112 reads its stored FIC information to provide input signal for an FIC-Chunk code combiner 118 at the conclusion of each M/H Frame interval. The FIC-Chunk code combiner 118 is connected for supplying processed FIC Chunks to part 66C of the M/H decoding control unit 66. (FIG. 32E shows processed FIC Chunks from the FIC-Chunk code combiner 118 being supplied to SMT-MH processing unit 179 to be integrated with SMT-MH information during the generation of Service Map Data written into memory 180 for temporary storage therewithin.) The FIC-Chunk code combiner 118 combines correct 37-byte FIC-Segments from similar FIC-Chunks to generate correct FIC-Chunks, if possible.

The decoder 111 for (51, 37) RS coding is connected for supplying FIC-Segments to a read-address-ranges extractor 119 for extracting information from their headers concerning the FIC_last_segment_num(ber) of each of the P FIC-Chunks temporarily stored in the RAM 112. This information is temporarily stored in memory within the read-address-ranges extractor 119 to be used for controlling the operation of the read address generator 117 when reading FIC-Chunks in parallel from the RAM 112 to the FIC-Chunk code combiner 118.

FIG. 32D shows the turbo decoder 130 for CCC signal and the delay memory 120 connected for receiving respective input signals from the selector 99 and from the selector 100 in FIG. 32B. The delay memory 120 is operated for temporally aligning the initial-component transmissions of an iterative-diversity broadcast as reproduced in its delayed response with the final-component transmissions of the iterative-diversity broadcast as applied to the turbo decoder 130. The response of the delay memory 120 is applied as input signal to the turbo decoder 140 for CCC signal, which turbo decoder 140 is selectively operated in parallel with the turbo decoder 130. The delay memory 120 provides a number of M/H Frame intervals of delay as determined by the M/H decoding control unit 66 in response to the iterative_diversity_delay bits extracted from the TPC signal that the decoder 106 for (18, 10) RS FEC code supplies. This number of M/H Frame intervals will be zero if a code rate one-quarter the 8-VSB symbol rate is desired without resort to iterative diversity, but is more likely to be eight, twelve or sixteen.

The delay memory 120 facilitates the parallel operation of the turbo decoders 130 and 140 to decode respectively the initial-component transmissions and the final-component transmissions of an iterative-diversity CCC broadcast contemporaneously. Furthermore, the parallel operation of the turbo decoders 130 and 140 permits exchanging information between them concerning the confidence levels of soft data bits. An information-exchange unit 150 is connected between corresponding points in the turbo loops of the decoders 130 and 140 for performing such exchange. The turbo decoder 130 may be operated alone when receiving a single-time SCCC broadcast that does not employ iterative diversity. The delay memory 120, the turbo decoder 140 and the information-exchange unit 150 are not operated when receiving a single-time SCCC broadcast and do not need to be powered at such time.

When a DTV transmitter is operated to permit iterative-diversity reception of its signals alone, the data bits of the early-component transmissions preferably ones' complement the data bits of the corresponding late-component transmissions. When similar program material is broadcast by two cooperating DTV transmitters having respective coverage areas that overlap, it is advantageous for one of the cooperating DTV transmitters to transmit the similar program material in ones' complemented form. When broadcasting is of a sort described in the foregoing two sentences, the information-exchange unit 150 needs to compare the confidence levels of two sets of data bits that are complementary to each other. If similar program material is broadcast by three cooperating DTV transmitters having respective coverage areas all of which overlap in certain regions, two of the transmitters will have to transmit respective sets of data bits that are alike, rather than complementary to each other. Depending on the location of the FIG. 32 receiver apparatus, the information-exchange unit 150 is apt to have to compare the confidence levels of two sets of data bits that are similar to each other, rather than complementary to each other. Accordingly, the information-exchange unit 150 is constructed so it can accommodate comparison of the confidence levels of the two sets of data bits from the turbo loops of decoders 130 and 140 when those sets of data bits are similar to each other, rather than complementary to each other. FIG. 32D shows a portion 66D of the M/H decoding control unit 66 connected for supplying the information-exchange unit 150 a binary control signal. This binary control signal indicates which of the two modes of comparison of the confidence levels of the two sets of data bits from the turbo loops of decoders 130 and 140 is appropriate to use. The M/H decoding control unit 66 generates this binary control signal, which has a first value during iterative-diversity reception of a single DTV channel. When first and second DTV channels are being received in a region where the coverage areas of their transmitters overlap, the M/H decoding control unit 66 generates the binary control signal responsive to the result of exclusive-ORing the M?H_data_not_ones'_complemented? bits in the TPC signals of the first and second DTV channels.

The turbo decoder 130 is connected for supplying its decoding results to a hard-decision unit 160 that essentially comprises a hard limiter for soft data bits. As noted in the previous paragraph, some transmitters send a single transmission or the late component-transmission for iterative-diversity reception with ones' complemented data bits. So, the turbo decoding results when receiving M/H data from such transmitters need to be ones' complemented to regenerate the original data bits. The hard-decision unit 160 is connected for supplying hard-decisions concerning data bits to one of two input connections to an exclusive-OR gate 161. The portion 66D of the M/H decoding control unit 66 is connected for supplying the other input connection of the XOR gate 161 a binary control signal. The M/H decoding control unit 66 generates this binary control signal dependent on the M/H_bits_not_ones'_complemented? bits in the TPC signal of the baseband DTV signal being decoded by the turbo decoder 130. If the hard-decisions concerning data bits supplied to the XOR gate 161 regenerate the original data bits, the value of the binary control signal supplied to the XOR gate 161 is ZERO. If the hard-decisions concerning data bits supplied to the XOR gate 161 need to be ones' complemented to regenerate the original data bits, the value of the binary control signal supplied to the XOR gate 161 is ONE. In either case the data bits in the output signal of the XOR gate 161 reproduce the original M/H data bits presuming them not to be corrupted by noise.

An 8-bit-byte former 162 forms the serial-bit response of the XOR gate 161 into eight-bit bytes. An extended-byte former 163 is connected for receiving the 8-bit bytes formed by the 8-bit-byte former 162 and appending to each of those bytes a number of bits indicative of the likelihood that that byte is in error. These bits indicative of the level of lack of confidence that a byte is correct are generated in the following way. A battery 164 of exclusive-OR gates is connected for exclusive-ORing the hard bit of each successive soft data bit from the turbo decoder 130 output signal with each of the soft bits descriptive of the level of confidence that hard bit is correct. The battery 164 of XOR gates so generates a respective set of bits indicative of the level of lack of confidence that each successive hard bit is correct. A selector 165 selects the largest of the successive lack-of-confidence levels regarding the eight bits in each 8-bit-byte to provide the bits indicative of the level of lack of confidence that the byte is correct.

The resulting extended bytes are written row by row into respective rows of extended-byte storage locations in a random-access memory 166 operated to perform the matrix-type block de-interleaving procedure that is a first step of the TRS decoding routine. The RAM 166 is subsequently read one column of 9-bit extended bytes at a time to a selected one of a bank 167 of decoders for (230, 182), (230, 194) and (230, 206) Reed-Solomon codes, respectively. The bank 167 of decoders will further comprise decoders for (235, 187), (223, 187) and (211, 187) Reed-Solomon codes prescribed by A/153 if those TRS codes continue to be used. The M/H decoding control unit 66 selects the appropriate decoder in response to information extracted from the TPC. The extension bits accompanying the 8-bit bytes of the TRS code are used to help locate byte errors for the TRS code, as will be described in further detail infra with reference to FIG. 26 of the drawings. Such previous location of byte errors facilitates successful use of a Reed-Solomon algorithm capable of correcting more byte errors than an algorithm that must locate byte errors as well as correct them. The 8-bit data bytes that have been corrected insofar as possible by the selected one of the RS decoders in the bank 167 are written, column by column, into respective columns of byte-storage locations of a random-access memory 168. The RAM 168 is operated to perform the matrix-type block re-interleaving procedure for data in further steps of the TRS decoding routine. In a final step of the TRS decoding routine, the byte-storage locations in the RAM 168 are read from row-by-row for supplying reproduced randomized M/H data to a bypass unit 169. The bypass unit 169 usually relays this reproduced randomized M/H data to an M/H data de-randomizer 170 shown in FIG. 32E. The bypass unit 169 is connected to bypass TRS decoding for a prescribed time interval following selection of a new sub-channel for reception, however, supplying the data de-randomizer 170 with bytes of randomized M/H data taken directly from the response of the byte former 162. A representative construction of the bypass unit 169 is shown in FIG. 15 of the above-referenced U.S. patent application Ser. No. 12/580,534.

Referring now to FIG. 32E, the M/H data de-randomizer 170 is connected for receiving the output signal from the bypass unit 169 in FIG. 32D. The M/H data de-randomizer 170 de-randomizes the bytes of that signal by converting them to serial-bit form and exclusive-ORing the bits with the prescribed PRBS. The M/H data de-randomizer 170 converts the de-randomized bits into bytes of M/H data and supplies those bytes to a parsing unit 171 for parsing the data stream into internet-protocol (IP) packets. The IP-packet parsing unit 171 performs this parsing responsive to two-byte row headers respectively transmitted at the beginning of each row of IP data in the RS Frame. This row header indicates where the earliest start of an IP packet occurs within the row of IP data bytes within the RS Frame. If a short IP packet is completely contained within a row of the RS Frame, the IP-packet parsing unit 171 calculates the start of a later IP packet proceeding from the packet length information contained in the earlier IP packet within that same row of the RS Frame.

The IP-packet parsing unit 171 is connected for supplying IP packets to a decoder 172 for cyclic-redundancy-check coding in IP packets. Each IP packet contains a two-byte, 16-bit checksum for CRC coding that IP packet. The decoder 172 is constructed to preface each IP packet that it reproduces with a prefix bit indicating whether or not error has been detected in that IP packet. The decoder 172 is connected to supply these IP packets as so prefaced to a detector 173 of a "well-known" SMT-MH address and to a delay unit 174. The delay unit 174 delays the IP packets supplied to a packet selector 175 for selecting SMT-MH packets from other IP packets. The delay unit 174 provides delay of a part of an IP packet header interval, which delay is long enough for the detector 173 to ascertain whether or not the "well-known" SMT-MH address is detected.

If the detector 173 does not detect the "well-known" SMT-MH address in the IP packet, the detector 173 output response conditions the packet selector 175 to reproduce the IP packet for application to a packet sorter 176 as input signal thereto. The packet sorter 176 sorts out those IP packets in which the preface provides no indication of CRC coding error for writing to a cache memory 177 for IP packets. The prefatory prefix bit before each of the IP packets indicating whether there is CRC code error in its respective bytes is omitted when writing the cache memory 177. The cache memory 177 temporarily stores at least those IP packets not determined to contain CRC code error for possible future reading to the later stages 178 of the receiver. These later stages 178 of the receiver are sometimes referred to as the "upper layers" of the receiver.

If the detector 173 does detect the "well-known" SMT-MH address in the IP packet, establishing it as an SMT-MH packet, the detector 173 output response conditions the packet selector 175 to reproduce the SMT-MH packet for application to an SMT-MH processing unit 179, which includes circuitry for generating control signals for the later stages 178 of the M/H receiver. FIG. 32E shows the SMT-MH processing unit 179 connected for receiving FIC information from the FIC-Chunk code combiner 118 in FIG. 32C. The SMT-MH processing unit 179 integrates this FIC information with information from SMT-MH packets during the generation of Service Map Data. The Service Map Data generated by the SMT-MH processing unit 179 is written into memory 180 for temporary storage therewithin and subsequent application to the later stages 178 of the M/H receiver. The SMT-MH processing unit 179 relays those SMT-MH packets that have bit prefixes that do not indicate error in the packets to a user interface 181, which includes an Electronic Service Guide (ESG) and apparatus for selectively displaying the ESG on the viewing screen of the M/H receiver. U.S. patent application Ser. No. 12/555,248 filed 8 Sep. 2009 for A. L. R. Limberg and titled "Sub-channel Acquisition in a Digital Television Receiver Designed to Receive Mobile/Handheld Signals" provides more detailed descriptions of the operations of the portion of an M/H receiver as shown in FIG. 32E. The description with reference to the drawing FIGS. 12, 13 and 14 of that application describe operations relying on the SMT-MH tables available in A/153.

Figure 33:
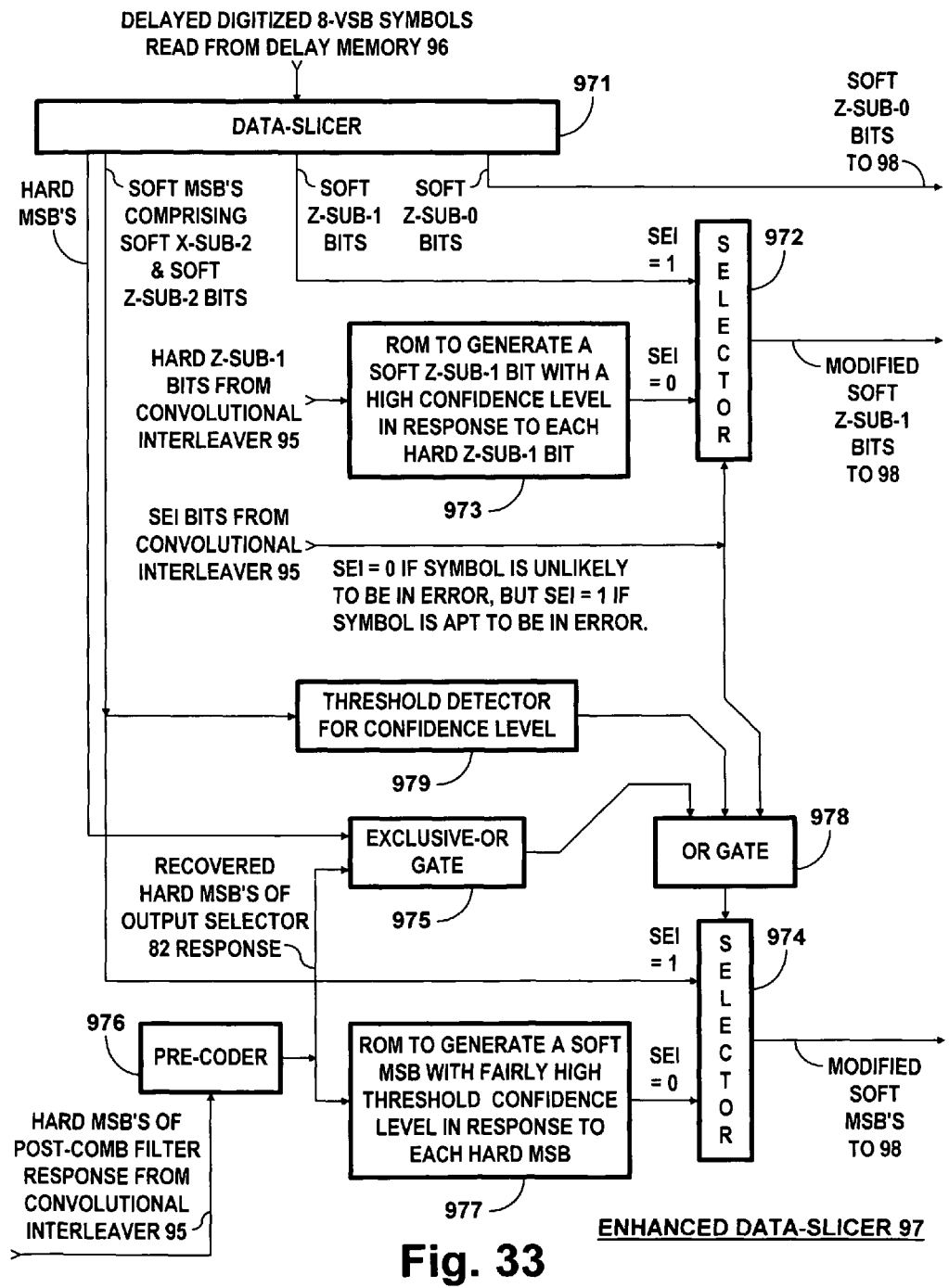
FIG. 33 is a detailed schematic diagram of a representative embodiment of the enhanced data-slicer depicted in FIG. 32B.

FIG. 33 shows a representative embodiment of the modified data-slicer 97 depicted in FIG. 32B. The modified data-slicer 97 includes a conventional data-slicer 971 with an input port connected for receiving delayed digitized 8-VSB symbols read from the delay memory 97. The data-slicer 971 generates a first output signal composed of soft Z-sub-0 bits. Each of these soft Z-sub-0 bits has less-significant bits (LSBs) expressing a level of confidence that its hard most-significant bit (MSB) defining a hard Z-sub-0 bit is correct. These soft Z-sub-0 bits are respective first parts of the modified delayed soft 8-VSB symbols supplied to the cascade connection 98 of delay memories as input signal thereto.

The data-slicer 971 generates a second output signal composed of soft Z-sub-1 bits, which soft Z-sub-1 bits are supplied to the first of two input ports of a selector 972. Each of these soft Z-sub-1 bits has LSBs expressing a level of confidence that its MSB defining a hard Z-sub-1 bit is correct. A read-only memory 973 is connected for receiving hard Z-sub-1 bits from the output port of the convolutional byte interleaver 95 as address input signal and for responding to each hard Z-sub-1 bit for supplying a respective soft Z-sub-1 bit. Each of the soft Z-sub-1 bits read from the ROM 973 has LSBs expressing a high level of confidence that its hard MSB is correct. The soft Z-sub-1 bits read from the ROM 973 are supplied to the second input port of the selector 972. The selector 972 is connected for receiving, as its selection control signal, symbol-error-indication (SEI) bits from the output port of the convolutional byte interleaver 95. An SEI bit being ZERO signals that a hard Z-sub-1 bit from the output port of the convolutional byte interleaver 95 is unlikely to be in error. This conditions the selector 972 to reproduce at its output port the soft Z-sub-1 bit supplied to its second input port. The LSBs of this soft Z-sub-1 bit express a high level of confidence that its hard MSB is correct, which tends to speed up the subsequent turbo decoding procedures. An SEI bit being ONE signals that a hard Z-sub-1 bit from the output port of the convolutional byte interleaver 95 is apt to be in error. This conditions the selector 972 to reproduce at its output port the soft Z-sub-1 bit that the data-slicer 971 supplies to its first input port. The LSBs of this soft Z-sub-1 bit express a level of confidence that its MSB is correct, as determined from data slicing by the data-slicer 971. The soft Z-sub-1 bits reproduced at the output port of the selector 972 are respective second parts of the modified delayed soft 8-VSB symbols supplied to the cascade connection 98 of delay memories as input signal thereto.

The data-slicer 971 generates a third output signal composed of soft Z-sub-2 bits of main-service 8-VSB symbols and soft X-sub-2 bits of M/H-service 8-VSB symbols. These soft most-significant bits (MSBs) of 8-VSB symbols are supplied to the first of two input ports of a selector 974. Each of these soft MSBs has LSBs expressing a level of confidence that its hard MSB, which is supplied to the first of two input ports of an exclusive-OR gate 975, is correct. A pre-coder 976 is connected for receiving hard MSBs of post-comb filter 89 response from the output port of the convolutional byte interleaver 95 as input signal, which post-comb filter 89 response may have been corrected by the decoder 93 for (207, 187) Reed-Solomon coding. The output port of the pre-coder 976 is connected for supplying the second input port of the XOR gate 975 with recovered hard MSBs of output selector 82 response, as possibly corrected by the decoder 93 for RS coding. The output port of the pre-coder 976 is further connected for supplying supposedly recovered hard MSBs of output selector 82 response to a read-only memory 977 as address input signal. The ROM 977 responds to each hard. MSB received as address input signal for supplying a respective soft MSB. Each of the soft MSBs read from the ROM 977 has LSBs expressing a fairly high level of confidence that its hard MSB is correct. The soft MSBs read from the ROM 977 are supplied to the second input port of the selector 974. The soft MSBs reproduced at the output port of the selector 974 are respective third parts of the modified delayed soft 8-VSB symbols supplied to the cascade connection 98 of delay memories as input signal thereto.

The selector 974 is connected for receiving, as its selection control signal, the response of an OR gate 978. The output port of the exclusive-OR gate 975 is connected to a first of three input ports of the OR gate 978. The input port of a threshold detector 979 is connected for receiving soft MSBs from the data-slicer 971. The output port of the threshold detector 979 is connected for supplying a ONE to the second input port of the OR gate 978 only if the absolute value of the confidence level expressed by the LSBs exceeds a fairly high threshold. The third input port of the OR gate 978 is connected for receiving symbol-error-indication (SEI) bits from the output port of the convolutional byte interleaver 95.

An SEI bit supplied from the output port of the convolutional byte interleaver 95 being ONE signals that a hard MSB of a symbol of post-comb filter 89 response is apt to have been in error. This implies that the corresponding hard MSB of output selector 82 response recovered by the pre-coder 976 is apt to be in error, owing to the fact that the hard MSB of post-comb filter 89 response depends in part upon the hard MSB of output selector 82 response. So, in response to the SEI bit being ONE, the OR gate 978 supplies a ONE from the output port thereof as selection control signal to the selector 974. That selection control signal being ONE conditions the selector 974 to reproduce at its output port the soft MSB that the data-slicer 971 supplies to its first input port. The LSBs of this soft MSB bit express a level of confidence that its MSB is correct, as determined from data slicing by the data-slicer 971.

An SEI bit supplied from the output port of the convolutional byte interleaver 95 being ZERO signals that a hard MSB of a symbol of post-comb filter 89 response as supplied from the output port of the convolutional byte interleaver 95, after possible correction, is unlikely to be in error. In response to both the SEI bit and the threshold detector 979 response also being ZERO, the OR gate 978 reproduces at its own output port the response it receives from the output port of the exclusive-OR gate 975. The likelihood that the hard MSB of post-comb filter 89 response is correct is strongly suggestive, but not absolutely conclusive, that the supposed hard MSB of output selector 82 response recovered by the pre-coder 976 is correct as well. This is because the hard MSB of post-comb filter 89 response depends partly upon the hard MSB of output selector 82 response, which is exclusive-ORed with accumulated previous output selector 82 responses to generate that hard MSB of post-comb filter 89 response. However, there is a small possibility that both the hard MSB of output selector 82 response and the MSB of the accumulation of previous output selector 82 responses are in error, rather than both being correct, still resulting in lack of byte error in the post-comb filter 89 response. The likelihood of the existence of such double error is substantially lower, however, if the supposed hard MSB of output selector 82 response recovered by the pre-coder 976 corresponds to the hard MSB of output selector 82 response recovered by the data-slicer 971. So, when these MSBs have similar hard values, lower confidence levels expressed by the LSBs of the soft MSB recovered by the data-slicer 971 can be quite safely increased to the fairly high level of confidence expressed by the LSBs of the soft MSB read from the ROM 977.

The exclusive-OR gate 975 in effect compares the hard MSB of output selector 82 response recovered by the pre-coder 976 with the corresponding hard MSB of data-slicer 971 response. If these MSBs are the same, the response of the exclusive-OR gate 975 is a ZERO. The OR gate 978 reproduces this ZERO in its own response if both the concurrent threshold detector 979 response and the concurrent SEI bit are ZEROes. The ZERO response of the OR gate 978 applied to the selector 974 as selection control signal conditions the selector 974 to reproduce at its output port the soft MSB read to its second input port from the ROM 977. The LSBs of this soft MSB express a fairly high level of confidence that its hard MSB is correct. This tends to speed up the subsequent turbo decoding procedures, presuming this fairly high level of confidence that the hard MSB is correct is greater than that expressed by the LSBs of the soft MSB from the data-slicer 971.

This fairly high level of confidence in soft MSBs reproduced in accordance with those from ROM 977 is the same as the level of confidence that the threshold detector 979 uses as a threshold level of confidence. The threshold detector 979 response is a ONE only if the confidence level expressed by the less significant bits of the soft MSB bit supplied from the data-slicer 971 exceeds this threshold level of confidence. The threshold detector 979 response being a ONE causes the OR gate 978 response to be a ONE, which selection control signal conditions the selector 974 to reproduce at its output port the soft MSB supplied by the data-slicer 971. The higher confidence level of the soft MSB supplied by the data-slicer 971 has less tendency than the threshold confidence level of the soft MSB supplied by the ROM 978 to slow the subsequent turbo decoding procedures.

If the hard MSB of output selector 82 response recovered by the pre-coder 976 and the corresponding hard MSB recovered by the data-slicer 971 differ from each other, the response of the exclusive-OR gate 975 is a ONE. The OR gate 978 reproduces this ONE in its own response applied to the selector 974 as selection control signal, which conditions the selector 974 to reproduce at its output port the soft MSB recovered by the data-slicer 971. The LSBs of this soft MSB express a level of confidence that its hard MSB is correct, as determined from data slicing by the data-slicer 971.

Determining correct Z-sub-1 bits of the 8-VSB symbols in reliance upon the (207, 187) RS coding is simpler and more direct than attempting the determination of correct MSBs of the 8-VSB symbols, presuming that the MSBs of symbol-interleaved outer convolutional coding are not pre-coded in final transmission. This because the Z-sub-1 bits of the 8-VSB symbols are encoded directly within the (207, 187) RS coding, whereas the MSBs of those 8-VSB symbols are post-comb filtered before encoding within the (207, 187) RS coding. When the M/H transmissions are made using PCCC at one-half 8-SB symbol rate, the correction of Z-sub-1 bits in reliance upon the (207, 187) RS coding affects the data bits of the symbol-interleaved outer convolutional coding directly. The correction of the symbol MSBs in reliance upon the (207, 187) RS coding is done rather indirectly to affect the parity bits of the symbol-interleaved outer convolutional coding. Insofar as subsequent turbo decoding is concerned, this arrangement with PCCC is somewhat more advantageous than is the arrangement with SCCC, presuming that the MSBs of symbol-interleaved outer convolutional coding are not pre-coded in final transmission. In such SCCC arrangement the correction of Z-sub-1 bits in reliance upon the (207, 187) RS coding affects the parity bits of the symbol-interleaved outer convolutional coding directly. However, the correction of MSBs in reliance upon the (207, 187) RS coding is done rather indirectly in regard to the data bits of the symbol-interleaved outer convolutional coding.

In certain less preferred M/H broadcasting systems embodying aspects of the invention, the MSBs of all 8-VSB symbols are pre-coded in final transmission of them. The correction of these MSBs in reliance upon the (207, 187) RS coding can be done directly. One reason that such M/H broadcasting systems are less preferred is that the MSBs of 8-VSB symbols descriptive of symbol-interleaved outer convolutional coding require post-comb filtering prior to turbo decoding procedures, which filtering reduces signal-to-noise ratio.

Using the (207, 187) RS forward-error-correction coding to modify the soft 8-VSB symbols supplied for turbo decoding involves a considerable amount of computation. The question is whether that amount of computation can improve the subsequent turbo decoding and/or RS-Frame decoding sufficiently to be worthwhile performing. The (207, 187) RS coding performs better when the SNR of received signal is reasonably high and can be effective for overcoming short-duration burst noise randomly distributed over RS Frames, which noise is sometimes referred to as "impulse noise". Prior reduction of impulse noise can help reduce the number of iterations in turbo decoding, possibly saving more power than required for processing the (207, 187) RS forward-error-correction coding. At lower average SNR of received signal, decoding of the (207, 187) RS forward-error-correction coding becomes problematic, and power would be conserved by discontinuing that decoding. M/H receivers can be designed that respond to the SNR of received signal to determine when it is insufficiently high to warrant decoding of the (207, 187) RS forward-error-correction coding. SNR can be measured by accumulating the variances of 8VSB symbol levels from prescribed levels for data slicing, for example, with the SNR as so measured being used to determine when it is not sufficiently high to warrant decoding of the (207, 187) RS forward-error-correction coding.

Figure 34:
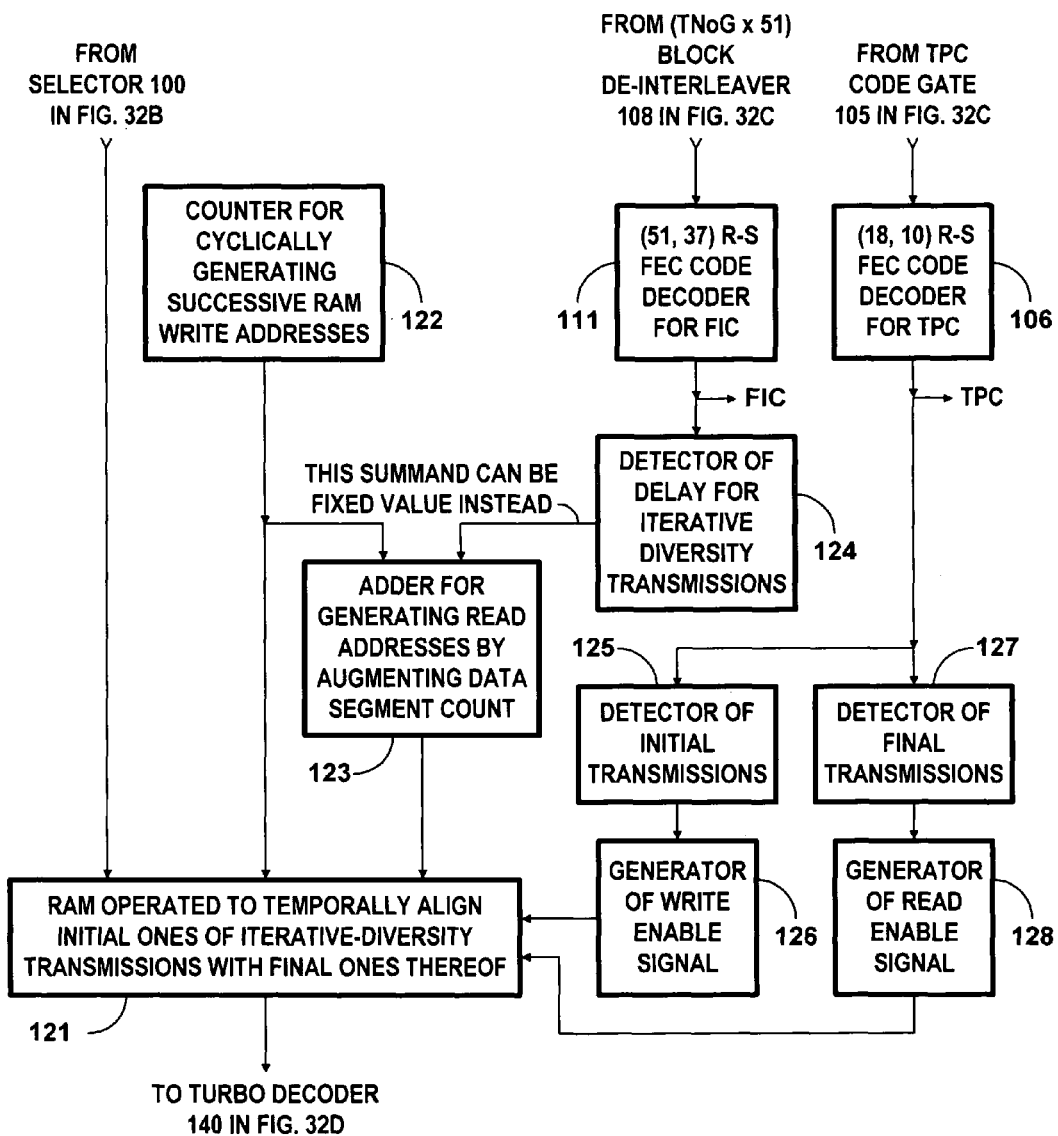
FIG. 34 is a detailed schematic diagram of a representative embodiment of the delay memory used in the FIG. 32D portion of the FIG. 32 receiver apparatus for delaying initial transmissions of M/H data, so as to align them in time with final transmissions of the same M/H data when iterative-diversity transmissions are being received.

FIG. 34 shows more particularly a random-access memory 121 being used as the basis of the delay memory 120 that FIG. 32C shows for delaying the initial-component transmissions when receiving an iterative-diversity broadcast of coded M/H data. FIG. 34 depicts, in detail, the circuitry used to support the operation of the RAM 121. FIG. 34 shows a counter 122 connected for cyclically generating successive write addresses for the RAM 121. The output count from the counter 122 is partitioned into a data field count, a data segment count and an 8-VSB symbol count. The data segment count, the 8-VSB symbol count and the least significant bit of the data field count are reset to appropriate values responsive to information in the data field synchronizing (DFS) signals at the beginning of 8-VSB data fields. The RAM 121 accepts a full range of data segment count that is an integer multiple M times 312 in number, as partial addresses both for writing and for reading. However, the RAM 121 need not have actual storage locations for symbols associated with all the full addresses that contain these partial addresses. The full addresses that have partial addresses related to data segments that do not include M/H data do not need actual storage locations for symbols associated with them. This reduces the number of actual storage locations for symbols required in the RAM 121 by the rather small factor of 156/150.

A digital adder 123 is connected for generating read addresses for the RAM 121 by augmenting the data segment count portions of the successive write addresses for the RAM 121 generated by the counter 122. The augmentation can be a fixed value, for offsetting the read addresses from the write addresses that they respectively augment by a specified odd multiple of 156, which multiple is typically 156 times either 81 or 79.

FIG. 34 shows a more sophisticated way of determining the offset between write addresses and read addresses for the RAM 121. The offset is determined responsive to an indication supplied by bits in the FIC signal from the decoder 111 for the (51, 37) RS FEC coded FIC. A detector 124 of the delay for iterative diversity transmission responds to these bits to generate the offset between the data segment count portions of the write and read addresses to be supplied to the RAM 121. This offset is supplied as the summand input signal to the digital adder 123 that augments the data segment count portions of the successive write addresses generated by the counter 122, thus to generate read addresses for the RAM 121. Programming the offset between write addresses and read addresses for the RAM 121 responsive to bits of the FIC signal, allows receivers to be made with different amounts of storage capability for bytes of iterative-diversity signals. As memory becomes cheaper, more receivers can be built with longer delays for overcoming momentary drop-outs in received signal strength. More importantly perhaps, such programming offers the broadcaster some trade-off in the way the RAM 121 is used in the receiver. If fewer Slots are used for iterative-diversity transmissions, the excess storage capacity of the RAM 121 can be utilized to provide longer delay for overcoming momentary drop-outs in received signal strength.

The RAM 121 will seldom, if ever, be called upon to temporarily store more than 40 M/H Groups of data per M/H Frame. The RAM 121 will never be called upon to temporarily store more than 40 M/H Groups of data per M/H Frame if careful broadcast practices are followed. Accordingly, the number of storage locations in the RAM 121 can be halved if their addressing takes into account the subchannel_interleaving and iterative_diversity_mode information extracted from TPC signaling.

A detector 125 for detecting initial transmissions is connected for receiving TPC signal from the decoder 106 for the (18, 10) RS FEC coded TPC. The TPC signal presumably includes an iterative_diversity_mode datum. The detector 125 responds to that iterative_diversity_mode datum indicating an initial transmission is currently being made to condition a generator 126 of write-enable signal to begin generating a write-enable signal for application to the RAM 121. Generation of the write-enable signal continues until the then current Slot concludes. The RAM 121 is conditioned by the write-enable signal to write the equalized baseband M/H signal supplied from the selector 101 to symbol storage locations specified by the write addressing received from the digital adder 123. These symbol storage locations will not be reached for reading until a second or so later.

A detector 127 for detecting final transmissions is connected for receiving TPC signal from the decoder 106 for the (18, 10) RS FEC coded TPC. The detector 127 responds to the iterative_diversity_mode datum indicating an final transmission being currently made to condition a generator 128 of read-enable signal to begin generating a read-enable signal for application to the RAM 121. Generation of the read-enable signal continues until the then current Slot concludes. The RAM 121 is conditioned by the read-enable signal to read delayed equalized baseband CCC from symbol storage locations specified by the read addressing received from the counter 122. The delayed equalized baseband CCC is read from the RAM 121 to supply input signal to the turbo decoder 140 for the initial-component transmissions of the iterative-diversity broadcast. The turbo decoder 140 is depicted in FIG. 32D.

Figure 35:
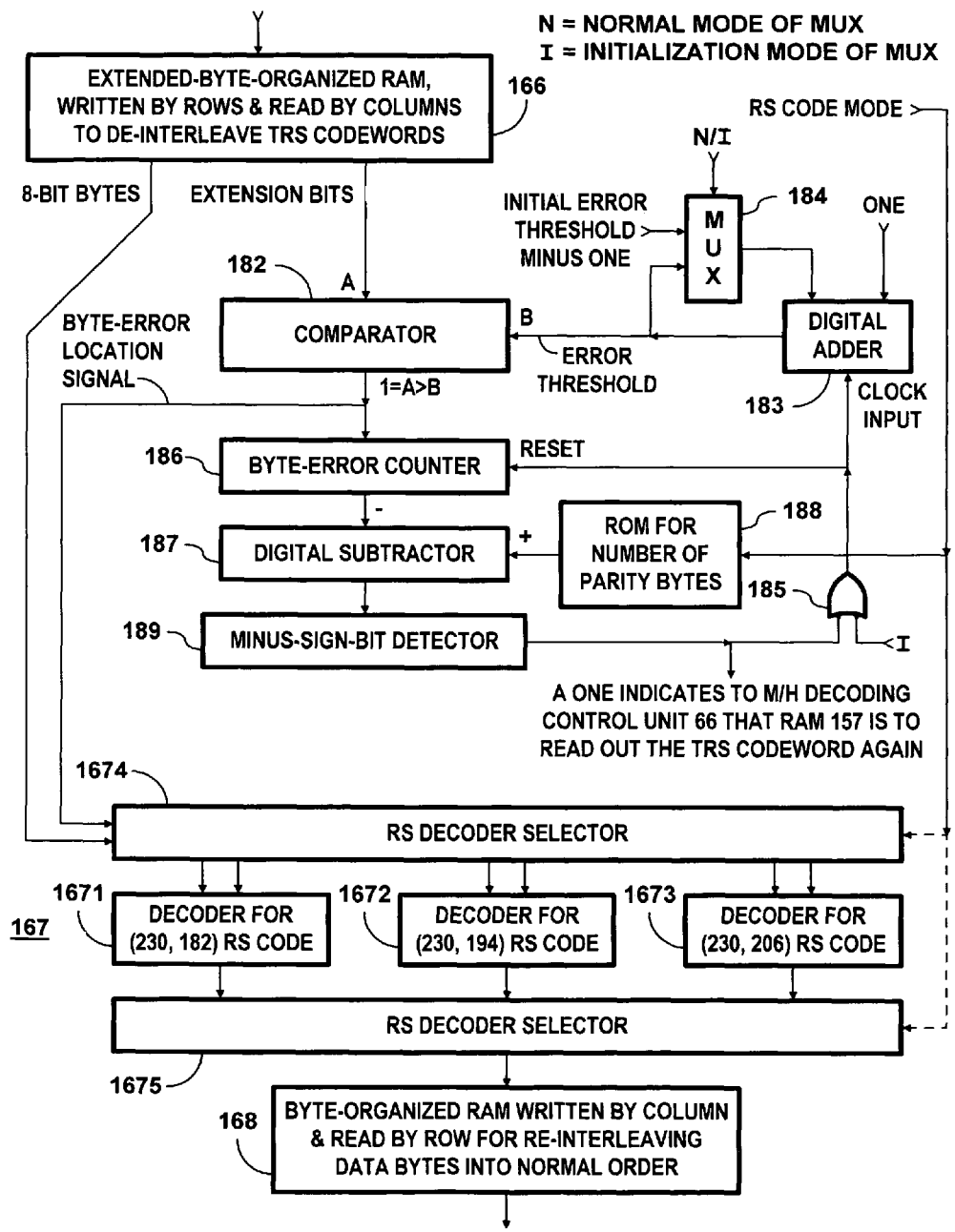
FIG. 35 is a detailed schematic diagram of representative structure of apparatus for decoding RS Frames in accordance with the invention.

FIG. 35 shows the structure of the bank 167 of RS decoders in more detail. The bank 167 of RS decoders is shown as comprising a decoder 1671 for (230, 182) RS code, a decoder 1672 for (230, 194) RS code, a decoder 1673 for (230, 206) RS code, and RS decoder selectors 1674 and 1675. The RS decoder selector 1674 is connected for applying the TRS codeword read from the preceding RAM 166 to one of the decoders 1671, 1672 and 1673 as selected responsive to an RS CODE MODE pair of bits. The M/H decoding control unit 66 supplies this pair of bits responsive either to the current_RS_code_mode_primary or the current_RS_code_mode_secondary bits detected by the TPC decoder 106 in FIG. 32C. The RS decoder selector 1675 is connected for applying to the succeeding RAM 168 the error-corrected results from the one of the decoders 1671, 1672 and 1673 as selected responsive to an RS CODE MODE pair of bits.

The one of decoders 1671, 1672 and 1673 selected for operation initially attempts to correct the TRS codeword using a byte-error-location-and-correction decoding algorithm. If the TRS codeword has too many byte errors to be corrected by this algorithm, the selected decoder then resorts to a byte-error-correction-only decoding algorithm. The RS decoder selector 1674 is connected for forwarding indications of byte errors to the selected one of the decoders 1671, 1672 and 1673 together with the bytes of each TRS codeword. The extension bits accompanying each successive 8-bit byte of a TRS codeword from the RAM 166 are supplied to a comparator 182 used as a threshold detector. The extension bits indicate the likelihood that the 8-bit byte is in error, and comparator 182 compares them to an error threshold. If the likelihood that the 8-bit byte is in error exceeds the error threshold, the comparator 182 responds with a logic ONE indicative that the byte is presumably in error. Otherwise, the comparator 182 responds with a logic ZERO indicative that the byte is presumably correct.

FIG. 35 shows the sum output signal from a clocked digital adder 183 supplied to the comparator 182 as the error threshold. The value of the error threshold is initialized in the following way at the outset of each TRS codeword being read from the RAM 166. A two-input multiplexer 184 is connected to supply its response as a first of two summand signals supplied to the adder 183, the second summand signal being arithmetic one. The sum output signal from the clocked adder 183 is applied as one of two input signals to the multiplexer 184, and an initial error threshold value less one is applied as the other input signal to the multiplexer 184. Just before each TRS codeword is read from the RAM 166 a respective pulsed logic ONE is generated by the M/H decoding control unit 66. The pulsed logic ONE is applied as control signal to the multiplexer 184, conditioning it to reproduce the initial error threshold value less one in its response supplied to the adder 183 as a summand input signal. The clocked adder 183 receives its clock signal from an OR gate 185 connected to receive the pulsed logic ONE at one of its input connections. The OR gate 185 reproduces the pulsed logic ONE in its response that clocks an addition by the adder 183. The adder 183 adds its arithmetic one summand input signal to the initial error threshold value less one summand input signal received from the multiplexer 184, generating the initial error threshold value as its sum output signal supplied to the comparator 182.

The pulsed logic ONE also resets to arithmetic zero the output count from a byte-error counter 186 that is connected for counting the number of logic ONEs that the comparator 182 generates during each TRS codeword. This output count is applied as subtrahend input signal to a digital subtractor 166. A read-only memory 188 responds to the RS CODE MODE pair of bits to supply the number of parity bytes in the TRS codewords, which number is supplied as minuend input signal to the digital subtractor 187. A minus-sign-bit detector 189 generates a logic ONE if and when the number of byte errors in a TRS codeword counted by the counter 186 exceeds the number of parity bytes in a TRS codeword. This logic ONE is supplied to the M/H decoding control unit 66 as an indication that the current TRS codeword is to be read out from the RAM 166 again. This logic ONE is supplied to the OR gate 185 as an input signal thereto. The OR gate 185 responds with a logic ONE that resets the counter 186 to zero output count and that clocks the clocked digital adder 183. Normally, the multiplexer 184 reproduces the error threshold supplied as sum output from the adder 183. This reproduced error threshold is applied to the adder 183 as a summand input signal, connecting the clocked adder 183 for clocked accumulation of arithmetic ones in addition to the previous error threshold. The logic ONE from the OR gate 185 causes the error threshold supplied as sum output from the adder 183 to be incremented by arithmetic one, which tends to reduce the number of erroneous bytes located within the TRS codeword upon its being read again from the RAM 187.

If and when the number of erroneous bytes located in the TRS codeword is fewer than the number of parity bytes that the ROM 188 indicates that the TRS codeword should have, the M/H decoding control unit 66 will cause the next TRS codeword in the RS Frame to be processed if such there be. The M/H decoding control unit 66 will begin reading such next TRS codeword from the RAM 166 to the bank 167 of RS decoders and writing the RS decoding results into the RAM 168.

Figure 36:
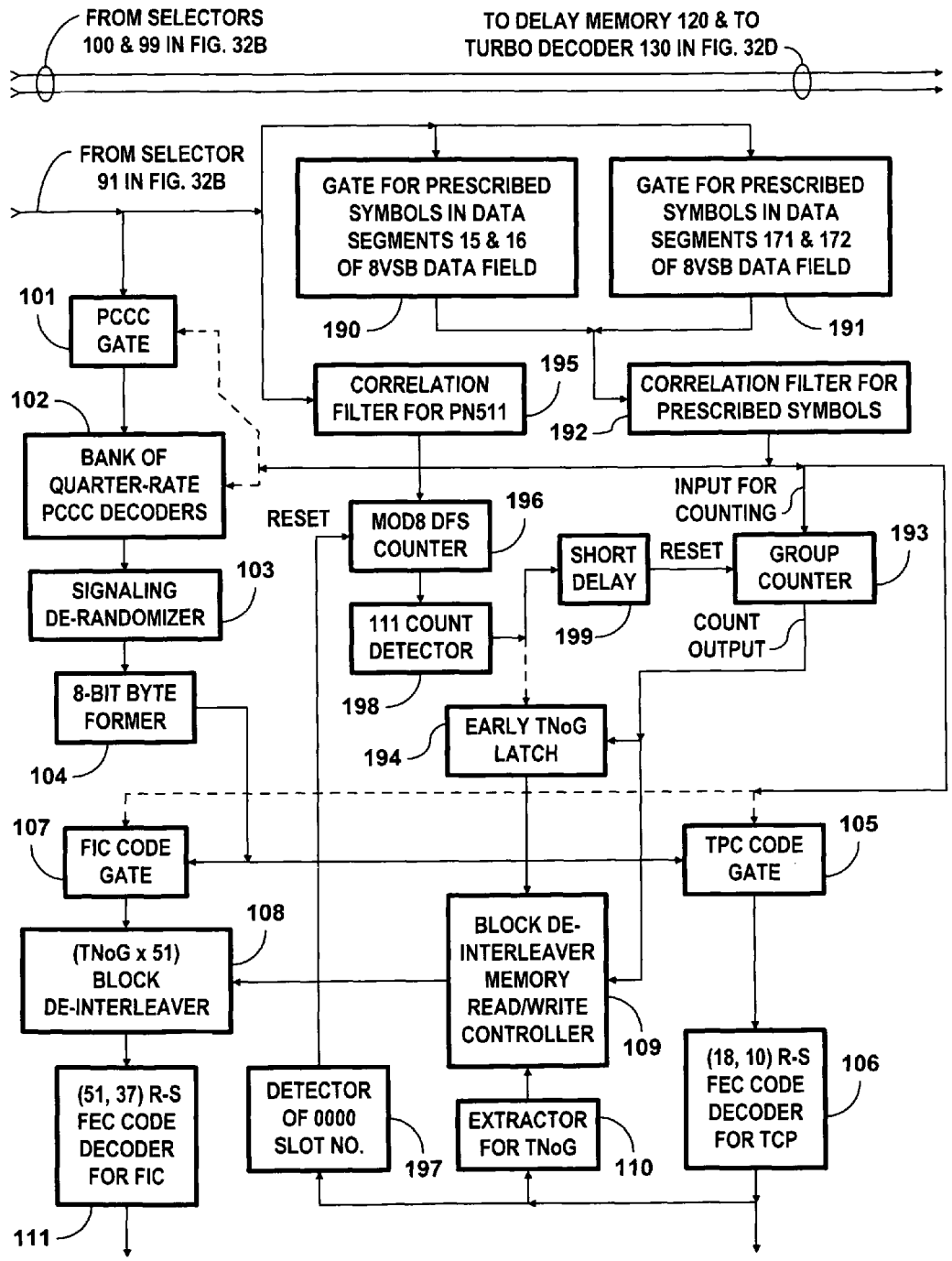
FIG. 36 is a schematic diagram of an arrangement for determining the total number of Groups in an M/H sub-Frame by counting sequences of prescribed 8-VSB signals.

FIG. 36 shows how early TNoG information can be derived from the then current M/H sub-Frame and supplied to the block de-interleaver memory read/write controller 109 for directing its operations when the extractor 110 fails to supply TNoG information for the then current M/H sub-Frame. The basic idea in regard to doing this is to detect and count the sequences of prescribed symbols that precede the TPC and FIC signaling in each Group within an M/H sub-Frame. The equalized baseband 8-VSB DTV signal from the selector 91 shown in FIG. 32B is applied to gates 190 and 191 as their respective input signals. In its response to this baseband 8-VSB DTV signal, the gate 190 selectively reproduces symbols in the portions of the 15th and 16th data segments of each 8-VSB data field that may have prescribed values. In its response to this baseband 8-VSB DTV signal, the gate 191 selectively reproduces symbols in the portions of the 171st and 172nd data segments of each 8-VSB data field that may have prescribed values. These responses are applied in time-division multiplex as the input signal of a correlation filter 192 for the sequence of prescribed symbols that should precede the TPC and FIC signaling in each Group within an M/H sub-Frame. The correlation filter 192 determines when that sequence of prescribed symbols occurs, furnishing a ONE response indicative of such occurrence in place of its otherwise ZERO response. The correlation filter 192 is connected for supplying its response to a Group counter 193 for counting the ONEs in that response, thereby indirectly counting the occurrences of Groups in the baseband 8-VSB signal. The Group counter 193 is reset to zero count at the beginning of each M/H Frame. The Group counter 193 is connected to supply its count output as latch input signal to a latch 194, which is operated to latch the count output at the conclusion of each M/H Frame and to hold it in its output response as early TNoG. The latch 194 is connected to supply the latched count output as early TNoG to the block de-interleaver memory read/write controller 109.

The generation of the signals for resetting the Group counter 193 and controlling the latch 194 will be described next. The equalized baseband 8-VSB DTV signal from the selector 91 shown in FIG. 32B is applied as input signal to a correlation filter 195 for the PN511 sequence included in the data field synchronization (DFS) signal of each 8-VSB data field. The correlation filter 195 determines when a PN511 sequence occurs, furnishing a ONE response indicative of such occurrence rather than its usual ZERO response. The correlation filter 195 is connected for supplying in its response to a modulo-eight DFS counter 196 for counting the ONEs in that response. A detector 197 for the Slot_number being 0000 in the response of the decoder 106 for TPC (18, 10) R-S FEC coding furnishing a ONE response indicative of such occurrence, rather than its usual ZERO response, providing an indication of when the M/H Frame has begun. The detector 197 is connected for supplying its response as reset signal for the DFS counter 196, each ONE in the detector 197 response resetting the DFS counter 196 modulo-eight count output to 000. The DFS counter 196 is connected to supply its count output to a 111 count detector 198 that generates a ZERO response to all values of that count output except 111. The 111 count detector 198 responds to the count output being 111 to generate a ONE response that indicates eight 8-VSB data fields have been completed since the detector 197 detected the Slot_number being 0000. The decoder 106 for TPC signal is likely to generate a 0000 Slot_number in the 17th data segment of the new 8-VSB data field. The 111 count detector 198 is connected to supply its response to the latch 194 as control signal. The latch 194 responds to a ONE response from the 111 count detector 198 to sample the then current count from the Group counter 193 and hold that count in the latch 194 response throughout the ensuing M/H sub-Frame, to be used as early TNoG. The 111 count detector 198 response is subjected to a short delay in circuitry 199, and the delayed response of the 111 count detector 198 is supplied from the circuitry 199 to the Group counter 193 as reset signal. The count output from the Group counter 193 is reset to 0000 responsive to a ONE in the delayed response of the 111 count detector 198. The delay provided by the circuitry 199 is long enough for the latch 194 to store the Group count at the conclusion of the M/H sub-Frame before the Group counter 193 is reset. However, this delay is short enough that the Group counter 193 is reset before the correlation filter 192 might respond with a ONE to a sequence of prescribed symbols in the 15th and 16th segments of the new 8-VSB data field.

The selection of the symbols in the portions of the 15th and 16th data segments of each 8-VSB data field that the gate 190 selectively reproduces is controlled by a symbol counter (not explicitly shown in FIG. 36) in the M/H receiver. The selection of the symbols in the portions of the 171st and 172nd data segments of each 8-VSB data field that the gate 191 selectively reproduces is also controlled by the same symbol counter. It is convenient to synchronize the symbol counter with response from the correlation filter 195 that determines when a PN511 sequence occurs in a DFS signal.

FIG. 36 indicates that the response of the correlation filter 192 to the sequence of prescribed symbols that should precede the TPC and FIC signaling in each Group within an M/H sub-Frame is utilized for other things besides providing count input signal to the Group counter 193. The response of the correlation filter 192 indicating that an M/H Group is present in a Slot is used as an enabling signal for other operations in the M/H receiver. The operations of the PCCC gate 101, the quarter-rate PCCC decoder 102, the TPC code gate 105 and the FIC code gate 107 occur at times determined by the symbol count from the symbol counter described in the previous paragraph. Such operations are conditional, however, taking place only when the correlation filter 192 indicates that an M/H Group is currently being received in a Slot. FIGS. 32C and 36 show the PCCC gate 101 and the PCCC decoder 102 as cascaded elements, to make it easier for the reader to understand M/H receiver operation. In alternative implementations, the PCCC decoder 102 receives its input signal directly from the selector 91 shown in FIG. 32B, and the PCCC gating function is provided by selectively energizing the PCCC decoder 102.

Figure 37:
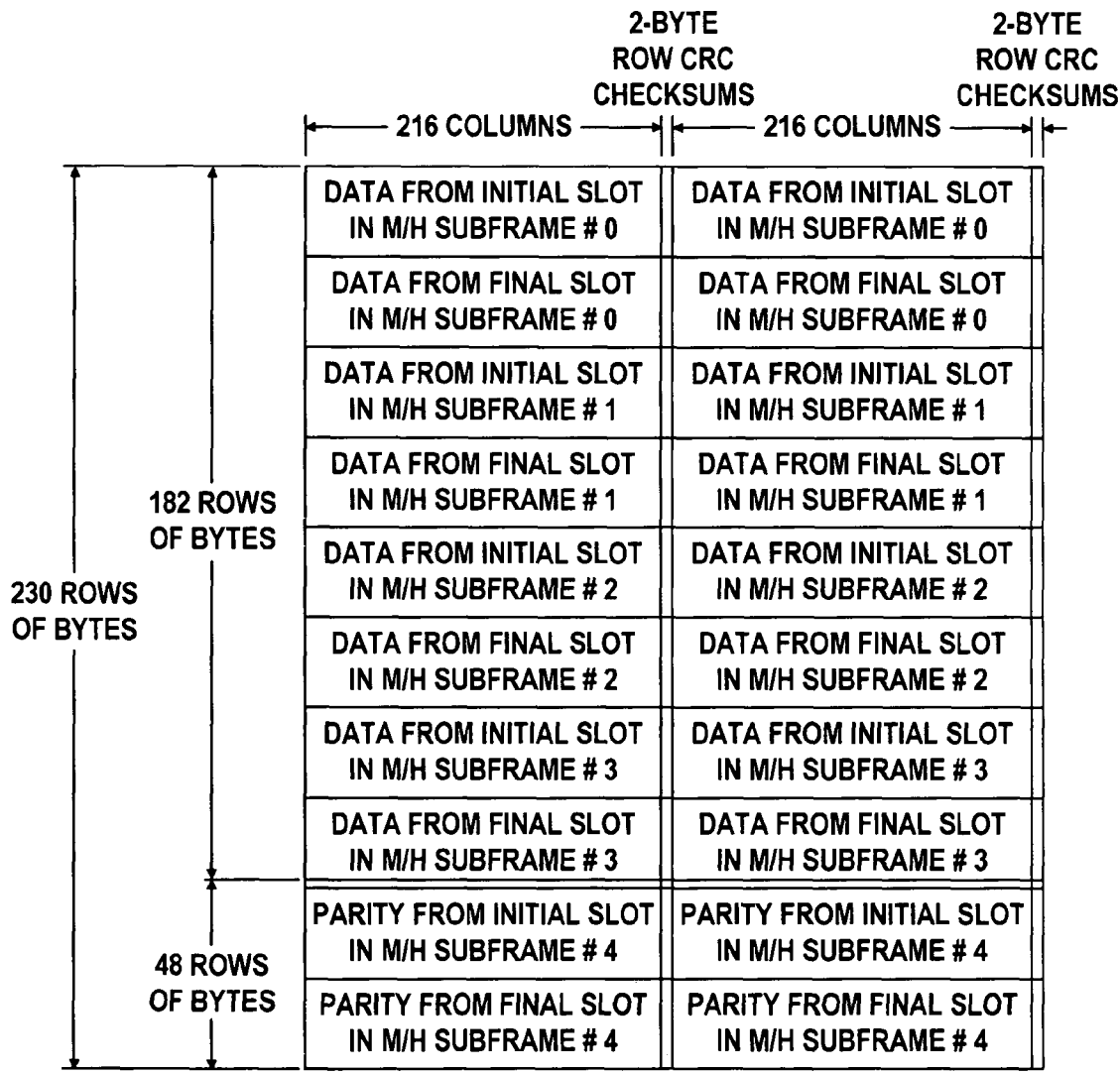
FIG. 37 is a diagram showing how checksum bytes of CRC coding are located in RS Frames portions of each of which RS Frames are transmitted as one-third-code-rate PCCC in ten M/H Groups within an M/H Frame.
Figure 38:
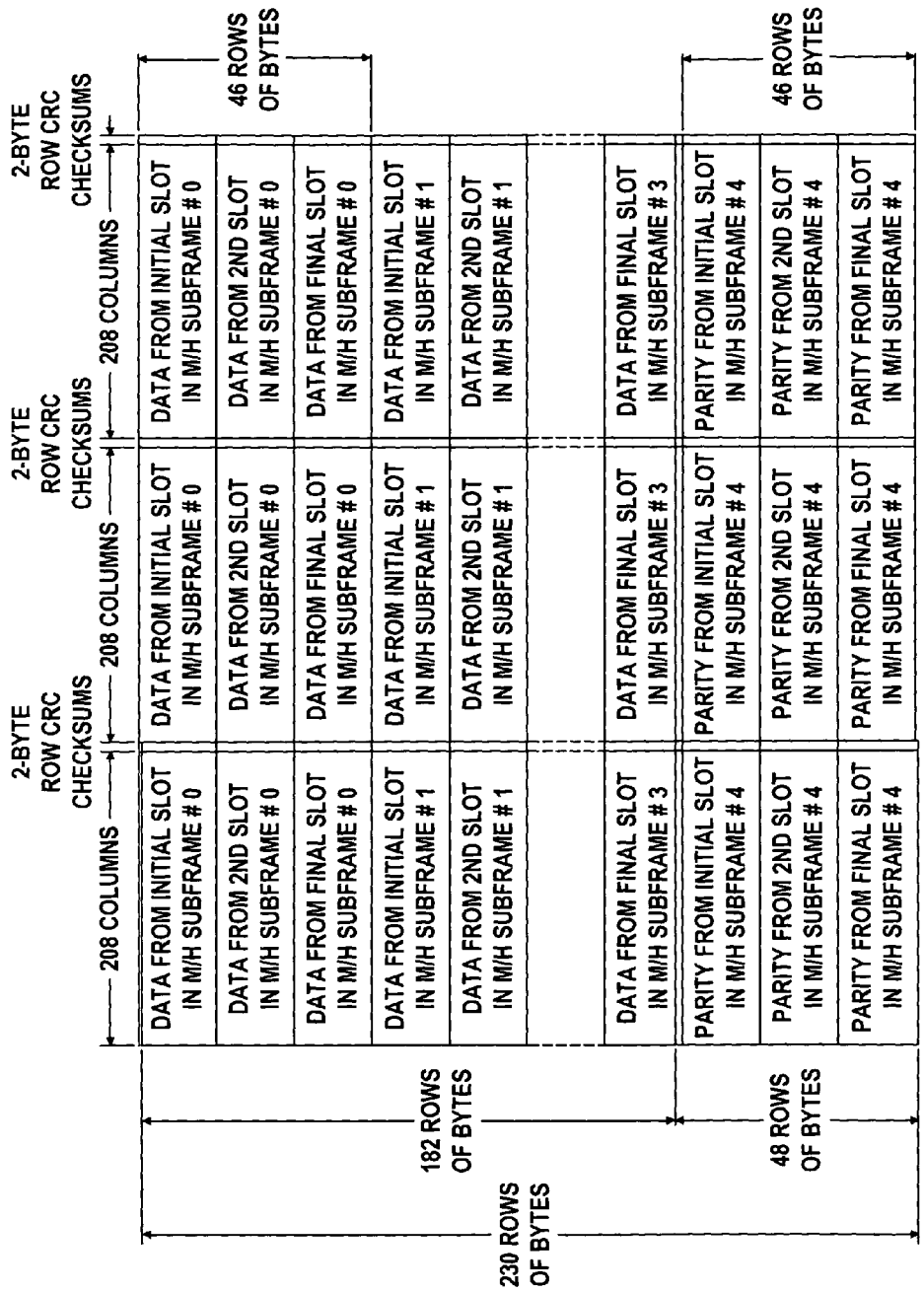
FIG. 38 is a diagram showing how checksum bytes of CRC coding are located in RS Frames portions of each of which RS Frames are transmitted as one-third-code-rate PCCC in fifteen M/H Groups within an M/H Frame.
Figure 39:
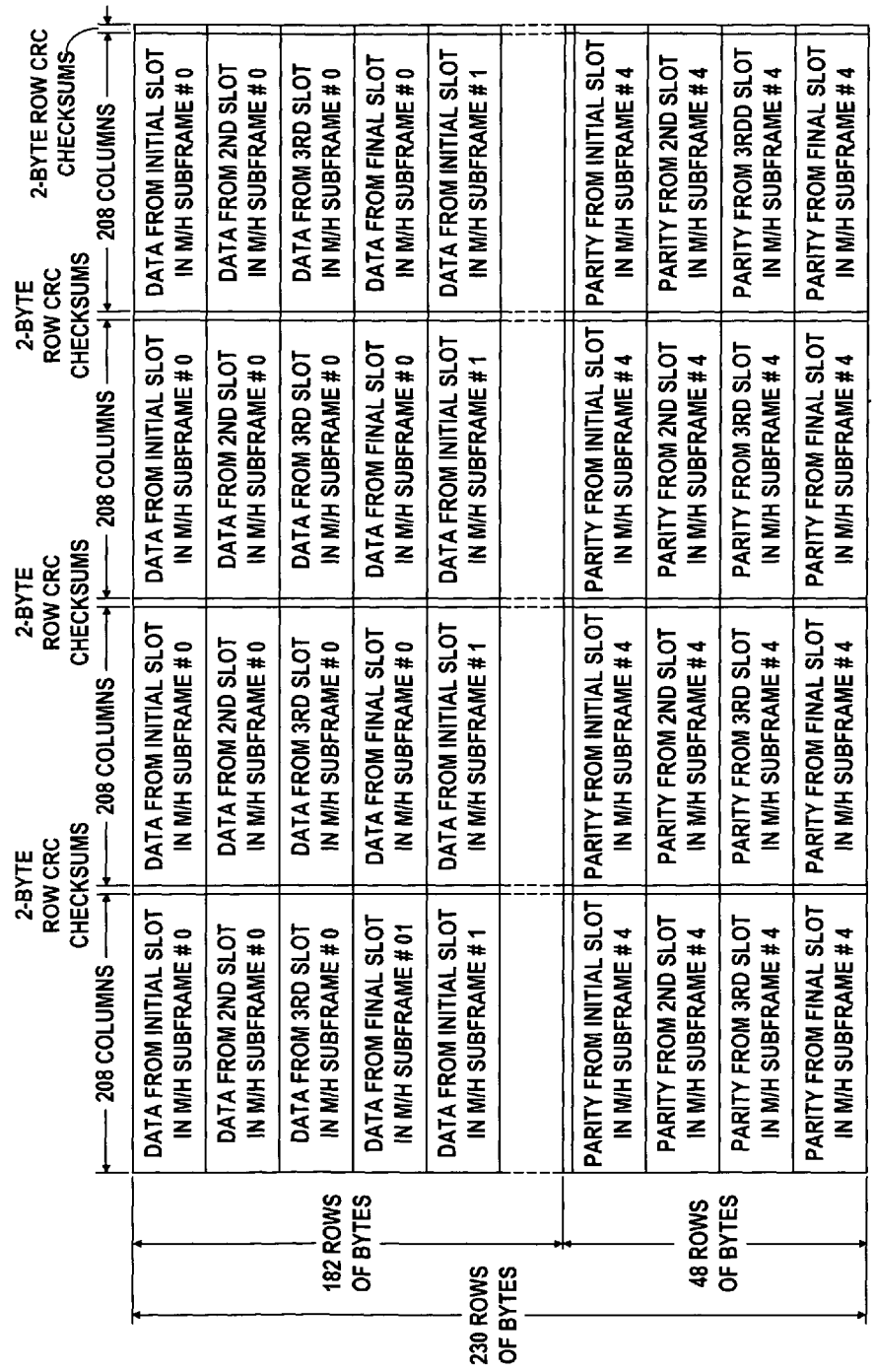
FIG. 39 is a diagram showing how checksum bytes of CRC coding are located in RS Frames portions of each of which RS Frames are transmitted as one-third-code-rate PCCC in twenty M/H Groups within an M/H Frame.

FIG. 37 shows how checksum bytes of CRC coding are located in an RS Frame extracted from ten M/H Groups of one-third-code-rate CCC transmitted within an M/H Frame. FIG. 38 shows how checksum bytes of CRC coding are located in an RS Frame extracted from fifteen M/H Groups of one-third-code-rate CCC transmitted within an M/H Frame. FIG. 39 shows how checksum bytes of CRC coding are located in an RS Frame extracted from twenty M/H Groups of one-third-code-rate CCC transmitted within an M/H Frame. Each of FIGS. 37-39 depicts a respective case in which transverse (230, 182) RS coding is used in the RS Frame. If such is indeed the case, the initial 182 rows of bytes in each of the RS Frame comprise mostly M/H data bytes, and the final 48 rows of bytes in each RS Frame comprise parity bytes for the transverse RS codewords.

FIG. 37 depicts an RS Frame the bytes of which are transmitted in ten M/H Groups, using one-half-rate outer convolutional coding in the CCC. Two M/H Groups are transmitted in each of the five sub-Frames of an M/H Frame. Each successive one of these M/H Groups conveys a respective succession of 23 rows of bytes in the RS Frame. In FIG. 37 each row of successively received bytes in the RS frame is divided into two sub-rows of similar length. A respective two-byte checksum is located at the conclusion of each sub-row or half-row of bytes in the FIG. 37 RS Frame. Accordingly, two-byte checksums occur as often in the successively received bytes in the FIG. 37 RS frame as they would in the successively received bytes in an RS frame extracted from just five M/H Groups transmitted within an M/H Frame. That is, two-byte checksums occur just as often in the successively received bytes from two M/H Slots in each of the five sub-Frames of an M/H Frame per FIG. 37 as checksums occur in the successively received bytes from a single M/H Slot in each of the five sub-Frames of an M/H Frame.

FIG. 38 depicts an RS Frame the bytes of which are transmitted in fifteen M/H Groups using one-half-rate outer convolutional coding in the CCC. Three M/H Groups are transmitted in each of the five sub-Frames of an M/H Frame. Each M/H Group conveys a respective succession of 46/3 rows of bytes in the RS Frame, which is difficult to show accurately owing to drafting limitations. More precisely, the sixteenth row of bytes resulting from decoding each M/H sub-Frame contains 210 bytes from the initial M/H Group of that M/H sub-Frame and 420 bytes from the second M/H Group of that M/H sub-Frame. Also, the thirty-first row of bytes resulting from decoding each M/H sub-Frame contains 420 bytes from the second M/H Group of that M/H sub-Frame and 210 bytes from the final M/H Group of that M/H sub-Frame. However, the contents of each M/H Group are disposed in the RS Frame as suggested by FIG. 38, with some or all of the contents of M/H Groups in M/H sub-Frames #1, #2, and #3 omitted so the rest of the RS Frame will fit on one page. In FIG. 38 each row of successively received bytes in the RS frame is divided into three sub-rows of similar length. A respective two-byte checksum is located at the conclusion of each sub-row or one-third row of bytes in the FIG. 38 RS Frame. Accordingly, two-byte checksums occur as often in the successively received bytes in the FIG. 38 RS frame as they would in the successively received bytes in an RS frame extracted from just five M/H Groups transmitted within an M/H Frame. That is, two-byte checksums occur just as often in the successively received bytes from three M/H Slots in each of the five sub-Frames of an M/H Frame per FIG. 38 as checksums occur in the successively received bytes from a single M/H Slot in each of the five sub-Frames of an M/H Frame.

FIG. 39 depicts an RS Frame the bytes of which are transmitted in twenty M/H Groups, using one-half-rate outer convolutional coding in the CCC. Four M/H Groups are transmitted in each of the five sub-Frames of an M/H Frame. Each M/H Group conveys a respective succession of 46 quarter rows of bytes in the RS Frame, which is difficult to show accurately owing to drafting limitations. More precisely, the sixteenth row of bytes resulting from decoding each M/H sub-Frame contains 420 bytes from the initial M/H Group of that M/H sub-Frame and 420 bytes from the second M/H Group of that M/H sub-Frame. Also, the thirty-first row of bytes resulting from decoding each M/H sub-Frame contains 420 bytes from the second M/H Group of that M/H sub-Frame and 420 bytes from the final M/H Group of that M/H sub-Frame. However, the contents of each M/H Group are disposed in the RS Frame as suggested by FIG. 39, with some or all of the contents of M/H Groups in M/H sub-Frames #1, #2, and #3 omitted so the rest of the RS Frame will fit on one page. In FIG. 39 each row of successively received bytes in the RS frame is divided into four sub-rows of similar length. A respective two-byte checksum is located at the conclusion of each sub-row or one-quarter row of bytes in the FIG. 39 RS Frame. Accordingly, two-byte checksums occur as often in the successively received bytes in the FIG. 39 RS frame as they would in the successively received bytes in an RS frame extracted from just five M/H Groups transmitted within an M/H Frame. That is, two-byte checksums occur just as often in the successively received bytes from four M/H Slots in each of the five sub-Frames of an M/H Frame per FIG. 39 as in the successively received bytes from a single M/H Slot in each of the five sub-Frames of an M/H Frame.

So, no matter how many M/H Slots in an M/H Frame from ten to eighty are used for transmitting the RS Frame, the two-byte checksum at the end of a sub-row will locate byte errors for the same number of TRS codewords as the two-byte checksum at the end of a row of an RS Frame transmitted in only five M/H Slots in an M/H Frame. A single-byte error in a row of an RS Frame will affect error location in the same number of TRS codewords no matter what the size of the RS Frame. So, a single-byte error or a several-byte error contained within a sub-row will diminish the error-correction capability of the same number of TRS codewords no matter what the size of the RS Frame. In larger RS Frames, then, only a fraction of the TRS codewords, rather than all of them, suffer diminished error-correction capability from the single-byte error or the several-byte error contained within a sub-row.

The fact that CRC checksums occur at the same periodic intervals in all M/H data without regard to RS Frame size also facilitates using the technique described in published U.S. Pat. App. No. 2001-0025358 to avoid BER floor effect when turbo decoding PCCC'd M/H data. That is, the probability of error for each bit within a CRC codeword that is found to be correct can be reduced in subsequent iterations of the turbo decoding procedure. The turbo decoder does not have to take into account the different sizes of RS Frame when implementing this technique, owing to the CRC codewords being constrained to a standard length.

Figure 40:
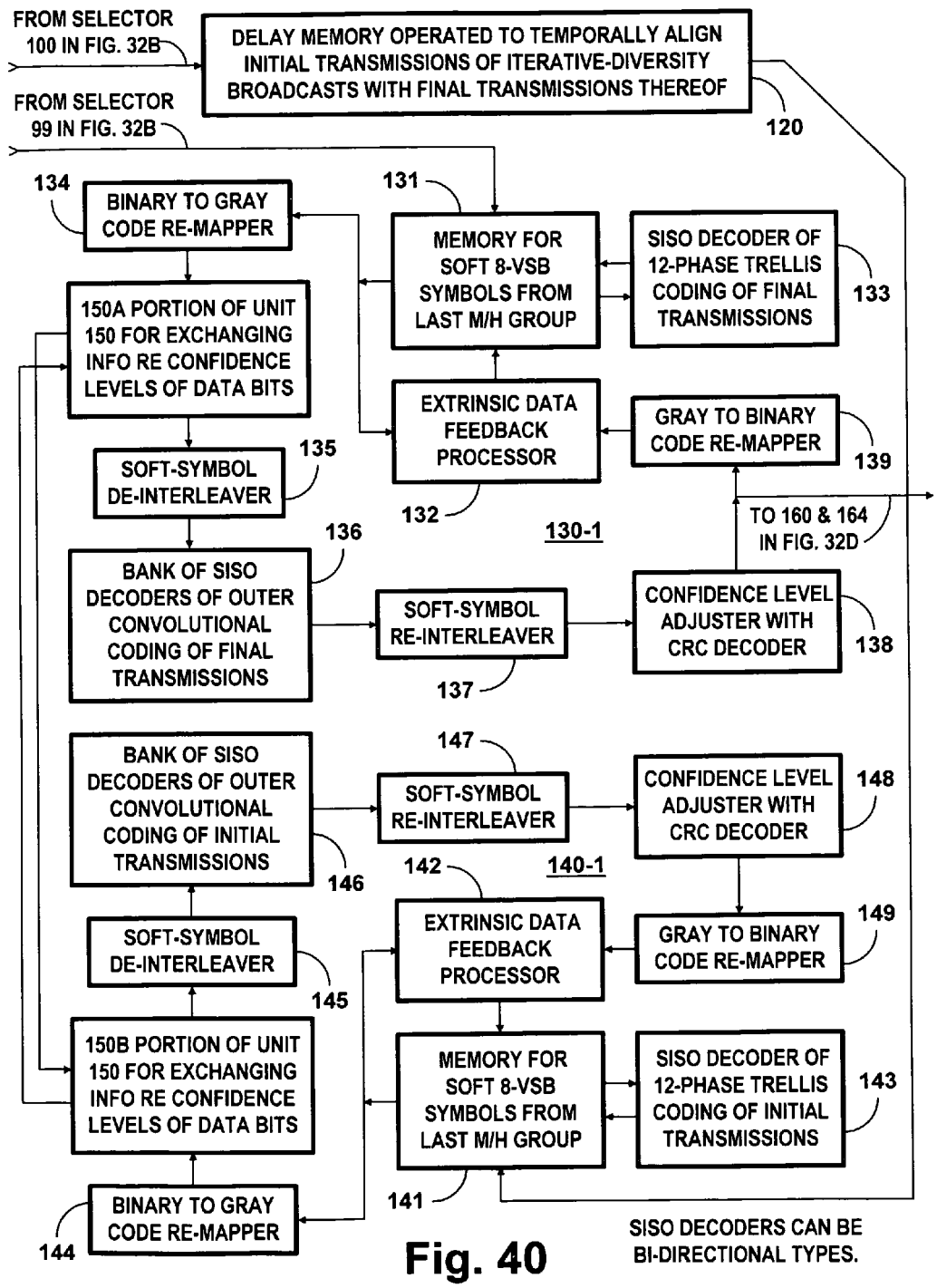
FIG. 40 is a schematic diagram of a first representative embodiment of the paralleled turbo decoders for diversity reception shown in the FIG. 32D portion of the FIG. 32 receiver apparatus.

FIG. 40 shows in some detail an illustrative embodiment of the pair of turbo decoders 130 and 140 operated in parallel, which is used for receiving one-third-code-rate CCC. The turbo decoder 130 comprises elements 131-139. The turbo decoder 140 is similar in construction and comprises elements 141, 142, 143, 144, 145, 166, 167, 168 and 149 that correspond to elements 131, 132, 133, 134, 135, 136, 137, 138 and 139, respectively. A feeling for the general design of a prior-art turbo decoder for PCCC can be developed by reading the M. C. Valenti and J. Sun paper "The UMTS Turbo Code and an Efficient Decoder Implementation Suitable for Software-Defined Radios", *International Journal of Wireless Information Networks*, Vol. 8, No. 4, October 2001, with special reference to FIG. 2 of that paper. A feeling for how the general design of a turbo decoder for SCCC is related thereto can be developed by reading the S. Benedetto, D. Divsalar, G. Montorsi, and F. Pollara paper "Serial Concatenation of Interleaved Codes: Performance Analysis, Design, and Iterative Decoding", *The Telecommunications and Data Acquisition Progress Report* 42-126, 15 Aug. 1995, Jet Propulsion Laboratory, Pasadena, Calif., with special reference to FIG. 14 of that paper. The soft-input/soft-output (SISO) decoders used in these turbo decoding schemes use the sliding-window log-MAP algorithm. The term "log-MAP" is short for "logarithmic maximum a posteriori".

The use of implied symbol interleaving of the outer convolutional coding in accordance with an aspect of the invention alters the prior-art general configuration of a turbo decoder for CCC in the following ways. A symbol de-interleaver replaces the symbol interleaver between the decoder for inner convolutional coding and the decoder for outer convolutional coding. A symbol interleaver replaces the symbol de-interleaver between the decoder for outer convolutional coding and the decoder for inner convolutional coding. The turbo decoder output signal is extracted before the symbol de-interleaver or after the symbol interleaver, rather than after the symbol de-interleaver or before the symbol interleaver.

Portions 150A and 150B of the information-exchange unit 150 are included in the turbo loops of the turbo decoders 130 and 140, respectively. The fundamental approach used for iterative diversity reception is to delay the initial-component transmissions so that they can be decoded contemporaneously with the final-component transmissions. This facilitates the exchange of information between the turbo decoder 130 for final-component transmissions and the turbo decoder 140 for initial-component transmissions. The information-exchange unit 150 is connected for exchanging information between the respective turbo loops of the turbo decoders 130 and 140, which information concerns the confidence levels of soft data bits.

FIG. 40 is a more detailed schematic diagram of an illustrative embodiment of the FIG. 32D portion of the FIG. 32 M/H receiver apparatus comprising the delay memory 120, a first embodiment 130-1 of the turbo decoder 130, a first embodiment 140-1 of the turbo decoder 140, and the information-exchange unit 150. The FIG. 32 M/H receiver differs from the M/H receivers described in the inventor's earlier patent applications in that the differential delay between the initial-component transmissions and the final-component transmissions of the iterative-diversity broadcast is not compensated for in a single stage of delay memory. Rather, the differential delay is compensated for in two stages. The time interval between an initial-component transmission and the corresponding final-component transmission of an iterative-diversity broadcast can be considered to be an integral number of M/H Frame intervals plus or minus a fraction of an M/H sub-Frame interval. The component of the differential delay that is a fraction of an M/H sub-Frame interval is compensated for by the portion of the FIG. 32B apparatus comprising elements 98, 99 and 100 that is also used to compensate for the differential delay encountered during frequency-diverse reception. The M/H decoding control unit 66 determines the fraction of an M/H sub-Frame interval of delay to be compensated for by the portion of the FIG. 32B apparatus comprising elements 98, 99 and 100. This determination proceeds starting from the subchannel_interleaving bits in the TPC signal. The integral number of M/H Frame intervals component of the differential delay is compensated for by the delay memory 120, which affords delay as programmed by the M/H decoding control unit 66 responsive to the iterative_diversity_delay bits in the TPC signal.

The preparation of the baseband DTV signal for data-slicing within the turbo decoders 130 and 140 differs from that conventionally used for decoders of 8-VSB symbols. This is because, in accordance with an aspect of the invention, the CCC is transmitted without precoding of the Z-sub-2 bits of the 8-VSB symbols. The procedure referred to as "post-combing" is then omitted. The results of data-slicing an equalized baseband DTV signal supplied from the output port of the output selector 82 in FIG. 32A are not delayed and modularly added to the undelayed results of that data-slicing in order to recover Z-sub-2 bits for subsequent turbo decoding. A selected portion of the equalized baseband DTV signal supplied from the output port of the selector 99 in FIG. 32B as possibly subjected to some delay is applied to the turbo decoder 130 as its input signal. The turbo decoder 130 receives its input signal without the MSBs of the equalized baseband DTV signal having been modified by post-comb filtering. A selected portion of the equalized baseband DTV signal supplied from the output port of the selector 100 in FIG. 32B is applied to the input port of the delay memory 120 to be temporarily stored before being read out to the turbo decoder 140 as input signal thereto. The turbo decoder 140 receives its input signal without the MSBs of the equalized baseband DTV signal having been modified by post-comb filtering. If the delay memory 120 is supplied with the final-component transmissions of a frequency-diversity broadcast as input signal, those final-component transmissions are forwarded immediately to the turbo decoder 140 as input signal thereto. Shimming delay of the input signals applied to the turbo decoders 130 and 140 is typically employed so that these respective final-component transmissions are essentially contemporaneous with each other.

If the delay memory 120 is written with the initial-component transmissions of an iterative-diversity broadcast that are supplied from the output port of the selector 100 in FIG. 32B, the delay memory 120 temporarily stores each initial-component transmission until the corresponding final-component transmission of that data appears in the response from the output port of the selector 99 in FIG. 32B. Each initial-component transmission of data is then read to provide input signal to the turbo decoder 140 that is contemporaneous with the corresponding final-component transmission of that data being applied as input signal to the turbo decoder 130.

FIG. 40 shows a first embodiment 130-1 of the turbo decoder 130. A memory 131 in the turbo decoder 130-1 is connected for receiving soft 8-VSB symbols from the output port of the selector 99. The soft bits of the 3-bit 8-VSB symbols from the M/H Group most recently supplied by the selector 99 are written into temporary storage within the memory 131. First, second and third parts of the memory 131 temporarily store the soft decisions that respectively concern Z-sub-2, Z-sub-1 and Z-sub-0 bits supplied by the selector 99. A fourth part of the memory 131 is used for temporarily storing soft decisions concerning portions of M/H data that relate to Z-sub-1 bits, as recovered by decoding the inner convolutional coding of the CCC. A fifth part of the memory 131 is used for temporarily storing soft decisions concerning portions of extrinsic data that relate to Z-sub-1 bits as fed back from a SISO decoder for the outer convolutional coding of the CCC. A sixth part of the memory 131 is used for temporarily storing soft decisions concerning portions of extrinsic data that relate to Z-sub-2 bits as fed back from the SISO decoder for the outer convolutional coding of the CCC when it is SCCC. An extrinsic data feedback processor 132 is connected for writing these portions of extrinsic data to the fifth and sixth parts of the memory 131 each time that the turbo decoder 130-1 decodes the outer convolutional coding of SCCC for an M/H Group. When the turbo decoder 130-1 decodes the outer convolutional coding of PCCC for an M/H Group, the extrinsic data feedback processor 132 writes soft decisions concerning portions of extrinsic data that relate to Z-sub-1 bits to the fifth part of the memory 131. However, the sixth part of the memory 131 need not be written with portions of extrinsic data that relate to Z-sub-2 bits.

The soft decisions concerning the Z-sub-1 bits of 8-VSB symbols from the M/H Group most recently supplied by the selector 99 that are temporarily stored in the second part of the memory 131 are additively combined with soft decisions concerning the Z-sub-1 bits in the extrinsic data that are temporarily stored in the fifth part of the memory 131. The resulting soft decisions concerning the Z-sub-1 bits in the sum response are supplied as part of the input signal to a SISO decoder 133 for 12-phase trellis coding. The remaining part of the input signal to the SISO decoder 133 consists of the corresponding soft decisions concerning the Z-sub-O bits that are temporarily stored in the third part of the memory 131. The SISO decoder 133 decodes the inner convolutional coding of the final-component M/H transmissions for iterative-diversity reception, when both of the paralleled turbo decoders 130-1 and 140-1 are in operation. The SISO decoder 133 also decodes the inner convolutional coding of single-component M/H transmissions, when possibly just the turbo decoder 130-1 is in operation. Preferably, the SISO decoder 133 performs its decoding during an initial half of each turbo decoding cycle. The soft decisions concerning the Z-sub-1 bits in the SISO decoder 133 decoding results are temporarily stored in the fifth part of the memory 131. This completes a half cycle of the CCC decoding.

When CCC decoding of SCCC signal is done during the half of each turbo decoding cycle that the SISO decoder 133 rests, soft decisions concerning the Z-sub-2 bits in the extrinsic data that are temporarily stored in the sixth part of the memory 131 are additively combined with the soft decisions concerning the Z-sub-2 bits of 8-VSB symbols from the M/H Group most recently supplied by the selector 99 that are temporarily stored in the first part of the memory 131. The resulting soft decisions concerning the Z-sub-2 bits in the sum response are supplied as part of the input signal to a binary-to-Gray-code re-mapper 134. Soft decisions concerning the Z-sub-1 bits in the extrinsic data temporarily stored in the fifth part of the memory 131 are differentially combined with the soft decisions concerning the Z-sub-1 bits of the SISO decoder 133 decoding results temporarily stored in the fourth part of the memory 131. The resulting soft decisions concerning the Z-sub-2 bits in the difference response are supplied as the remaining part of the input signal to the binary-to-Gray-code re-mapper 134.

When CCC decoding of PCCC signal is done during the half of each turbo decoding cycle that the SISO decoder 133 rests, the soft decisions concerning the Z-sub-2 bits of 8-VSB symbols from the M/H Group most recently supplied by the selector 99 are supplied from the first part of the memory 131 as part of the input signal to the binary-to-Gray-code re-mapper 134. Soft decisions concerning the Z-sub-1 bits in the extrinsic data temporarily stored in the fifth part of the memory 131 are differentially combined with the soft decisions concerning the Z-sub-1 bits of the SISO decoder 133 decoding results temporarily stored in the fourth part of the memory 131. The resulting soft decisions concerning the Z-sub-2 bits in the difference response are supplied as the remaining part of the input signal to the binary-to-Gray-code re-mapper 134.

The storage locations in the first, second and third parts of the memory 131 are addressed by a first address generator during their being written with the soft Z-sub-2, Z-sub-1 and Z-sub-O bits resulting from data-slicing. The first address generator is preferably an up/down symbol counter allowing sweep through the Z-sub-1 and Z-sub-0 trellis coding in reverse as well as forward direction during decoding the inner convolutional coding. The symbol counter in the first address generator counts all the symbols in the M/H Group including those not descriptive of M/H data. The first part of the memory 131 needs actual storage locations only for the soft Z-sub-2 bits from those 8-VSB symbols conveying M/H data. Unless the M/H Group begins with a trellis reset for the Z-sub-0 bits, the second and third parts of the memory 131 need actual storage locations for the soft Z-sub-1 and Z-sub-0 bits from all the 8-VSB symbols within a data field. If the M/H Group begins with such a trellis reset, the second and third parts of the memory 131 need actual storage locations only for the soft Z-sub-1 and Z-sub-0 bits from all the 8-VSB symbols within an M/H Group. The fourth and fifth parts of the memory 131 need actual storage locations only for those Z-sub-1 epochs for which soft extrinsic data will be available. The storage locations in the second, third and fifth parts of the memory 131 are addressed by the first address generator during the temporarily stored soft Z-sub-1 bits, soft Z-sub-0 bits and soft extrinsic data bits being read to support decoding of the inner convolutional coding by the decoder 133. Supposing that the decoder 133 performs the initial half of the first cycle of decoding CCC, the storage locations in the second and third parts of the memory 131 can be addressed by the first address generator so as to implement write-then-read of each of these storage locations.

The storage locations in the first, fourth, fifth and sixth parts of the memory 131 are addressed by a second address generator when the contents of their bit storage locations are read to support the final half of each cycle of decoding CCC. This second address generator generates only the addresses for the first, fourth, fifth and sixth parts of the memory 131 that relate to symbols of M/H data. A representative embodiment of the second address generator comprises a read-only memory (ROM) addressed by an up/down counter. This allows sweep through the Z-sub-2 and Z-sub-1 trellis coding in reverse as well as forward direction during decoding the outer convolutional coding. The second address generator also generates the addresses for writing the bit storage locations in the fifth and sixth parts of the memory 131.

The output port of the binary-to-Gray-code re-mapper 134 is connected for supplying recoded soft decisions concerning the interleaved outer convolutional coding of the transmissions being processed by the turbo decoder 130-1 to the input port of a portion 150A of the information-exchange unit 150. If the turbo decoder 140-1 is not currently processing transmissions, the soft decisions supplied to the input port of the portion 150A of the information-exchange unit 150 are reproduced at its output port. The output port of the portion 150A of the information-exchange unit 150 is connected for supplying modified soft decisions concerning the interleaved outer convolutional coding to the input port of a symbol de-interleaver 135 for soft 2-bit symbols. The output port of the symbol de-interleaver 135 is connected for supplying de-interleaved soft 2-bit symbols concerning the outer convolutional coding of final-component transmissions to the input port of a bank 136 of SISO decoders for outer convolutional coding. The symbol de-interleaver 135 includes memory for temporarily storing soft 2-bit symbols to be available to one of the bank 136 of SISO decoders that the M/H decoding control unit 66 selects for decoding the outer convolutional coding. This memory can be read to the selected SISO decoder for performing sweeps of the outer-convolutional-coding trellis in both forward and reverse directions. The up/down symbol counter for performing these sweeps can be the same one used by the second address generator.

A symbol re-interleaver 137 for soft 2-bit symbols is connected for re-interleaving the pairs of soft bits supplied from the one of the bank 136 of SISO decoders selected for decoding the outer convolutional coding. The output port of the symbol re-interleaver 137 is connected to the input port of a confidence-level adjuster 138 with CRC decoder. If the CRC decoder in the confidence-level adjuster 138 determines that a CRC codeword appears to be correct, the confidence-level adjuster 138 increases the levels of confidence of the soft data bits in that CRC codeword. The confidence-level adjuster 138 is connected for supplying adjusted soft data bits and soft parity bits of the outer convolutional coding in 2-bit-symbol form to a Gray-to-binary-code re-mapper 139. The Gray-tobinary-code re-mapper 139 is for converting the re-interleaved pairs of Gray-coded soft bits received from the confidence-level adjuster 138 back to the natural-binary-coded regime employed by the extrinsic data feedback processor 132 and the SISO decoder 133 for 12-phase trellis coding.

If the turbo decoder 130-1 is used for decoding SCCC, the Gray-to-binary-code re-mapper 139 supplies soft decisions including soft data bits and soft parity bits to a first input port of the extrinsic data feedback processor 132. These soft decisions regarding 2-bit symbols applied to the first input port of the extrinsic data feedback processor 132 are differentially compared to previous soft decisions regarding the same 2-bit symbols. The previous soft decisions are generated by reading the first and second portions of the memory 131, as addressed by the second address generator for the memory 131, and supplied to a second input port of the extrinsic data feedback processor 132. The results of the differential comparison by the extrinsic data feedback processor 139 are extrinsic data. The soft bits of the extrinsic data that relate to Z-sub-1 bits are written into bit storage locations in the fifth part of the memory 131, as addressed by the second address generator for the memory 131. The soft bits of the extrinsic data that relate to Z-sub-2 bits are written into bit storage locations in the sixth part of the memory 131, as addressed by the second address generator for the memory 131.

If the turbo decoder 130-1 is used for decoding PCCC, the Gray-to-binary-code re-mapper 139 supplies just soft data bits to the first input port of the extrinsic data feedback processor 132 These soft data bits are differentially compared to previous soft decisions regarding the same data bits. The previous soft decisions are generated by reading the first portion of the memory 131, as addressed by the second address generator for the memory 131. These previous soft decisions are supplied to the second input port of the extrinsic data feedback processor 132. The soft bits of the extrinsic data that relate to Z-sub-1 bits are written into bit storage locations in the fifth part of the memory 131, as addressed by the second address generator for the memory 131. The soft bits of the extrinsic data that relate to Z-sub-2 bits can be written into bit storage locations in the sixth part of the memory 131, as addressed by the second address generator for the memory 131. However, since extrinsic data that relates to Z-sub-2 bits is not used when decoding PCCC, these soft bits may simply be discarded rather than being written into bit storage locations in the sixth part of the memory 131.

Presuming that the symbol interleaving of the outer convolutional coding is implied, the input port of the hard-decision unit 160 shown in FIG. 32C is connected for receiving soft data bits from the output port of the confidence-level adjuster 138. The battery 164 of XOR gates is also connected for receiving these soft data bits. If the symbol interleaving of the outer convolutional coding is not implied, the input port of the hard-decision unit 160 is instead connected for receiving soft data bits from the output port of the bank 136 of SISO decoders.

The structure and operation of the turbo decoder 140-1 is similar to that of the turbo decoder 130-1. A memory 141, an extrinsic data feedback processor 142 and a SISO decoder 143 in the turbo decoder 140-1 are connected and operated similarly to the memory 131, the extrinsic data feedback processor 142 and the SISO decoder 133 in the turbo decoder 130-1. A binary-to-Gray-code re-mapper 144 is connected for recoding soft decisions concerning the interleaved outer convolutional coding of the transmissions being processed by the turbo decoder 140-1 and supplying the recoded soft decisions to the input port of a portion 150B of the information-exchange unit 150. The output port of the portion 150B of the information-exchange unit 150 is connected for supplying modified soft decisions concerning the interleaved outer convolutional coding to the input port of a symbol de-interleaver 145 for soft 2-bit symbols. The output port of the symbol de-interleaver 145 is connected for supplying de-interleaved soft 2-bit symbols concerning the outer convolutional coding of initial-component transmissions to the input port of a bank 146 of SISO decoders. A symbol re-interleaver 147 for soft 2-bit symbols is connected for re-interleaving the pairs of soft bits supplied from the one of the bank 146 of SISO decoders selected for decoding the outer convolutional coding. The output port of the symbol re-interleaver 147 is connected to the input port of a confidence-level adjuster 148 with CRC decoder. The confidence-level adjuster 148 is connected for supplying adjusted soft data bits and soft parity bits of the outer convolutional coding to a Gray-to-binary-code re-mapper 149 to be converted back to the natural-binary-coded regime employed by the extrinsic data feedback processor 142 and the SISO decoder 143.

FIG. 40 does not show the output port of the confidence-level adjuster 148 connected for supplying soft data bits for RS Frame decoding procedures. Such a connection is made when implementing a modification of the FIG. 32 M/H receiver in which two RF tuners replace the single frequency-agile RF tuner. Minor further modifications of such an M/H receiver suit it for accommodating changes in the RF channel to be received without a blank screen or frame-freeze condition in video and a drop-out in audio during the switchover being quite as evident to a viewer/listener. The turbo decoder 130-1 is used for decoding the RF channel being switched from, and the turbo decoder 140-1 is used for decoding the RF channel being switched to. Program material is taken from RS Frames that have been completely written with decoding results from the turbo decoder 130-1 until program material is available from RS Frames that have been completely written with decoding results from the turbo decoder 140-1.

The memories 131 and 141 can both use the same first address generator and the same second address generator. If the outer convolutional coding is not Gray-code-labeled, the binary-to-Gray-code re-mappers 134 and 144 of FIG. 40 will be replaced by respective direct connections. So will the Gray-to-binary-code re-mappers 139 and 149. The confidence-level adjusters 138 and 148 increase the levels of confidence of the soft data bits regarding CRC codewords the hard data bits of which CRC codewords appear to be correct to CRC decoders within each of the confidence-level adjusters 138 and 148.

Figure 41:
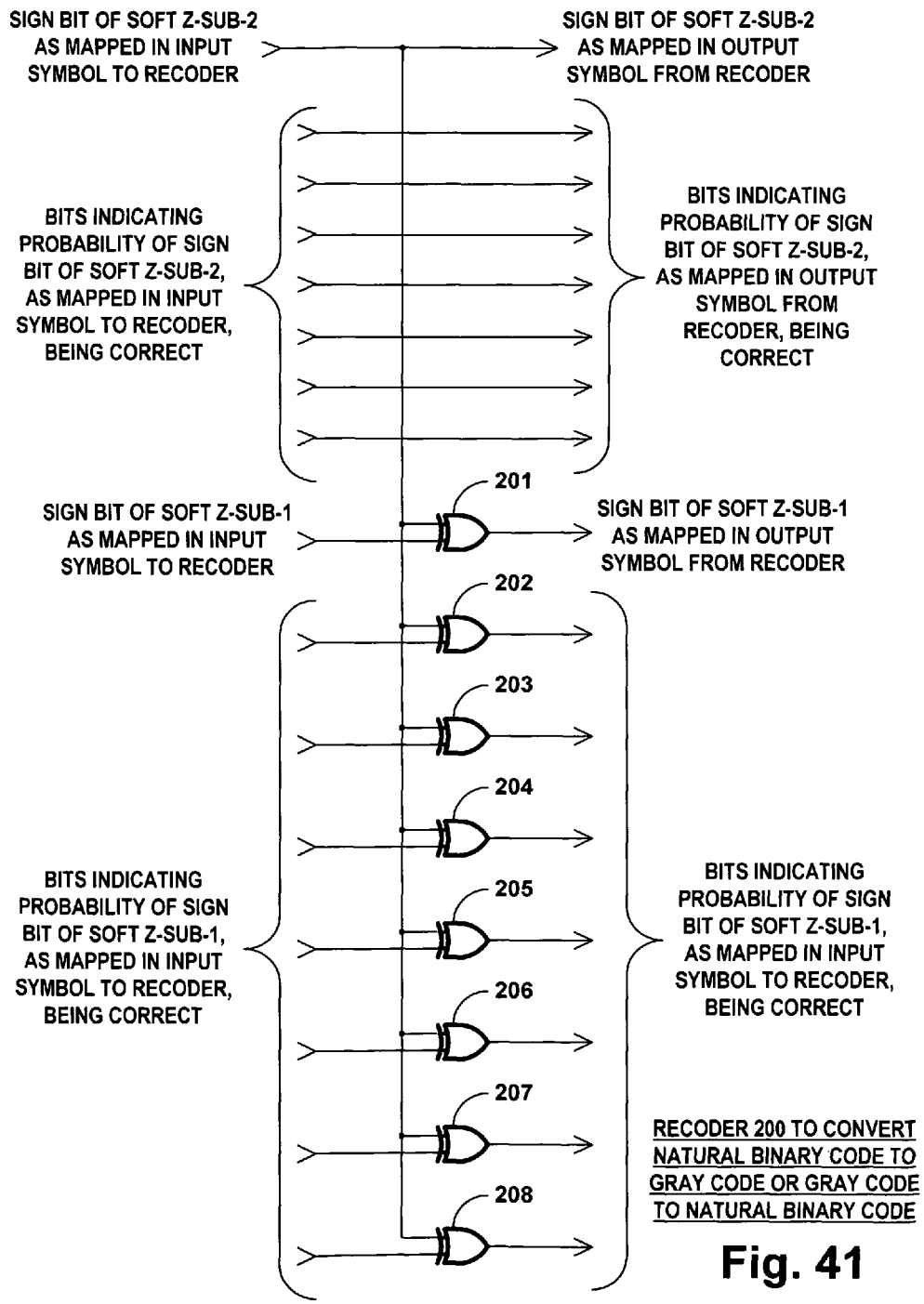
FIG. 41 is a detailed schematic diagram of a representative arrangement used in the turbo decoders of FIG. 40 for converting 2-bit symbols either from natural binary coding to reflected binary (Gray) coding or from reflected binary (Gray) coding to natural binary coding, which arrangement was disclosed and claimed by A. L. R. Limberg in U.S. patent application Ser. No. 12/456,608 filed 20 Jun. 2009 and titled "System for digital television broadcasting using modified 2/3 trellis coding".

FIG. 41 shows a recoder 200 composed of simple logic circuitry. The recoder 200 can be used as a natural-binary-code-to-reflected-binary-code converter for soft 2-bit symbols. So, the binary-to-Gray-code re-mappers 134 and 144 can each be constructed like the recoder 200. The recoder 200 can be used alternatively as a reflected-binary-code-to-natural-binary-code converter for soft 2-bit symbols. So, the Gray-to-binary-code re-mappers 139 and 149 can each be constructed like the recoder 200. Supposing the 2-bit symbols to be composed of a soft Z-sub-2 "more significant" bit and a soft Z-sub-1 "less significant" bit when natural-binary-coded, the soft Z-sub-2 bit stays the same when Gray-coded, but the soft Z-sub-1 bits are "reflected". Positive-going amplitude modulation of the 8-VSB AM signal is associated with the recoded Z-sub-2 "hard" bit being a logic ONE, and negative-going amplitude modulation of the 8-VSB AM signal is associated with the recoded Z-sub-2 bit "hard" being a logic ZERO. Irrespective of the sense of modulation, the Z-sub-1 "hard" bit of a Gray-coded symbol being a logic ONE is associated with lesser amplitude modulation of the 8-VSB AM signal. The Z-sub-1 "hard" bit of a Gray-coded symbol being a logic ZERO is associated with greater amplitude modulation of the 8-VSB AM signal. The remaining bits of each soft bit express the probability of the preceding "hard" bit being correct.

The initial one of the two soft bits in the symbol supplied to the recoder 200 is passed therethrough without change to provide the initial one of the two soft bits in a respective symbol of the recoder 200 response. Each of the component eight simple bits in the final one of the two soft bits in the symbol supplied to the recoder 200 is supplied to a first of two input connections of a respective one of exclusive-OR gates 201, 202, 203, 204, 205, 206, 207 and 208 included within the recoder 200. The component bit of the initial one of the two soft bits in the symbol supplied to the recoder 200 that is variously referred to as its sign bit or "hard" bit is applied to the respective second input connections of the exclusive-OR gates 201, 202, 203, 204, 205, 206, 207 and 208. The final one of the two soft bits in each symbol of the recoder 200 response is supplied from via output connections from the exclusive-OR gates 201, 202, 203, 204, 205, 206, 207 and 208.

Figure 42:
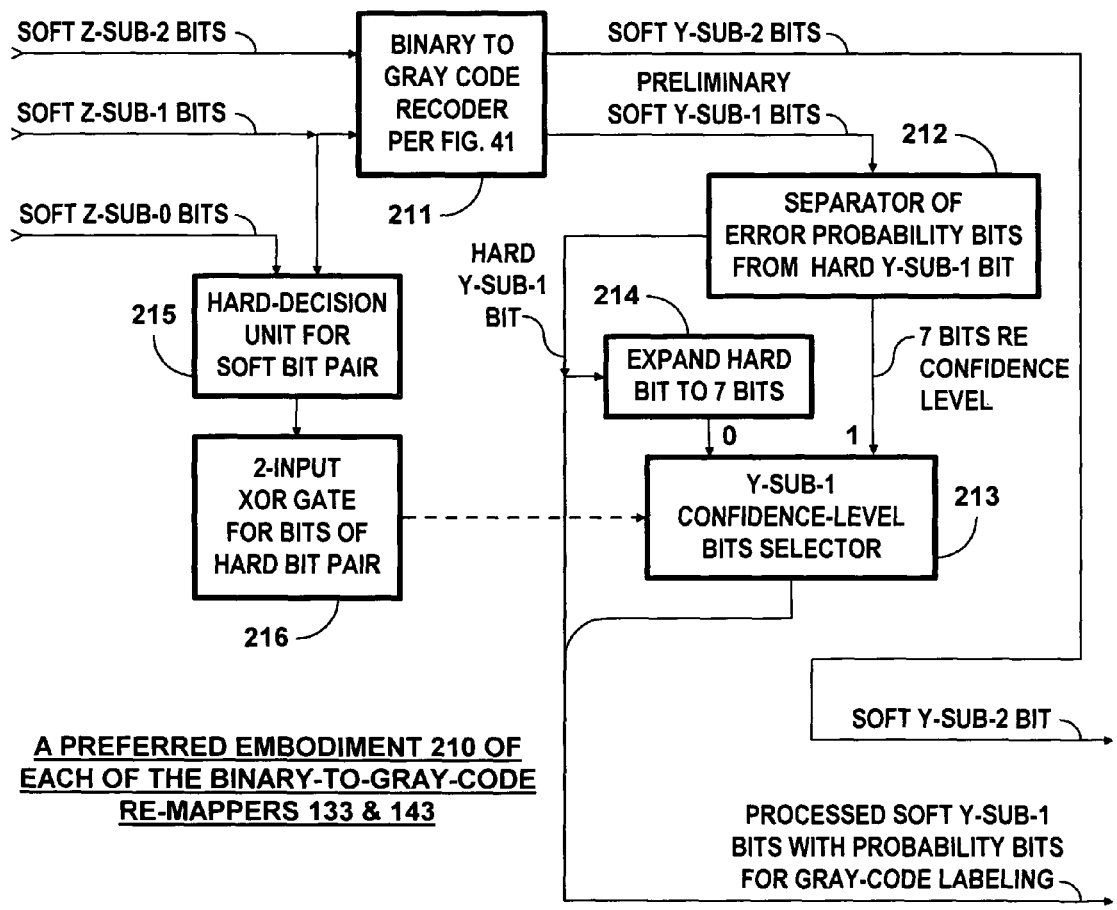
FIG. 42 is a detailed schematic diagram of a novel arrangement that each of the turbo decoders of FIG. 40 can use advantageously for converting 2-bit symbols from natural binary coding to reflected binary (Gray) coding.
Figure 49:
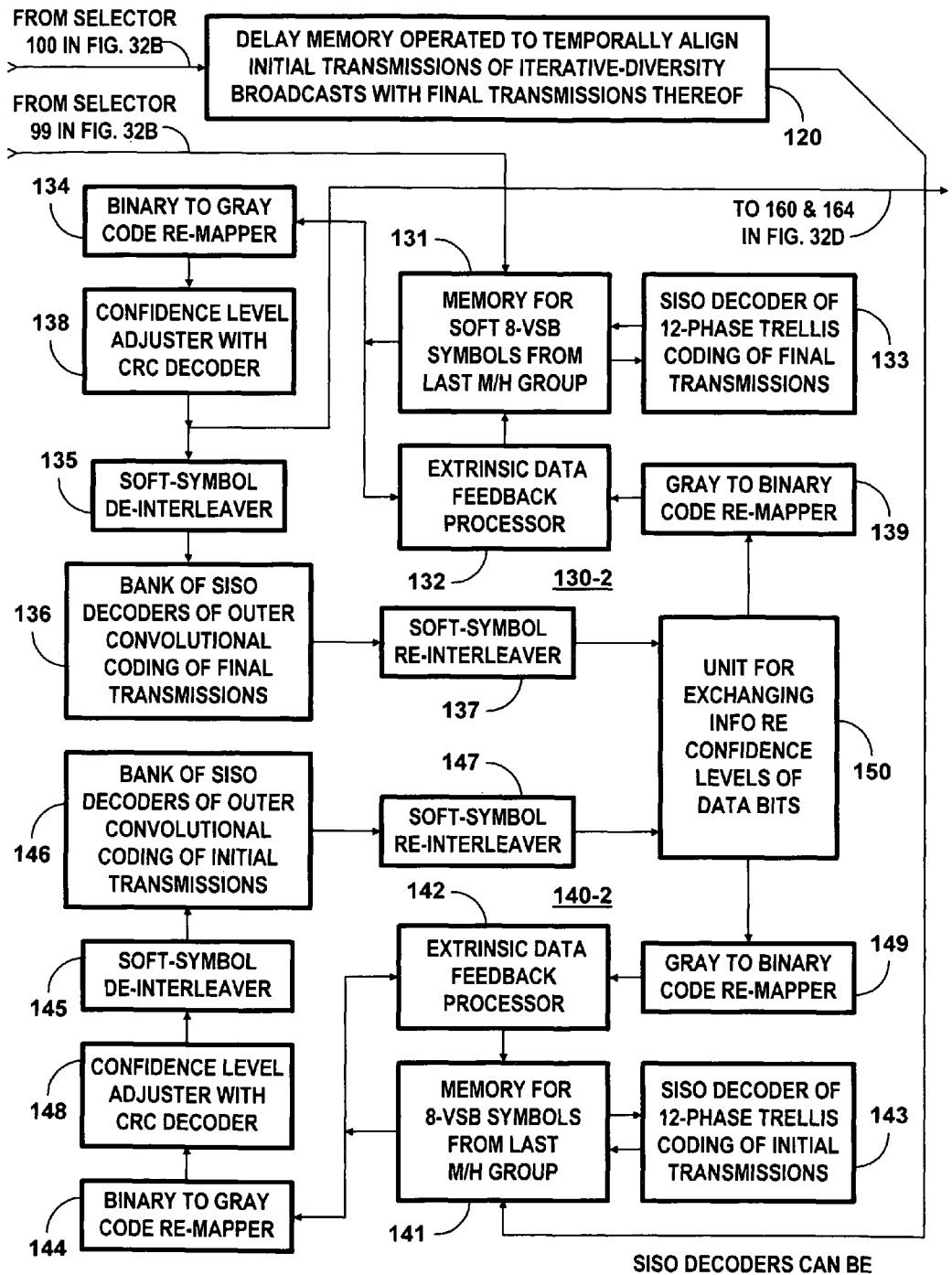
FIG. 49 is a schematic diagram of a second representative embodiment of the paralleled turbo decoders for diversity reception shown in the FIG. 33D portion of the FIG. 33 receiver apparatus.

FIG. 42 shows a preferred embodiment 210 of each of the binary-to-Gray-code re-mappers 134 and 144 employed in the paired turbo decoders 130 and 140 shown in FIGS. 40 and 49. The FIG. 42 binary-to-Gray-code re-mapper 210 is connected for receiving soft decisions in regard to contemporaneous Z-sub-2, Z-sub-1 and Z-sub-0 bits. FIG. 42 shows the soft Z-sub-2 and Z-sub-1 bits being applied to a binary-to-Gray-code recoder 211 as input signal thereto. The recoder 211 corresponds in structure and operation to the FIG. 41 binary-to-Gray-code recoder 200. The soft Y-sub-2 bits of the recoder 211 response reproduce the Z-sub-2 bits applied thereto and are supplied as part of the ultimate response of the FIG. 42 binary-to-Gray-code re-mapper 210.

FIG. 42 shows preliminary soft Y-sub-1 bits in the recoder 211 response being supplied to a separator 212 that separates the hard Y-sub-1 bit (its sign bit) of each preliminary soft Y-sub-1 bit from the seven or so bits indicative of the level of confidence that that hard Y-sub-1 bit is correct. The separator 212 can be simply constructed by appropriate hard wiring. The groups of seven or so bits indicative of the level of confidence that that hard Y-sub-1 bits are correct, as separated by the separator 212, are applied to a first of two 7-or-so-bits-wide input ports of a Y-sub-1 confidence-level-bits selector 213. FIG. 42 shows an expander 214 for expanding each successive hard Y-sub-1 bit to seven or so bits for application to the second of the two 7-or-so-bits-wide input ports of the selector 213. The hard Y-sub-1 bits are joined with the Y-sub-1 confidence-level-bits that the selector 213 reproduces as its response, thus to form processed soft Y-sub-1 bits supplied as a further part of the ultimate response of the FIG. 42 binary-to-Gray-code re-mapper 210.

The selection of the Y-sub-1 confidence-level-bits reproduced by the selector 213 is controlled responsive to the Z-sub-1 and Z-sub-0 bits descriptive of binary-coded modulation conditions. A hard-decision unit 215 is connected for receiving soft Z-sub-1 bits and soft Z-sub-0 bits descriptive of binary-coded modulation conditions and for supplying contemporaneous hard Z-sub-1 bits and hard Z-sub-0 bits extracted from those soft bits. A 2-input exclusive-OR gate 216 is connected for receiving each successive pair of contemporaneous hard Z-sub-0.1 bits and hard Z-sub-0 bits that the hard-decision unit 215 extracts from an 8-VSB symbol conveying M/H data. The response of the XOR gate 216 is applied to the selector 213 as a control signal for controlling the selection of Y-sub-1 confidence-level-bits to be reproduced by the selector 213.

If the binary-coded 8-VSB modulation signal encodes '000' level, the Gray-labeled outer convolutional code will have a value '00' in which the ZERO-valued soft Y-sub-1 bit should have a high confidence level that the ZERO-valued hard Y-sub-1 bit is correct. The XOR gate 216 response to the hard Z-sub-1 bit and the hard Z-sub-0 bit both being ZEROes will be a ZERO, conditioning the selector 213 to reproduce the '000 0000' expanded ZERO hard Y-sub-1 bit. This '000 0000' joins with the '0' hard Y-sub-1 bit to supply a processed soft Y-sub-1 bit having a high confidence level that the ZERO-valued hard Y-sub-1 bit is correct.

If the binary-coded 8-VSB modulation signal encodes '011' level, the Gray-labeled outer convolutional code will have a value '01' in which the ONE-valued soft Y-sub-1 bit should have a high confidence level that the ONE-valued hard Y-sub-1 bit is correct. The XOR gate 216 response to the hard Z-sub-1 bit and the hard Z-sub-0 bit both being ONEs will be a ZERO, conditioning the selector 213 to reproduce the '111 1111' expanded ONE hard Y-sub-1 bit. This '111 1111' joins with the '1' hard Y-sub-1 bit to supply a processed soft Y-sub-1 bit having a high confidence level that the ONE-valued hard Y-sub-1 bit is correct.

If the binary-coded 8-VSB modulation signal encodes '100' level, the Gray-labeled outer convolutional code will have a value '11' in which the ONE-valued soft Y-sub-1 bit should have a high confidence level that the ONE-valued hard Y-sub-1 bit is correct. The XOR gate 216 response to the hard Z-sub-1 bit and the hard Z-sub-0 bit both being ZEROes will be a ZERO, conditioning the selector 213 to reproduce the '111 1111' expanded ONE hard Y-sub-1 bit. This '111 1111' joins with the '1' hard Y-sub-1 bit to supply a processed soft Y-sub-1 bit having a high confidence level that the ONE-valued hard Y-sub-1 bit is correct.

If the binary-coded 8-VSB modulation signal encodes '111' level, the Gray-labeled outer convolutional code will have a value '10' in which the ZERO-valued soft Y-sub-1 bit should have a high confidence level that the ZERO-valued hard Y-sub-1 bit is correct. The XOR gate 216 response to the hard Z-sub-1 bit and the hard Z-sub-0 bit both being ONEs will be a ZERO, conditioning the selector 213 to reproduce the '000 0000' expanded ZERO hard Z-sub-1 bit. This '000 0000' joins with the '0' hard Y-sub-1 bit to supply a processed soft Y-sub-1 bit having a high confidence level that the ZERO-valued hard Y-sub-1 bit is correct.

If the binary-coded 8-VSB modulation signal encodes '001', '010', '101' or '110' level, the XOR gate 216 will supply a ONE in response to the hard Z-sub-1 bit and the hard Z-sub-0 bit having different values. This ONE supplied as control signal to the selector 2103 conditions the selector 213 to reproduce the seven or so confidence-level bits that the separator 212 separated from the preliminary Y-sub-1 bit supplied thereto from the binary-to-Gray-code recoder 211. These confidence-level bits as reproduced in the selector 213 response are rejoined with the hard Y-sub-1 bit separated by the separator 212 to supply a processed soft Y-sub-1 bit that reproduces the preliminary soft Y-sub-1 bit supplied from the binary-to-Gray-code recoder 211.

In variations of the FIG. 42 binary-to-Gray-code re-mapper 210, the expander 214 of the hard Y-sub-1 bits ones' complements each hard Y-sub-1 bit to form the least significant bit or a few of the less significant bits of the 7-or-so-bit-wide confidence level applied to the second input port of the selector 213.

Figure 43:
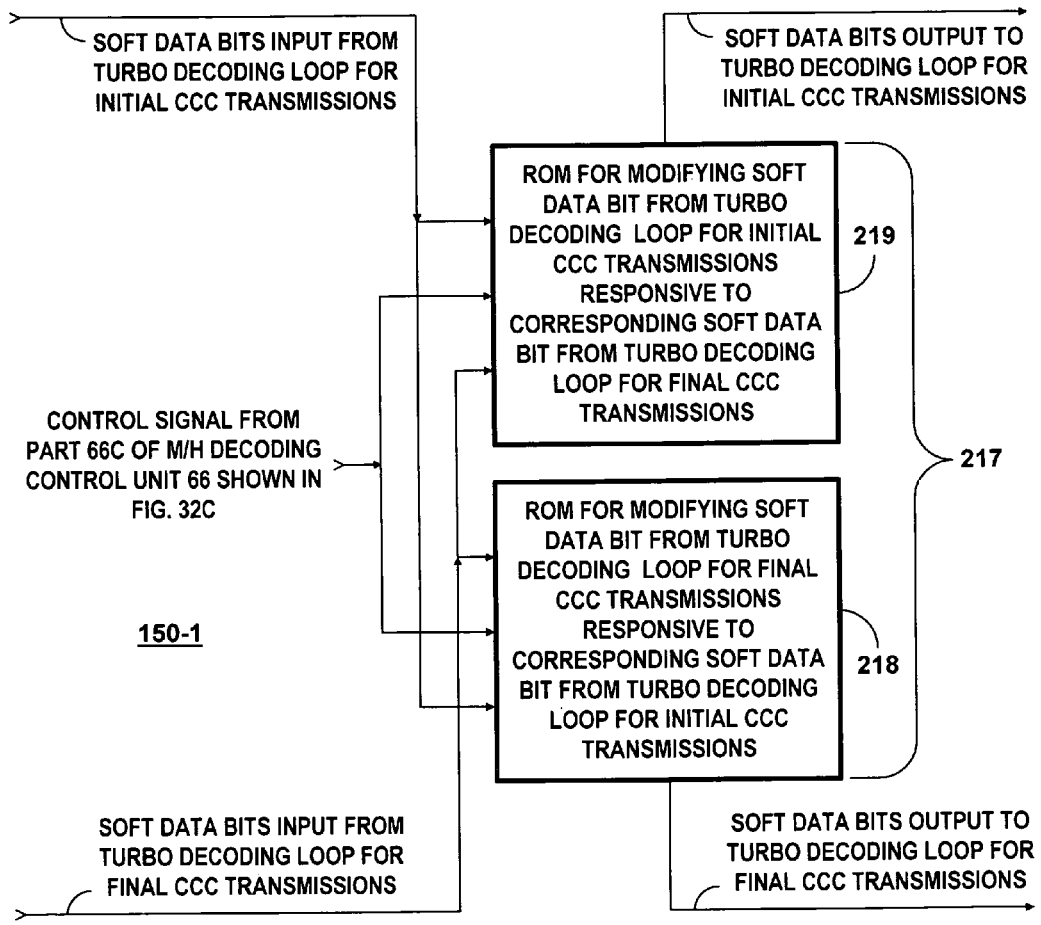
FIG. 43 is a detailed schematic diagram of a first embodiment of the information-exchange unit that the paralleled turbo decoders of FIG. 40 use during diversity reception to exchange information between their respective turbo loops.

FIG. 43 shows a first embodiment 150-1 of the information-exchange unit 150 for exchanging information regarding soft data bits between the two turbo decoders 130 and 140 shown in FIGS. 32D, 40 and 49. This first embodiment 150-1 of the information-exchange unit 150 is implemented with read-only memory (ROM) 217 divided into two halves 218 and 219. Soft data bits from corresponding breakpoints in the turbo loops of the decoders 130 and 140 provide each of the ROM halves 218 and 219 its input addressing. The ROM half 218 is connected to supply adjusted soft data bits for continuing the turbo loop of the decoder 130. The ROM half 219 is connected to supply adjusted soft data bits for continuing the turbo loop of the decoder 140. The output response of the ROM half 218 adjusts the soft data bit received from the breakpoint in the turbo loop of the decoder 130, which soft data bit provides one half of the input addressing of the ROM half 218. This adjustment by the ROM half 218 is responsive to the soft data bit received from the turbo loop of the decoder 140 as the other half of its input address. The output response of the ROM half 219 adjusts the soft data bit received from the breakpoint in the turbo loop of the decoder 140, which soft data bit provides one half of the input addressing of the ROM half 219. This adjustment by the ROM half 219 is responsive to the soft data bit received from the turbo loop of the decoder 130 as the other half of its input address.

FIG. 43 shows a further input address bit being applied to each of the ROM halves 218 and 219, which further input address bit is supplied via a connection from part 66D of the M/H decoding control unit 66 shown in FIG. 32D. This further input address bit has a first value when the M/H data bits being processed by the turbo decoder 140 should be ones' complements of the M/H data bits being processed by the turbo decoder 130. This will be the case during iterative-diversity reception of broadcasts from a single DTV transmitter, which broadcasts repeat the initial-component transmissions just once as final-component transmissions. Also, this will be the case during frequency-diversity reception of broadcasts from certain pairs of DTV transmitters. The further input address bit applied to each of the ROM halves 218 and 219 can have a second value complementary to the first value. This is the case during frequency-diversity reception of broadcasts from certain other pairs of DTV transmitters when the M/H data bits being processed by the turbo decoders 130 and 140 should be similar to each other, rather than being ones' complements of each other.

Suppose that during iterative-diversity reception one of the hard-decision portions of the two soft bits contemporaneously supplied by the turbo loops of the decoders 130 and 140 as input addressing for the two ROM halves 218 and 219 is a ONE and the other is a ZERO. Each of the two soft bits supports increased likelihood that itself and the other bit are correct. If the chance of one of the bits being in error is 1/n, the chance of both being in error is $(1/n) \times (1/n) = 1/n^2$. So, the chance of both being correct is $1 - (1/n^2) = (n^2-1)/n^2$. That is, the chance of both bits being correct is $(n^2-1)$ times as likely as both being erroneous. Accordingly, if possible, the output response of the ROM half 218 increases the confidence level of the soft data bit received from the turbo loop of the turbo decoder 130 in the adjusted soft data bit it supplies for continuing that turbo loop. The hard-decision portion of the soft bit received from the turbo loop of the turbo decoder 130 is kept the same in the soft bit that the ROM half 218 supplies for continuing that turbo loop. Furthermore, if possible, the output response of the ROM half 219 increases the confidence level of the soft data bit received from the turbo loop of the turbo decoder 140 in the adjusted soft data bit it supplies for continuing that turbo loop. The hard-decision portion of the soft bit received from the turbo loop of the turbo decoder 140 is kept the same in the soft bit that the ROM half 219 supplies for continuing that turbo loop.

Suppose that during iterative-diversity reception the hard-decision portions of the two soft data bits contemporaneously supplied as first and second halves of the input addressing for the ROM halves 218 and 219 are the same, rather than being different. This indicates that the hard-decision portion of one of the two soft bits is in error. If the confidence levels of both of the soft bits are fairly similar, the soft data bit that the ROM half 218 supplies for continuing the turbo loop of the turbo decoder 130 is, if possible, decreased to be somewhat lower than that of the soft data bit that the ROM half 218 received from that turbo loop. The hard-decision portion of the soft bit that the ROM half 218 supplies for continuing the turbo loop of the turbo decoder 130 is kept the same as that of the soft data bit received from that turbo loop. Furthermore, the soft data bit that the ROM half 219 supplies for continuing the turbo loop of the turbo decoder 140 is, if possible, decreased to be somewhat lower than that of the soft data bit that the ROM half 219 received from that turbo loop. The hard-decision portion of the soft bit that the ROM half 219 supplies for continuing the turbo loop of the turbo decoder 140 is kept the same as that of the soft data bit received from that turbo loop.

Suppose that during iterative-diversity reception the hard-decision portions of the first and second halves of the input addressing for the ROM halves 218 and 219 are the same, rather than being different, but the confidence level of the soft data bit supplied from the turbo decoder 130 is much higher than the confidence level of the soft data bit supplied from the turbo decoder 140. This indicates increased likelihood that the soft bit supplied from the turbo decoder 130 is correct and decreased likelihood that the soft bit supplied from the turbo decoder 140 is correct. Accordingly, if possible, the output response of the ROM half 218 adjusts the soft data bit supplied from the turbo decoder 130 increasing the confidence level of that soft data bit somewhat for continuing the turbo loop of the turbo decoder 130. The hard-decision portion of that adjusted soft data bit is kept the same as that of the soft data bit supplied from the turbo decoder 130. Furthermore, if possible, the output response of the ROM half 219 adjusts the soft data bit supplied from the turbo decoder 140 decreasing the confidence level of that soft data bit somewhat for continuing the turbo loop of the turbo decoder 140. The hard-decision portion of that adjusted soft data bit is kept the same as that of the soft data bit supplied from the turbo decoder 140, if the difference between the confidence levels of the soft data bits contemporaneously supplied from the turbo decoders 130 and 140 is not too great. If the difference is very great because the confidence level of the soft bit supplied from the decoder 140 is very low, turbo decoding is apt to progress faster if the hard-decision portion of that soft data bit is ones' complemented in the adjusted soft data bit supplied for continuing the turbo loop in the turbo decoder 140.

Suppose that during iterative-diversity reception the hard-decision portions of the first and second halves of the input addressing for the ROM halves 218 and 219 are the same, rather than being different, but the confidence level of the soft data bit supplied from the turbo decoder 140 is much higher than the confidence level of the soft data bit supplied from the turbo decoder 130. This indicates increased likelihood that the soft bit supplied from the turbo decoder 140 is correct and decreased likelihood that the soft bit supplied from the turbo decoder 130 is correct. Accordingly, if possible, the output response of the ROM half 219 adjusts the soft data bit supplied from the turbo decoder 140 increasing the confidence level of that soft data bit somewhat for continuing the turbo loop of the turbo decoder 140. The hard-decision portion of that adjusted soft data bit is kept the same as that of the soft data bit supplied from the turbo decoder 140. Furthermore, if possible, the output response of the ROM half 218 adjusts the soft data bit supplied from the turbo decoder 130 decreasing the confidence level of that soft data bit somewhat for continuing the turbo loop of the turbo decoder 130. The hard-decision portion of that adjusted soft data bit is kept the same as that of the soft data bit supplied from the turbo decoder 130, if the difference between the confidence levels of the soft data bits contemporaneously supplied from the turbo decoders 130 and 140 is not too great. If the difference is very great because the confidence level of the soft bit supplied from the decoder 130 is very low, turbo decoding is apt to progress faster if the hard-decision portion of that soft data bit is ones' complemented in the adjusted soft data bit supplied for continuing the turbo loop in the turbo decoder 130.

Figure 44:
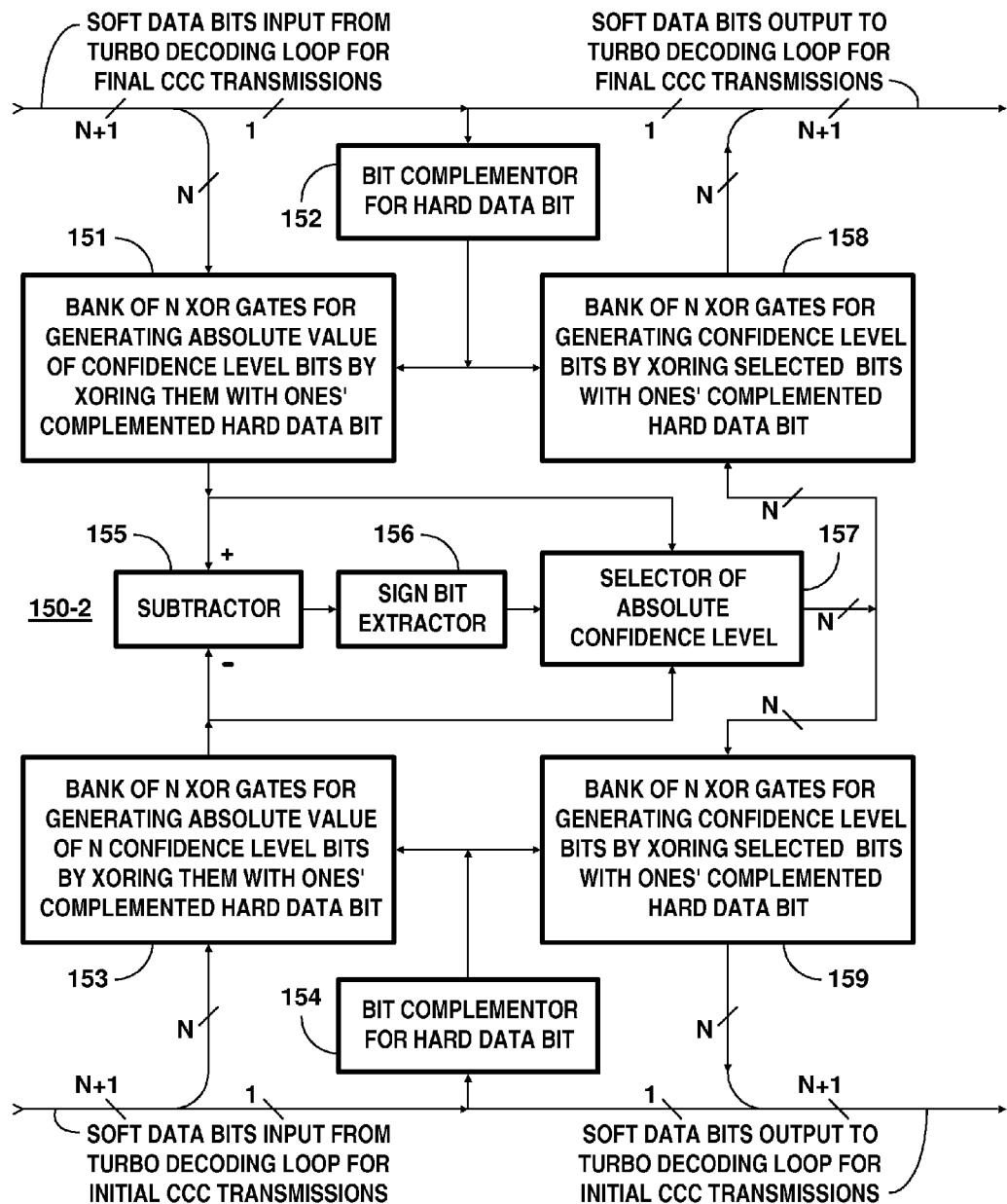
FIG. 44 is a schematic diagram of a second embodiment of the information-exchange unit that the paralleled turbo decoders of FIG. 40 use during diversity reception to exchange information between their respective turbo loops.

FIG. 44 shows in detail a second embodiment 150-2 of the information-exchange unit 150 for exchanging information regarding data bits between the turbo decoders 130 and 140 shown in FIGS. 32D, 40 and 49. This second embodiment of the information-exchange unit 150 comprises elements 151, 152, 153, 154, 155, 156, 157, 158 and 159. The information-exchange unit 150-2 shown in FIG. 44 compares each soft data bit from a breakpoint in the turbo decoding loop of the turbo decoder 140 for initial transmissions with the corresponding soft data bit from a like breakpoint in the turbo decoding loop of the turbo decoder 130 for final transmissions. The FIG. 44 information-exchange unit 150-2 then selects the soft data bit with the better confidence level as the basis for continuing the paired turbo loops of the turbo decoders 130 and 140. The structure and operation of the FIG. 44 information-exchange unit 150-2 are described in further detail, following.

Each of the soft data bits from the breakpoint in the turbo decoding loop of the turbo decoder 130 is separated into two components, a single hard data bit and a number N of confidence-level bits expressing a level of confidence that the hard data bit is correct. A bank 151 of 2-input exclusive-OR gates, N in number, is connected for receiving the N confidence-level bits, which are applied to respective ones of the first input ports of those XOR gates. A bit complementor 152 is connected for ones' complementing the hard data bit and supplying the complemented hard data bit to the second input ports of the XOR gates in the bank 151 of them. The responses from the bank 151 of XOR gates together provide an absolute value of the level of confidence that a hard data bit from the breakpoint in the turbo decoding loop of the turbo decoder 130 is correct.

Each of the soft data bits from the breakpoint in the turbo decoding loop of the turbo decoder 140 is separated into two components, a single hard data bit and a number N of confidence-level bits expressing a level of confidence that the hard data bit is correct. A bank 153 of 2-input exclusive-OR gates, N in number, is connected for receiving the N confidence-level bits, which are applied to respective ones of the first input ports of those XOR gates. A bit complementor 154 is connected for ones' complementing the hard data bit and supplying the complemented hard data bit to the second input ports of the XOR gates in the bank 153 of them. The responses from the bank 153 of XOR gates together provide an absolute value of the level of confidence that a hard data bit from the breakpoint in the turbo decoding loop of the turbo decoder 140 is correct.

A subtractor 155 is connected for receiving the response of the bank 151 of XOR gates as a minuend input signal and for receiving the response of the bank 153 of XOR gates as a subtrahend input signal. The subtractor 155 performs subtraction using twos' complement arithmetic to generate a difference output signal. A sign bit extractor 156 is connected for receiving the difference output signal from the subtractor 155 and extracting the sign bit for application as control signal to a selector 157. The selector 157 responds to this control signal to reproduce the larger of the respective responses of the banks 151 and 153 of XOR gates. That is, the selector 157 is conditioned by its control signal to reproduce the larger absolute value of confidence level associated with a pair of corresponding soft data bits from the turbo loops of the turbo decoders 130 and 140.

A bank 158 of 2-input exclusive-OR gates, N in number, is connected for receiving the N bits of the absolute value of confidence level reproduced by the selector 157, which are applied to respective ones of the first input ports of those XOR gates. The bit complementor 152 is connected for supplying its complemented hard data bit response to the second input ports of the XOR gates in the bank 158 of them. The bank 158 of XOR gates generates N bits of an updated confidence level to be joined with the hard data bit from the breakpoint in the turbo loop of the turbo decoder 130 to be used in continuing that turbo loop.

A bank 159 of 2-input exclusive-OR gates, N in number, is connected for receiving the N bits of the absolute value of confidence level reproduced by the selector 157, which are applied to respective ones of the first input ports of those XOR gates. The bit complementor 154 is connected for supplying its complemented hard data bit response to the second input ports of the XOR gates in the bank 159 of them. The bank 159 of XOR gates generates N bits of an updated confidence level to be joined with the hard data bit from the breakpoint in the turbo loop of the turbo decoder 140 to be used in continuing that turbo loop.

In variants of this second embodiment 150 of the information-exchange unit 150 the confidence levels supplied from the banks 158 and 159 do not replace original confidence levels as supplied from respective breakpoints in the turbo loops of the turbo decoders 130 and 140 when continuing those loops. Instead, a weighted average of the confidence level generated by the bank 158 of XOR gates and the original confidence level as supplied from the breakpoint in the turbo loop of the turbo decoder 130 is used in continuing that turbo loop. And, a weighted average of the confidence level generated by the bank 159 of XOR gates and the original confidence level as supplied from the breakpoint in the turbo loop of the turbo decoder 140 is used in continuing that turbo loop.

Figure 45:
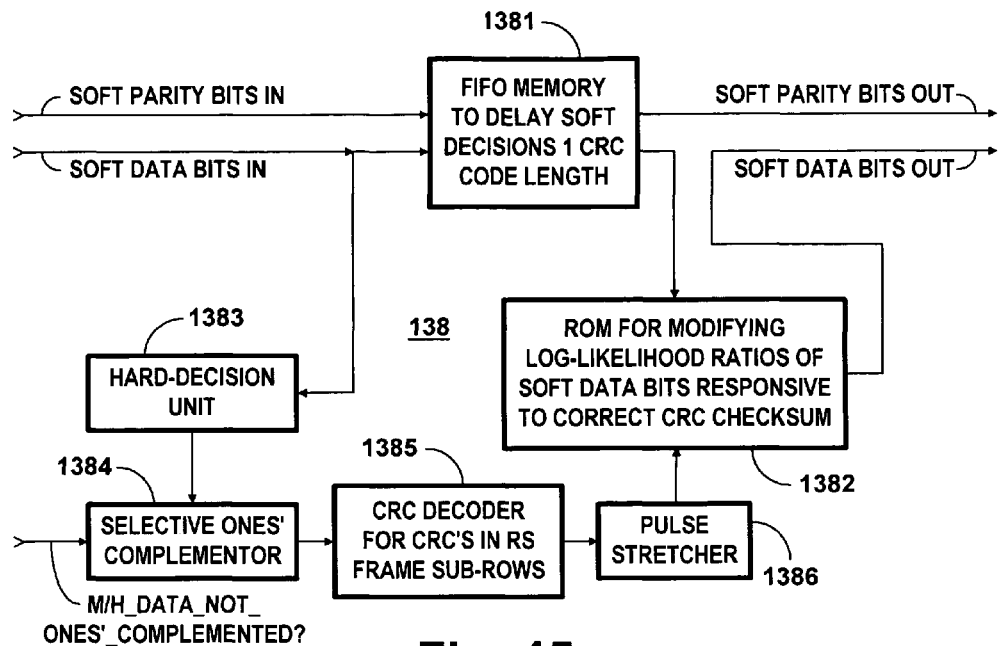
FIGS. 45 and 46 are schematic diagrams of apparatus representative of that which the paralleled turbo decoders of FIG. 40 or of FIG. 49 use for adjusting the confidence levels of soft data bits during turbo decoding, the adjustments being made responsive to the results of CRC decoding.

FIG. 45 shows details of the confidence-level adjuster 138 that modifies the confidence levels of soft data bits supplied from the soft-symbol re-interleaver 137 to the Gray-to-binary-code re-mapper 139 in the turbo decoder 130-1 shown in FIG. 40. The modification is responsive to CRC decoding of CRC codewords that occupy rows or sub-rows of bytes in the RS Frames for the final ones of iterative-diversity transmissions. After a delay as long as the time taken for decoding each of the CRC codewords, a first-in/first-out memory 1381 reproduces the soft parity bits supplied from the soft-symbol re-interleaver 137 and supplies them to the input port of the Gray-to-binary-code re-mapper 139. Also, after that delay, the FIFO memory 1381 reproduces the soft data bits of the soft-symbol re-interleaver 137 response for application to a read-only memory 1382 as partial input addressing thereto. The ROM 1382 is used to modify the confidence levels of those soft data bits. A hard-decision unit 1383 is connected for extracting hard data bits from the response of the soft-symbol re-interleaver 137 and supplying those hard data bits to the input port of a selective ones' complementor (or exclusive-OR gate) 1384. The selective ones' complementor 1384 reproduces at its output port the hard data bits received at its input port or their bit complements, depending on whether the M/H_data_not_ones'_complemented? bit from each of the TPC signals accompanying the M/H data for the turbo decoder 130 is a ZERO or a ONE. The output port of the selective ones' complementor 1384 is connected for supplying selectively complemented bits to a decoder 1385 for the cyclic-redundancy-check coding of CRC codewords contained within each row or sub-row of bytes in each successive RS Frame for the final transmissions. The CRC decoder 1385 includes input circuitry therein for converting the data bits received serially from the selective ones' complementor 1384 to 16-parallel-bit format for the CRC decoding procedures. The CRC decoder 1385 is connected for supplying a pulse stretcher 1386 a respective single-bit indication as to whether the CRC decoder 1385 finds each CRC codeword to be correct or not. The pulse stretcher 1386 stretches each such single-bit indication, reproducing it for the duration of a CRC codeword read from the FIFO memory 1381 and is connected for applying that reproduced CRC decoding result to the ROM 1382 for completing its input addressing. If the CRC decoder 1385 does not detect any error in the CRC codeword, the decoder 1385 supplies a ONE to the pulse stretcher 1386. The stretched-in-time ONE from the pulse stretcher 1386 conditions the ROM 1382 to increase the confidence levels of the soft data bits in the CRC codeword as supplied from the ROM 1382 to the Gray-to-binary-code re-mapper 139. If the CRC decoder 1385 detects error in the CRC codeword, the decoder 1385 supplies a ZERO to the pulse stretcher 1386. The stretched-in-time ZERO from the pulse stretcher 1386 conditions the ROM 1382 to leave unaltered the confidence levels of the soft data bits in the CRC codeword as supplied from the ROM 1382 to the Gray-to-binary-code re-mapper 139.

Figure 46:
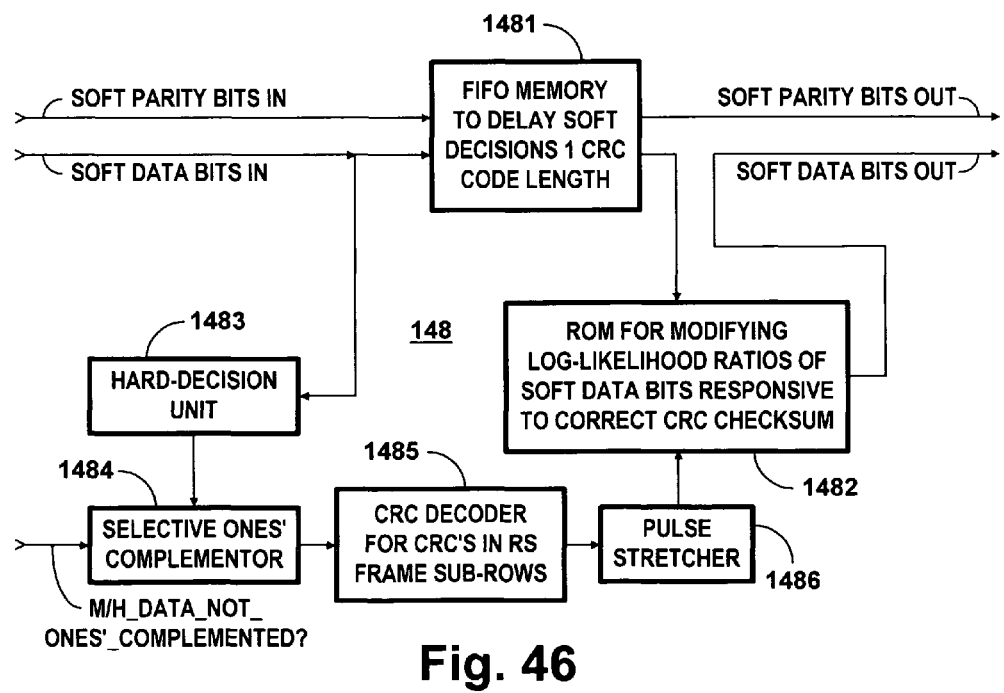

FIG. 46 shows details of the confidence-level adjuster 148 that modifies the confidence levels of soft data bits supplied from the soft-symbol re-interleaver 147 to the Gray-to-binary-code re-mapper 149 in the turbo decoder 140-1 shown in FIG. 40. The modification is responsive to CRC decoding of CRC codewords that occupy rows or sub-rows of bytes in the RS Frames for the initial ones of iterative-diversity transmissions. After a delay as long as the time taken for decoding each of the CRC codewords, a first-in/first-out memory 1481 reproduces the soft parity bits supplied from the soft-symbol re-interleaver 147 and supplies them to the input port of the Gray-to-binary-code re-mapper 149. Also, after that delay, the FIFO memory 1481 reproduces the soft data bits of the soft-symbol re-interleaver 147 response for application to a read-only memory 1482 as partial input addressing thereto. The ROM 1482 is used to modify the confidence levels of those soft data bits. A hard-decision unit 1483 is connected for extracting hard data bits from the response of the soft-symbol re-interleaver 147 and supplying those hard data bits as the input signal to the input port of a selective ones' complementor (or exclusive-OR gate) 1484. The selective ones' complementor 1484 reproduces at its output port the hard data bits received at its input port or their bit complements, depending on whether the M/H_data_not_ones'_complemented? bit from each of the TPC signals accompanying the M/H data for the turbo decoder 140 is a ZERO or a ONE. The output port of the selective ones' complementor 1484 is connected for supplying selectively complemented bits to a decoder 1485 for the cyclic-redundancy-check coding of CRC codewords contained within each row or sub-row of bytes in each successive RS Frame for the initial transmissions. The CRC decoder 1485 includes input circuitry therein for converting the data bits received serially from the ones' complementor 1484 to 16-parallel-bit format for the CRC decoding procedures. The CRC decoder 1485 is connected for supplying a pulse stretcher 1486 a respective single-bit indication as to whether the CRC decoder 1485 finds each CRC codeword to be correct or not. The pulse stretcher 1486 stretches each such single-bit indication, reproducing it for the duration of a CRC codeword read from the FIFO memory 1481 and is connected for applying that reproduced CRC decoding result to the ROM 1482 for completing its input addressing. If the CRC decoder 1485 does not detect any error in the CRC codeword, the decoder 1485 supplies a ONE to the pulse stretcher 1486. The stretched-in-time ONE from the pulse stretcher 1486 conditions the ROM 1482 to increase the confidence levels of the soft data bits in the CRC codeword as supplied from the ROM 1482 to the Gray-to-binary-code re-mapper 149. If the CRC decoder 1485 detects error in the CRC codeword, the decoder 1485 supplies a ZERO to the pulse stretcher 1486. The stretched-in-time ZERO from the pulse stretcher 1486 conditions the ROM 1482 to leave unaltered the confidence levels of the soft data bits in the CRC codeword as supplied from the ROM 1482 to the Gray-to-binary-code re-mapper 149.

Figure 47:
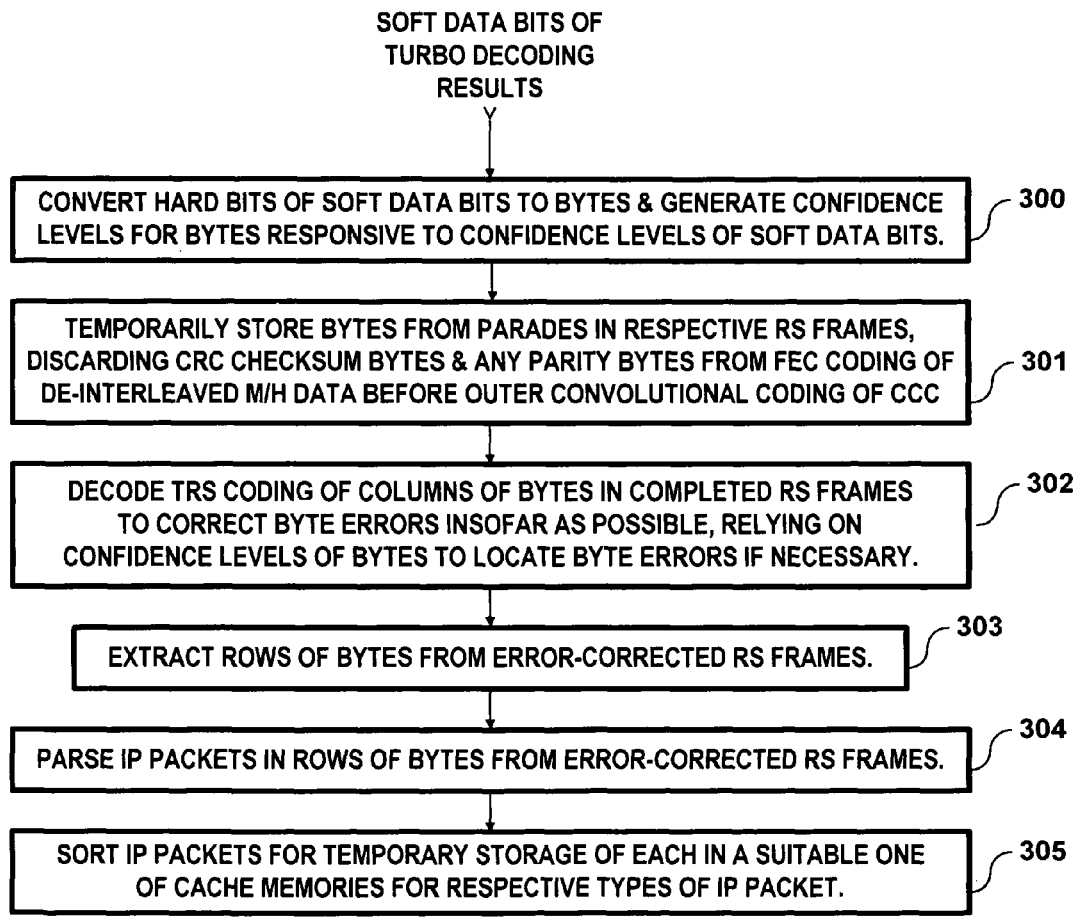
FIG. 47 is a flow chart illustrating the method of processing turbo decoding results to extract internet protocol (IP) data packets therefrom.

FIG. 47 is an informal flow chart illustrating the method of processing turbo decoding results to extract internet protocol (IP) data packets therefrom. Turbo decoding results composed of soft data bits with adjusted confidence levels are forwarded at the conclusion of the final iteration of each turbo decoding procedure on a different portion of the M/H transmission. to be used in an initial step 300 of the method that the FIG. 47 flow chart illustrates. The final iteration of each turbo decoding procedure can be determined by noting when all CRC codewords in one of these different portions of the M/H transmission have been found very likely to be correct. However, there is an upper limit to the number of iterations of each turbo decoding procedure, presuming that sometimes not all CRC codewords can be found very likely to be correct. The hard data bits from the turbo decoding results are converted to bytes in the step 300, and the lowest of the individual adjusted confidence levels of the data bits used to form each byte is ascribed to the byte. Then, in a step 301 the bytes descriptive of a Parade and their respective confidence levels are arrayed in an RS Frame.

After all the bytes descriptive of a Parade have been obtained from the turbo decoding of several M/H Groups in an M/H Frame, so that an RS Frame is complete, a step 302 of TRS decoding respective columns of bytes in the RS Frame begins. One way to perform the step 302 of TRS decoding is initially to attempt TRS decoding of each column of bytes using an error-location-and-correction algorithm. If a column of bytes cannot be successfully decoded without remnant byte errors, then a byte-error-correction-only algorithm is attempted, with the probable locations of byte errors being based on the confidence levels of the bytes in the column. An alternative way to perform the step 302 of TRS decoding is to use just the byte-error-correction-only algorithm on each column of bytes in the RS Frame, with the probable locations of byte errors being based on the confidence levels of the bytes in the column. The step 302 of TRS decoding respective columns of bytes in the RS Frame is followed by a step 303 of extracting rows of error-corrected M/H data bytes from the RS Frame. In a step 304 these rows of error-corrected M/H data bytes are parsed into Internet protocol (IP) packets similarly to the prior-art practice for M/H transmissions made in accordance with A/153.

The step 302 differs from prior-art practice for M/H transmissions made in accordance with A/153 in that the CRC coding of rows of bytes in an RS Frame are not used directly to locate erroneous bytes for TRS decoding. The rows of bytes in an RS Frame need not include CRC checksum bytes for rows or sub-rows of TRS bytes in the RS Frame. Accordingly, the CRC checksum bytes need not be forwarded at the conclusion of the final iteration of each turbo decoding procedure on a different portion of the M/H transmission, thereafter to be used in the steps 300, 301 and 302 of the method that The FIG. 47 flow chart illustrates. Accordingly, there will be no need for skipping over these CRC checksum bytes in the step 303 of extracting rows of error-corrected M/H data bytes from the RS Frame or the subsequent step 304 of parsing these rows of error-corrected M/H data bytes into IP packets.

In a final step 305 of the method that the FIG. 47 flow chart illustrates, the IP packets are sorted for temporary storage in cache memories suitable for each type of IP packet. This sorting is done responsive to information as to type contained in the respective header of each IP packet. E.g., the SMT-MH packets are sorted to the M/H processing unit 179 and thence to the SMT table memory 180 in the FIG. 32E portion of the FIG. 32 receiver.

Figure 48:
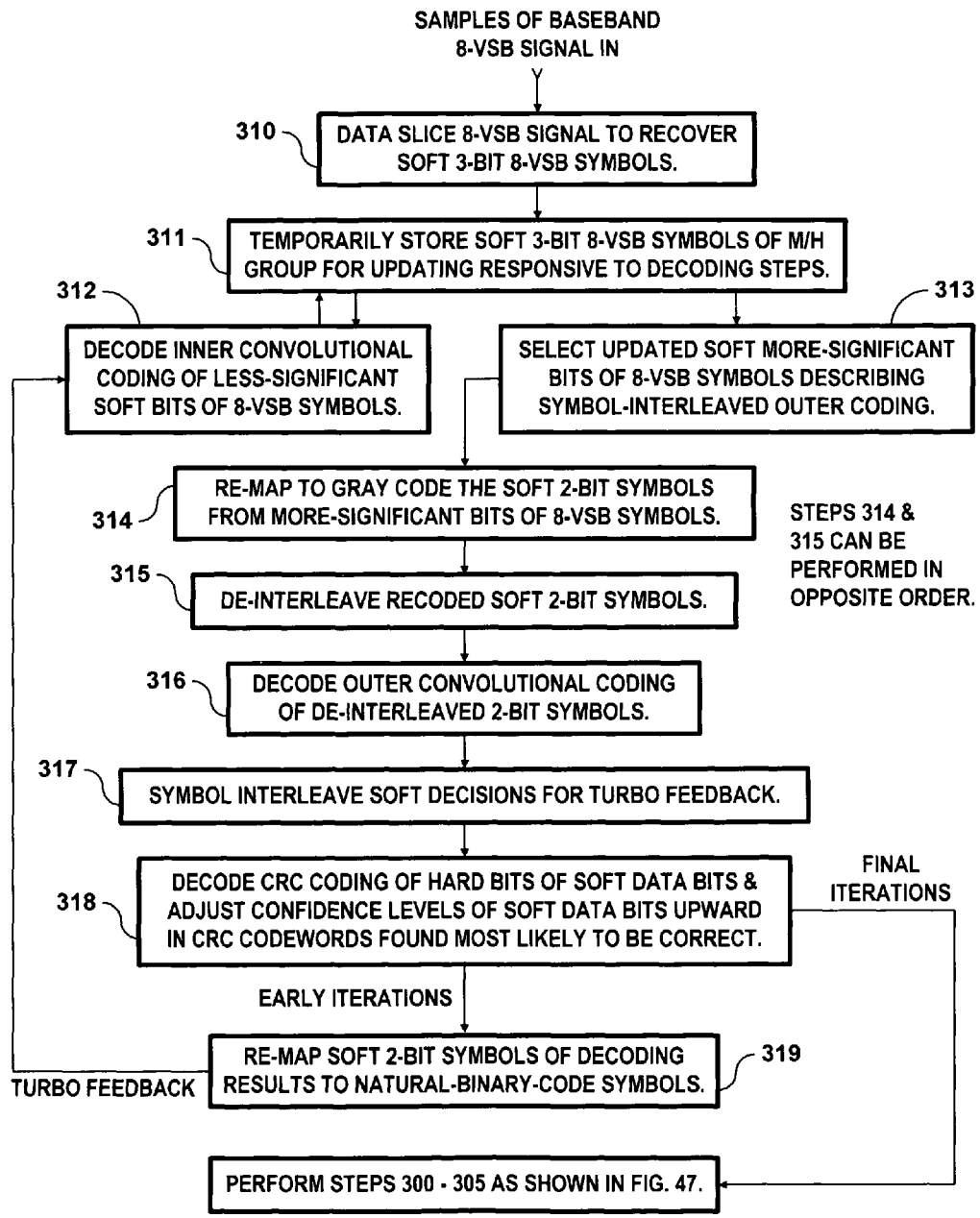
FIG. 48 is a flow chart illustrating the basic decoding method performed by one of the paralleled turbo decoders of FIG. 40 and a subsequent RS-Frame decoder, when receiving single-time M/H transmissions at a code rate one-half the 8-VSB symbol rate.

FIG. 48 is an informal flow chart illustrating the basic turbo decoding method as performed by the turbo decoder 130-1 of FIG. 40 when receiving single-time M/H transmissions at a code rate one-half the 8-VSB symbol rate. In a step 310 of this method samples of analog 8-VSB signal are data sliced to generate digitized 8-VSB symbols composed of three soft bits. This data slicing does not include post-comb filtering of the soft most-significant bits of the digitized 8-VSB symbols, presuming that the most-significant bits of 8-VSB symbols were in contradistinction to practice prescribed by A/153 not precoded in the M/H transmissions.

In a subsequent step 311 the three soft bits descriptive of each of the successive digitized 8-VSB symbols are temporarily stored in the memory 131, capable of temporarily storing all the soft 8-VSB symbols in an M/H Group. In a step 312 the successive less-significant two soft bits descriptive of inner convolutional coding in the digitized 8-VSB symbols are decoded by the 12-phase SISO decoder 133, which updates the more-significant bits of the inner convolutional coding. The FIG. 48 flow chart shows the decoding results of step 312 returned with updates for continued temporary storage in the memory 131 per step 310.

In a step 313 the successive more-significant two soft bits descriptive of outer convolutional coding in the digitized 8-VSB symbols, as updated by step 312 of decoding the inner convolutional coding, are selectively read from the memory 131 as soft 2-bit symbols. The selective reading in step 313 omits those portions of the digitized 8-VSB symbols temporarily stored in the memory 131 that do not relate to the outer convolutional coding of M/H transmissions. In subsequent successive steps 314 and 315 the soft 2-bit symbols are re-mapped to Gray code and are symbol de-interleaved, respectively. Alternatively, step 315 is performed before step 314. This allows the symbol de-interleaving step 315 to be performed simply by reading soft 2-bit symbols from the memory 131 in proper order, without involving separate memory to support symbol de-interleaving. However, the symbol de-interleaving step 315 can be performed using memory associated with the SISO decoder for outer convolutional coding and used in subsequent soft-symbol re-interleaving. The de-interleaved soft 2-bit symbols as re-mapped to Gray code, which result from the steps 314 and 315, reproduce the outer convolutional coding. The outer convolutional coding is decoded in a subsequent step 316.

In a step 317 soft 2-bit symbols resulting from the decoding step 316 are interleaved. The soft data bits in these 2-bit symbols include respective hard bits that should reproduce the CRC codewords from one of the RS Frames. In a subsequent step 318 these hard bits are subjected to CRC decoding. If the decoding results for a CRC codeword indicate that the hard data bits therein are most likely to be correct, the soft data bits containing those hard data bits have their confidence levels adjusted to a higher confidence level. In the final iterations of turbo decoding cycles, the soft data bits with adjusted confidence levels are forwarded as turbo decoding results to be further processed by the steps 300, 301, 302, 303, 304 and 305 of the FIG. 47 method.

In the earlier iterations of turbo decoding cycles, the soft 2-bit symbols modified in step 318 to include soft data bits with adjusted confidence levels are re-mapped to natural-binary-code symbols in a subsequent step 319, thereby generating a turbo feedback signal fed back for use in the step 312 of decoding inner convolutional coding in the next iteration of the turbo decoding procedure. This turbo feedback signal is used for generating an extrinsic turbo feedback signal as part of the iterated step 312 of decoding inner convolutional coding, this procedure not being explicitly shown in the FIG. 48 flow chart for want of space. When the M/H transmissions use SCCC, both soft bits of the re-mapped soft 2-bit symbols are fed back to be used in the next iterated step 312 of decoding inner convolutional coding. When the M/H transmissions use PCCC, only the soft data bits of the re-mapped soft 2-bit symbols need be fed back to be used in the next iterated step 312 of decoding inner convolutional coding.

FIG. 49 is a more detailed schematic diagram of another illustrative embodiment of the FIG. 32D portion of the FIG. 32 M/H receiver apparatus comprising the delay memory 120, a second embodiment 130-2 of the turbo decoder 130, a second embodiment 140-2 of the turbo decoder 140, and the information-exchange unit 150. The paralleled turbo decoders 130-2 and 140-2 shown in FIG. 49 differ from the paralleled turbo decoders 130-1 and 140-1 shown in FIG. 40 in that the unit 150 for exchanging information concerning confidence levels of data bits is relocated to replace the confidence-level adjusters 138 and 148. The unit 150 is reconnected for receiving the responses of the soft-symbol re-interleavers 137 and 147 as input signals. The unit 150 is further connected to supply soft 2-bit symbols with adjusted data bits to the Gray-to-binary-code re-mappers 139 and 149 as input signals thereto, rather than to supply the soft-symbol de-interleavers 135 and 145 with input signals.

Paralleled turbo decoders 130-2 and 140-2 shown in FIG. 49 differ further from the paralleled turbo decoders 130-1 and 140-1 shown in FIG. 40 in that the confidence-level adjusters 138 and 148 are also relocated. In turbo decoder 130-2 the input port of the confidence-level adjuster 138 is connected for receiving its input signal from the output port of the binary-to-Gray-code re-mapper 134. In turbo decoder 130-2 the output port of the confidence-level adjuster 138 is connected for supplying its response to the soft-symbol de-interleaver 134 as input signal thereto. In turbo decoder 140-2 the input port of the confidence-level adjuster 148 is connected for receiving its input signal from the output port of the binary-to-Gray-code re-mapper 144. In turbo decoder 140-2 the output port of the confidence-level adjuster 148 is connected for supplying its response to the soft-symbol de-interleaver 144 as input signal thereto. The response of the confidence-level adjuster 138 is also supplied to the FIG. 32D hard-decision unit 160 as input signal thereto. The response of the confidence-level adjuster 138 is further supplied to the FIG. 32D battery 164 of XOR gates as input signal thereto.

FIG. 50 is an informal flow chart illustrating the basic turbo decoding method as performed by the turbo decoder 130-2 of FIG. 49 when receiving single-time M/H transmissions at a code rate one-half the 8-VSB symbol rate. In a step 320 of this method samples of analog 8-VSB signal are data sliced to generate digitized 8-VSB symbols composed of three soft bits. This data slicing does not include post-comb filtering of the soft most-significant bits of the digitized 8-VSB symbols, presuming that the most-significant bits of 8-VSB symbols were in contradistinction to practice prescribed by A/153 not precoded in the M/H transmissions.

In a subsequent step 321 the three soft bits descriptive of each of the successive digitized 8-VSB symbols are temporarily stored in the memory 131, capable of temporarily storing all the soft 8-VSB symbols in an M/H Group. In a step 322 the successive less-significant two soft bits descriptive of inner convolutional coding in the digitized 8-VSB symbols are decoded by the 12-phase SISO decoder 133, which updates the more-significant bits of the inner convolutional coding. The FIG. 48 flow chart shows the decoding results of step 322 returned with updates for continued temporary storage in the memory 131 per step 320.

In a step 323 the successive more-significant two soft bits descriptive of outer convolutional coding in the digitized 8-VSB symbols, as updated by step 322 of decoding the inner convolutional coding, are selectively read from the memory 131 as soft 2-bit symbols. The selective reading in step 323 omits those portions of the digitized 8-VSB symbols temporarily stored in the memory 131 that do not relate to the outer convolutional coding of M/H transmissions. In a subsequent successive step 324 the soft 2-bit symbols are re-mapped to Gray code. The soft data bits in the re-mapped 2-bit symbols include respective hard bits that should reproduce the CRC codewords from one of the RS Frames. In a subsequent step 325 these hard bits are subjected to CRC decoding. If the decoding results for a CRC codeword indicate that the hard data bits therein are most likely to be correct, the soft data bits containing those hard data bits have their confidence levels adjusted to a higher confidence level. In the final iterations of turbo decoding cycles, the soft data bits with adjusted confidence levels are forwarded as turbo decoding results to be further processed by the steps 300, 301, 302, 303, 304 and 305 of the FIG. 47 method.

In the earlier iterations of turbo decoding cycles, the soft 2-bit symbols modified in step 325 to include soft data bits with adjusted confidence levels are de-interleaved in a subsequent step 326. The resulting de-interleaved soft 2-bit symbols reproduce the outer convolutional coding, which is then decoded in a subsequent step 327.

In steps 328 and 329 soft 2-bit symbols resulting from the decoding step 327 are interleaved and re-mapped to natural-binary-code symbols, thereby generating a turbo feedback signal fed back for use in the step 322 of decoding inner convolutional coding in the next iteration of the turbo decoding procedure. Symbol interleaving may be done before re-mapping to natural-binary-code symbols, or re-mapping to natural-binary-code symbols may be done before symbol interleaving. The resulting turbo feedback signal is used for generating an extrinsic turbo feedback signal as part of the iterated step 322 of decoding inner convolutional coding, this procedure not being explicitly shown in the FIG. 50 flow chart for want of space. When the M/H transmissions use SCCC, both soft bits of the interleaved and re-mapped soft 2-bit symbols are fed back to be used in the next iterated step 312 of decoding inner convolutional coding. When the M/H transmissions use PCCC, only the soft data bits of the interleaved and re-mapped soft 2-bit symbols need be fed back to be used in the next iterated step 312 of decoding inner convolutional coding.

One skilled in the design of electronic apparatus will readily appreciate that modifications can be made to the embodiments of the turbo decoders 130 and 140 shown in FIGS. 40 and 49 in regard to the order of elements in certain cascade connections, which modifications result in further embodiments that are essentially equivalent in performance. This should be borne in mind when evaluating the scope of M/H receiver claims in accordance with the doctrine of equivalents.

While particular embodiments of the invention in its various aspects have been shown and described, it will be apparent to those skilled in the art that changes and modifications may be made without departing from the invention in its broader aspects. Therefore, the aim in the appended claims is to cover all such changes and modifications as fall within the true spirit and scope of the invention.

In the claims which follow, the word "said" rather than the word "the" is used to indicate the existence of an antecedent basis for a term having being provided earlier in the claims. The word "the" is used for purposes other than to indicate the existence of an antecedent basis for a term having being provided earlier in the claims, the usage of the word "the" for other purposes being consistent with normal grammar in the American English language.

What is claimed is:

1. A transmitter of a radio-frequency carrier wave modulated in amplitude responsive to 8-level digital symbols, which said 8-level digital symbols at selected times convey concatenated convolutional coding (CCC) of data that have previously been subjected to transverse Reed-Solomon (TRS) forward-error-correction (FEC) coding, said transmitter comprising:

apparatus for generating successive bytes of TRS FEC coded data;

an encoder connected for coding said successive bytes of said TRS-coded data with an error-locating code for the TRS FEC codewords, thereby generating a succession of codewords of said error-locating code;

a de-interleaver connected for de-interleaving successive bits of said succession of said codewords of said error-locating code as converted to serial-bit format, thereby to generate a de-interleaver response in serial-bit format;

an outer encoder connected for generating redundant outer convolutional coding of said de-interleaver response at one-half code rate;

an interleaver connected for interleaving successive bit-pairs of said redundant outer convolutional coding, thereby to generate successive bit-pairs of an interleaver response wherein said successive bits of said succession of said codewords of said error-locating code as converted to serial-bit format are provided implied interleaving that preserves their original order;

apparatus for time-division multiplexing said interleaver response with other digital signals to generate a time-division multiplex response;

an inner encoder connected for generating redundant inner convolutional coding of said time-division multiplex response at two-thirds code rate; and symbol mapping apparatus connected for mapping said redundant inner convolutional coding to said 8-level digital symbols for modulating said radio-frequency carrier wave in amplitude.

2. The transmitter set forth in claim 1, wherein said successive bit-pairs of said interleaver response as included in said time-division multiplex response each consist of a respective data bit followed by a respective parity bit, and wherein said inner encoder redundantly encodes said respective parity bits to implement serial concatenated convolutional coding (SCCC) for application to said symbol mapping apparatus as input signal.

3. The transmitter set forth in claim 2, wherein the respective data bits of said successive bit-pairs of said interleaver response included in said SCCC applied to said symbol mapping apparatus are each mapped by said symbol mapping apparatus to a most significant one of the three bits defining a specific one of said 8-level digital symbols.

4. The transmitter set forth in claim 3, including a Gray code to natural binary code remapper connected for Gray-code labeling said bit-pairs of said redundant outer convolutional coding before they reach said inner encoder connected for generating said redundant inner convolutional coding.

5. The transmitter set forth in claim 1, wherein said successive bit-pairs of said interleaver response as included in said time-division multiplex response each consist of a respective data bit followed by a respective parity bit, and wherein said inner encoder redundantly encodes said respective data bits to implement parallel concatenated convolutional coding (PCCC) for application to said symbol mapping apparatus as input signal.

6. The transmitter set forth in claim 5, wherein the respective parity bits of said successive bit-pairs of said interleaver response included in said SCCC applied to said symbol mapping apparatus are each mapped by said symbol mapping apparatus to a most significant one of the three bits defining a specific one of said 8-level digital symbols.

7. The transmitter set forth in claim 6, including a Gray code to natural binary code remapper connected for Gray-code labeling said bit-pairs of said redundant outer convolutional coding before they reach said inner encoder connected for generating said redundant inner convolutional coding.

8. A receiver for radio-frequency carrier waves each modulated in amplitude responsive to a respective succession of 8-level digital symbols, said 8-level digital symbols of said respective succession at selected times conveying concatenated convolutional coding (CCC) of data that have previously been subjected to transverse Reed-Solomon (TRS) forward-error-correction (FEC) coding, said TRS-coded data having been subjected to implied symbol interleaving that preserves the original order of their successive bits within said CCC, said receiver comprising:

apparatus for recovering soft CCC data descriptive of said 8-level digital symbols from a selected one of said radio-frequency carrier waves, said CCC data composed of triads of soft bits, the two less significant ones of the soft bits of each said triad conveying an inner convolutional coding component of said CCC, and the two more significant ones of the soft bits of each said triad conveying a symbol-interleaved outer convolutional coding component of said CCC, the one of the soft bits of each said triad of intermediate significance used in conveying both said inner convolutional coding component and said symbol-interleaved outer convolutional coding component of said CCC;

a memory for temporarily storing said triads of soft bits;

a first soft-input/soft-output (SISO) decoder connected for receiving the two less significant ones of the soft bits of each said triad conveying said inner convolutional coding component of said CCC and decoding said inner convolutional coding component of said CCC to generate a response supplying updates of said soft bits of intermediate significance in said triads as temporarily stored in said memory;

a symbol de-interleaver having an input port connected for receiving from said memory 2-bit symbols of said symbol-interleaved outer convolutional coding component of said CCC composed of the most significant ones of the soft bits of said triads conveying said inner convolutional coding component of said CCC and corresponding updated ones of the soft bits of intermediate significance in said triads, said symbol de-interleaver connected for supplying from an output port thereof an outer convolutional coding component of said CCC as a symbol de-interleaver response;

a second soft-input/soft-output (SISO) decoder connected for receiving said symbol de-interleaver response and decoding said outer convolutional coding component of said CCC therein to generate a response from said second SISO decoder that updates said soft bits of said outer convolutional coding component of said CCC;

an interleaver connected for receiving at an input port thereof at least the less significant soft bits of said second SISO decoder response and for supplying an interleaved response from an output port of said interleaver;

an extrinsic data processor connected for extracting extrinsic data in response to said interleaved response of said interleaver, said extrinsic data processor connected for supplying said extrinsic data to said first SISO decoder during turbo decoding cycles in a CCC decoding portion of said receiver, said CCC decoding portion of said receiver comprising the foreclaimed elements operable to supply from an output connection point soft decisions regarding said bits of said TRS-coded data in said original order;

a hard-decision unit connected for receiving said soft decisions regarding said bits of said TRS-coded data from said output connection point in said CCC decoding portion of said receiver, said hard-decision unit further connected for supplying hard decisions regarding said bits of said TRS-coded data; and decoding apparatus for said TRS FEC coding connected for receiving said hard decisions regarding said bits of said TRS-coded data, said decoding apparatus for said TRS FEC coding decoding said hard decisions regarding bits of said TRS-coded data to generate corrected data for further processing.

9. The receiver set forth in claim 8, wherein said output connection point in said CCC decoding portion of said receiver is at the output port of said interleaver.

10. The receiver set forth in claim 8, wherein said output connection point in said CCC decoding portion of said receiver is at the input port of said symbol de-interleaver.

11. The receiver set forth in claim 8, wherein said decoding apparatus for said TRS FEC coding is designed to use byte-error-location information to assist decoding procedures, and wherein said byte-error-location information is generated responsive to the confidence levels of said soft decisions regarding said bits of said TRS-coded data in said original order as supplied from said output connection point in said CCC decoding portion of said receiver at the output port of said interleaver.

12. The receiver set forth in claim 8, said receiver further comprising:

a binary-to-Gray-code re-mapper having an input port connected for receiving soft 2-bit symbols of said symbol-interleaved outer convolutional coding component of said CCC as supplied in updated form in the response of said first SISO decoder, said soft 2-bit symbols received at said input port of said binary-to-Gray-code re-mapper conveying updated symbol-interleaved outer convolutional coding component of said CCC in Gray-code-labeled natural-binary-code, an output port of said binary-to-Gray-code re-mapper connected for supplying said symbol de-interleaver with soft 2-bit symbols of said symbol-interleaved outer convolutional coding component of said CCC as re-mapped to Gray coding for de-interleaving; and
a Gray-to-binary-code re-mapper in a cascade connection with said interleaver.

13. The receiver set forth in claim 12, wherein said interleaver precedes said Gray-to-binary-code re-mapper in said cascade connection, wherein said second SISO decoder is operable for generating updated de-interleaved soft-2-bit symbols in said response from said second SISO decoder, wherein said second SISO decoder is connected for supplying said updated de-interleaved soft-2-bit symbols to said interleaver to be interleaved for generating an interleaver response composed of soft-2-bit symbols that include soft decisions regarding said bits of said TRS-coded data in said original order, and wherein said Gray-to-binary-code re-mapper is connected for responding to said interleaver response to supply said extrinsic data processor a Gray-to-binary-code re-mapper response.

14. The receiver set forth in claim 13, wherein when receiving serial concatenated convolutional coding of TRS-coded data said Gray-to-binary-code re-mapper is connected for supplying said extrinsic data processor with said response of said Gray-to-binary-code re-mapper that is composed of more-significant soft data bits and less-significant further soft bits, said further soft bits expressing soft decisions as to the respective binary values of parity bits of interleaved outer convolutional coding as recoded from Gray code to natural binary code by said Gray-to-binary-code re-mapper.

15. The receiver set forth in claim 13, wherein when parallel concatenated convolutional coding of TRS-coded data is being received said Gray-to-binary-code re-mapper is connected for supplying said extrinsic data processor just with soft data bits as recoded from Gray code to natural binary code.

16. The receiver set forth in claim 13, wherein said second SISO decoder is connected for supplying its response as de-interleaved soft-2-bit symbols to said interleaver to be interleaved for generating an interleaver response composed of soft-2-bit symbols that include soft decisions regarding said bits of said TRS-coded data in said original order, wherein said output connection point in said CCC decoding portion of said receiver is at the output port of said interleaver, wherein said decoding apparatus for said TRS FEC coding is connected for exploiting byte-error-location information to assist its decoding procedures, and wherein said byte-error-location information is generated responsive to the confidence levels of said soft decisions regarding said bits of said TRS-coded data in said original order as supplied from said output connection point in said CCC decoding portion of said receiver at the output port of said interleaver.

17. The receiver set forth in claim 16, further comprising:
a confidence-level adjuster connected for receiving said interleaver response composed of soft-2-bit symbols, said confidence-level adjuster connected for supplying a response composed of soft-2-bit symbols to said Gray-to-binary-code re-mapper as input signal, said confidence-level adjuster connected for adjusting the confidence levels of the soft data bits included in said response thereof as compared to the confidence levels of the soft data bits included in said interleaver response, said adjusting of the confidence levels of the soft data bits being made by said confidence-level adjuster responsive to error-detection coding of said TRS-coded data.

18. The receiver set forth in claim 12, wherein said output connection point in said CCC decoding portion of said receiver is at the input port of said symbol de-interleaver, wherein said decoding apparatus for said TRS FEC coding is designed to use byte-error-location information to assist decoding procedures, and wherein said byte-error-location information is generated responsive to the confidence levels of said soft decisions regarding said bits of said TRS-coded data in said original order as supplied from said output connection point in said CCC decoding portion of said receiver at the output port of said interleaver.

19. The receiver set forth in claim 18, further comprising:
a confidence-level adjuster connected for receiving said binary-to-Gray-code re-mapper response composed of soft-2-bit symbols of said symbol-interleaved outer convolutional coding component of said CCC as re-mapped to Gray coding, said confidence-level adjuster connected for supplying a response composed of soft-2-bit symbols to said symbol de-interleaver as input signal, said confidence-level adjuster connected for adjusting the confidence levels of the soft data bits included in said response thereof as compared to the confidence levels of the soft data bits included in said binary-to-Gray-code re-mapper response, said adjusting of the confidence levels of the soft data bits being made by said confidence-level adjuster responsive to error-detection coding of said TRS-coded data.

* * * * *